US012060256B2

(12) United States Patent
Doelman et al.

(10) Patent No.: US 12,060,256 B2
(45) Date of Patent: Aug. 13, 2024

(54) LIQUID FOOD DISPENSER SYSTEM AND METHOD

(71) Applicant: fairlife, LLC, Chicago, IL (US)

(72) Inventors: Timothy Peter Doelman, Glencoe, IL (US); Vincent A. Baxter, Temecula, CA (US)

(73) Assignee: fairlife, LLC, Chicago, IL (US)

( * ) Notice: Subject to any disclaimer, the term of this patent is extended or adjusted under 35 U.S.C. 154(b) by 0 days.

(21) Appl. No.: 18/453,754

(22) Filed: Aug. 22, 2023

(65) Prior Publication Data

US 2023/0391603 A1 Dec. 7, 2023

Related U.S. Application Data

(62) Division of application No. 17/408,891, filed on Aug. 23, 2021, now Pat. No. 11,767,214, which is a division of application No. 16/744,843, filed on Jan. 16, 2020, now Pat. No. 11,097,938, which is a division of application No. 16/531,531, filed on Aug. 5, 2019, now Pat. No. 10,562,755, which is a division of application No. 15/894,571, filed on Feb. 12, 2018, now Pat. No. 10,370,236, which is a division of application No. 14/169,708, filed on Jan. 31, 2014, (Continued)

(51) Int. Cl.

| | |
|---|---|
| *B67D 1/12* | (2006.01) |
| *B65D 47/24* | (2006.01) |
| *B67D 1/00* | (2006.01) |
| *B67D 1/04* | (2006.01) |
| *B67D 1/08* | (2006.01) |

(52) U.S. Cl.
CPC ......... *B67D 1/1277* (2013.01); *B65D 47/242* (2013.01); *B65D 47/244* (2013.01); *B67D 1/0082* (2013.01); *B67D 1/0462* (2013.01); *B67D 1/0864* (2013.01); *B67D 1/1245* (2013.01); *B67D 1/1252* (2013.01); *B67D 2001/0828* (2013.01); *B67D 2210/0006* (2013.01); *B67D 2210/00062* (2013.01)

(58) Field of Classification Search
CPC .. B67D 1/1277; B67D 1/1245; B67D 1/1251; B67D 1/0462; B67D 2001/0828
See application file for complete search history.

(56) References Cited

U.S. PATENT DOCUMENTS

| | | | |
|---|---|---|---|
| 986,755 | A | 3/1911 | Polk |
| 986,775 | A | 3/1911 | Smith |

(Continued)

FOREIGN PATENT DOCUMENTS

| | | |
|---|---|---|
| WO | 02068315 | 9/2002 |

OTHER PUBLICATIONS

"International Preliminary Report on Patentability," regarding International Patent Application No. PCT/US2007/015663, dated Jan. 22, 2009, 8 pages.

(Continued)

*Primary Examiner* — J C Jacyna
(74) *Attorney, Agent, or Firm* — Slater Matsil, LLP

(57) ABSTRACT

A system and method for dispensing fluids is introduced. A preferred embodiment comprises a sealed tank, a bag containing fluid inside the sealed tank, an outlet for dispensing the liquid in the bag, and a pressure generating device to create pressure in the sealed tank.

20 Claims, 69 Drawing Sheets

Related U.S. Application Data now Pat. No. 9,890,030, which is a division of application No. 13/903,658, filed on May 28, 2013, now Pat. No. 8,678,234, which is a division of application No. 13/453,996, filed on Apr. 23, 2012, now Pat. No. 8,448,827, which is a division of application No. 12/307,723, filed as application No. PCT/US2007/015663 on Jul. 6, 2007, now Pat. No. 8,181,822.

(60) Provisional application No. 60/912,626, filed on Apr. 18, 2007, provisional application No. 60/819,178, filed on Jul. 7, 2006.

(56) References Cited

U.S. PATENT DOCUMENTS 1,408,397 A 2/1922 Ragsdale
1,895,854 A 1/1933 Lipshitz
2,032,305 A 10/1936 Poulin et al.
2,493,660 A 1/1950 Elkins
2,500,397 A 3/1950 Bauerlein
2,530,045 A 11/1950 Copping
2,828,893 A 11/1955 Stewart et al.
2,740,556 A 4/1956 Baron
2,806,640 A 9/1957 Wroblewski
2,825,491 A 3/1958 Engstrom
2,974,834 A 3/1961 Foote et al.
3,288,332 A 11/1966 Etter et al.
3,329,156 A * 7/1967 Pursifull .............. B67D 1/1245 137/212
3,347,421 A 10/1967 Yingst et al.
3,370,753 A 2/1968 Yingst et al.
3,435,990 A 4/1969 Pike, Jr.
3,625,399 A * 12/1971 Heisler ................ B67D 1/1245 222/399
3,777,936 A 12/1973 Hazard
3,830,407 A 8/1974 Wierlo
3,878,970 A * 4/1975 Nezworski ........... B67D 1/1247 222/61
3,987,715 A 10/1976 Muller
4,014,461 A * 3/1977 Harvill ................. B67D 1/1245 137/265
4,193,515 A 3/1980 Purdy
4,275,823 A * 6/1981 Credle, Jr. ........... B67D 1/1245 222/64
4,413,752 A * 11/1983 McMillin ............. B67D 1/1247 222/61
4,438,870 A 3/1984 Stull
4,467,941 A * 8/1984 Du ....................... B67D 1/1245 222/66
4,509,863 A 4/1985 Borrow
4,651,898 A 3/1987 Bell
4,687,120 A 8/1987 McMillin
4,754,899 A 7/1988 Stull
4,860,923 A 8/1989 Kirschner et al.
4,921,135 A 5/1990 Pleet
4,967,936 A 11/1990 Bingler
4,991,743 A 2/1991 Walker
5,033,651 A 7/1991 Whigham et al.
5,169,028 A * 12/1992 Morrison ................. B67D 3/00 222/25
5,215,128 A * 6/1993 Neeser ................. B67D 1/0835 141/105
5,361,941 A 11/1994 Parekh et al.
5,421,487 A 6/1995 Moretti
5,463,878 A 11/1995 Parekh et al.
5,487,913 A 1/1996 Fackrell et al.
5,499,741 A 3/1996 Scott et al.
5,601,210 A 2/1997 Kelly et al.
5,636,763 A * 6/1997 Furness ................ B67D 1/1245 222/61
5,649,575 A 7/1997 Till
5,720,728 A 2/1998 Ford
5,757,667 A 5/1998 Shannon et al.
5,824,000 A 10/1998 Pavlo et al.
5,880,364 A 3/1999 Dam
5,897,031 A 4/1999 Wirt et al.
5,909,825 A * 6/1999 Lydford ............... B67D 1/0871 116/110
5,992,685 A 11/1999 Credle, Jr.
6,056,157 A 5/2000 Gehl et al.
6,062,427 A * 5/2000 Du .......................... F16K 31/56 137/170.2
6,135,329 A 10/2000 Stoneberg et al.
6,192,752 B1 2/2001 Blaine
6,276,567 B1 8/2001 Diaz et al.
6,293,849 B1 9/2001 Kawashima
6,299,020 B1 10/2001 Sudolcan et al.
6,299,038 B1 10/2001 Schmeisser et al.
6,338,425 B1 1/2002 Berge et al.
6,357,634 B1 3/2002 Evans et al.
6,375,048 B1 4/2002 van der Meer et al.
6,401,975 B2 6/2002 Diaz et al.
6,454,131 B1 9/2002 van der Meer et al.
6,622,988 B2 9/2003 Gill
6,685,059 B2 2/2004 Jones et al.
6,761,284 B2 7/2004 Knepler
6,889,603 B2 5/2005 Carhuff et al.
6,938,995 B2 9/2005 Mutz et al.
7,004,658 B2 2/2006 Hall et al.
7,017,409 B2 3/2006 Zielinski et al.
7,121,437 B2 10/2006 Kasting
7,172,096 B2 2/2007 O'Dougherty
7,261,226 B2 8/2007 Adams et al.
7,455,200 B2 11/2008 Gehl et al.
7,506,784 B2 3/2009 Lee
7,810,679 B2 10/2010 Wauters et al.
7,845,524 B2 12/2010 Evans et al.
7,975,881 B1 7/2011 Glucksman et al.
8,181,822 B2 5/2012 Doelman et al.
2003/0102330 A1 6/2003 Cote
2003/0168472 A1 9/2003 Segiet
2005/0000980 A1 1/2005 Goepfert
2005/0276883 A1 12/2005 Jeffrey et al.
2006/0068075 A1 3/2006 Fultz et al.
2006/0180585 A1 8/2006 Cunningham et al.
2007/0178213 A1 8/2007 Ketchmark et al.
2007/0194056 A1 8/2007 Webster et al.
2008/0283550 A1 11/2008 Nighy et al.
2009/0081315 A1 3/2009 Ueda et al.
2009/0236361 A1 9/2009 Doelman et al.
2011/0226806 A1 9/2011 O'Dougherty et al.
2012/0205397 A1 8/2012 Doelman et al.
2012/0261442 A1 10/2012 Doelman et al.
2017/0064977 A1 3/2017 Bischel

OTHER PUBLICATIONS

"International Search Report and the Written Opinion of the International Searching Authority, or the Declaration," regarding International Patent Application No. PCT/US2007/015663, dated Sep. 8, 2008, 13 pages.

* cited by examiner

FIG. 28a
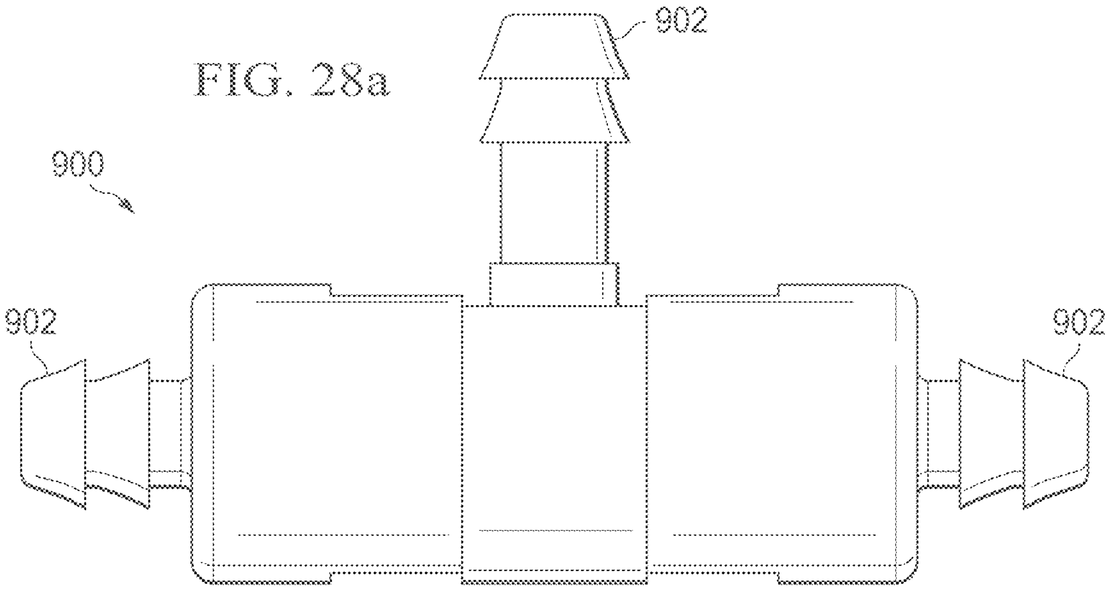
FIG. 28b
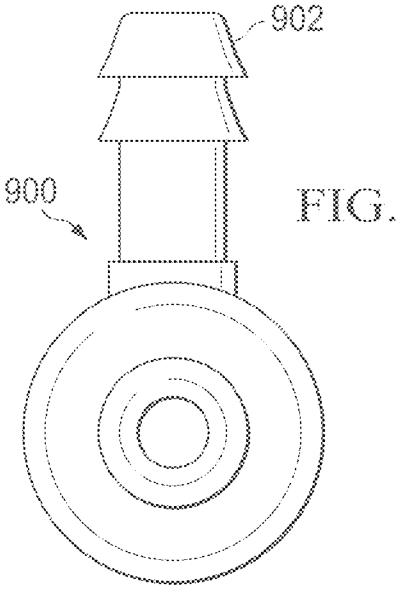
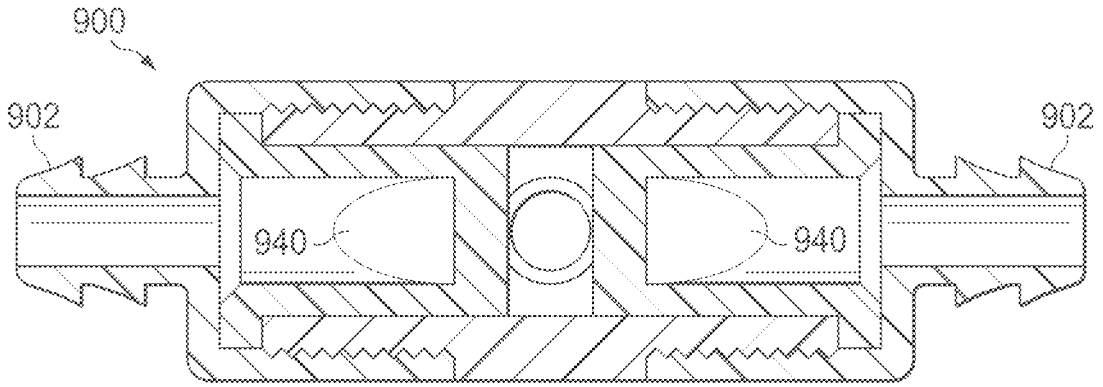
FIG. 28c

FIG. 34a
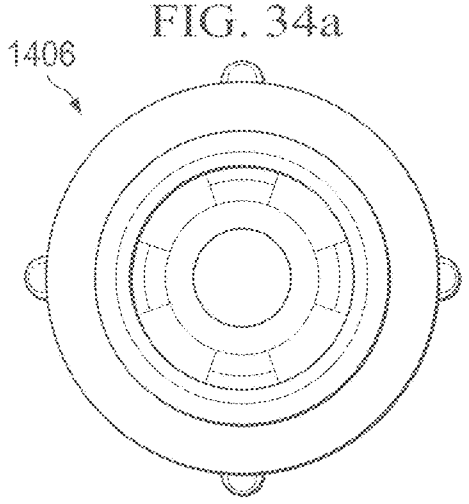
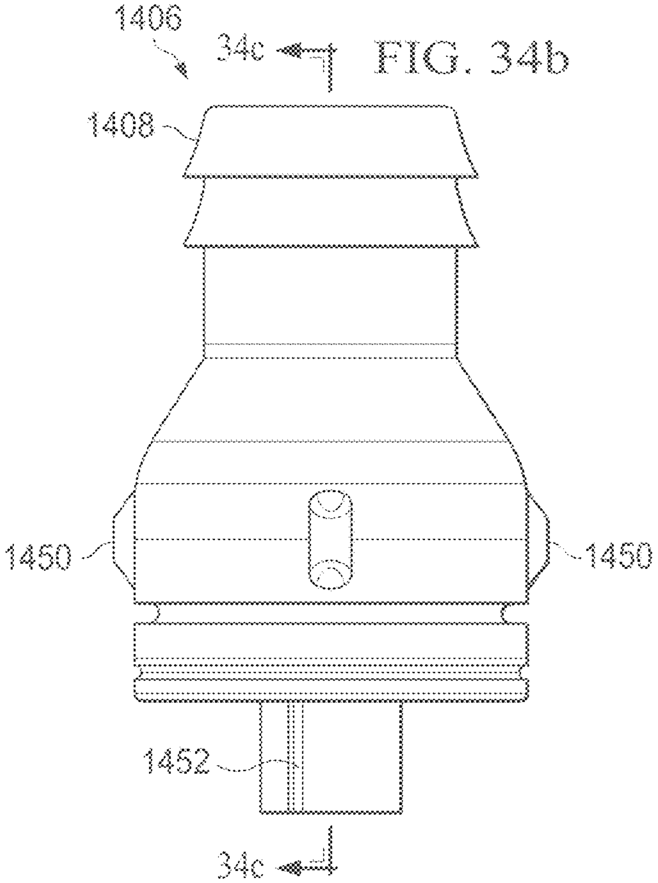
FIG. 34b
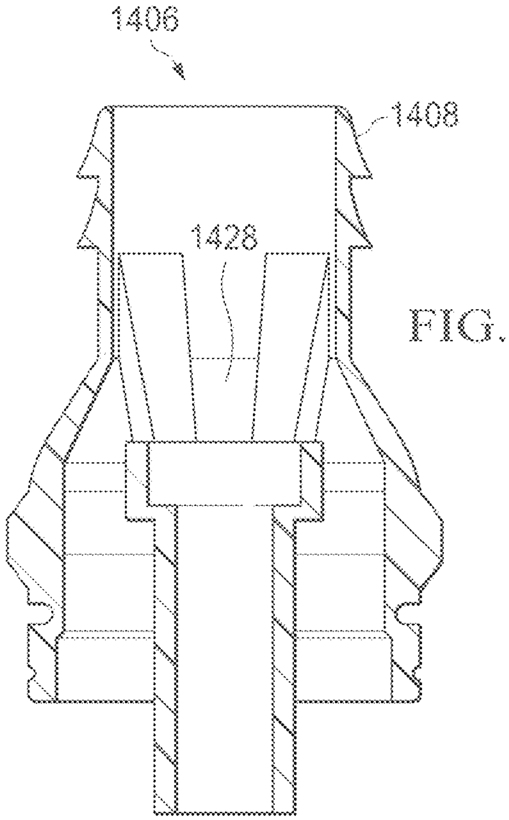
FIG. 34c

CLOSED POSITION

FIG. 39b
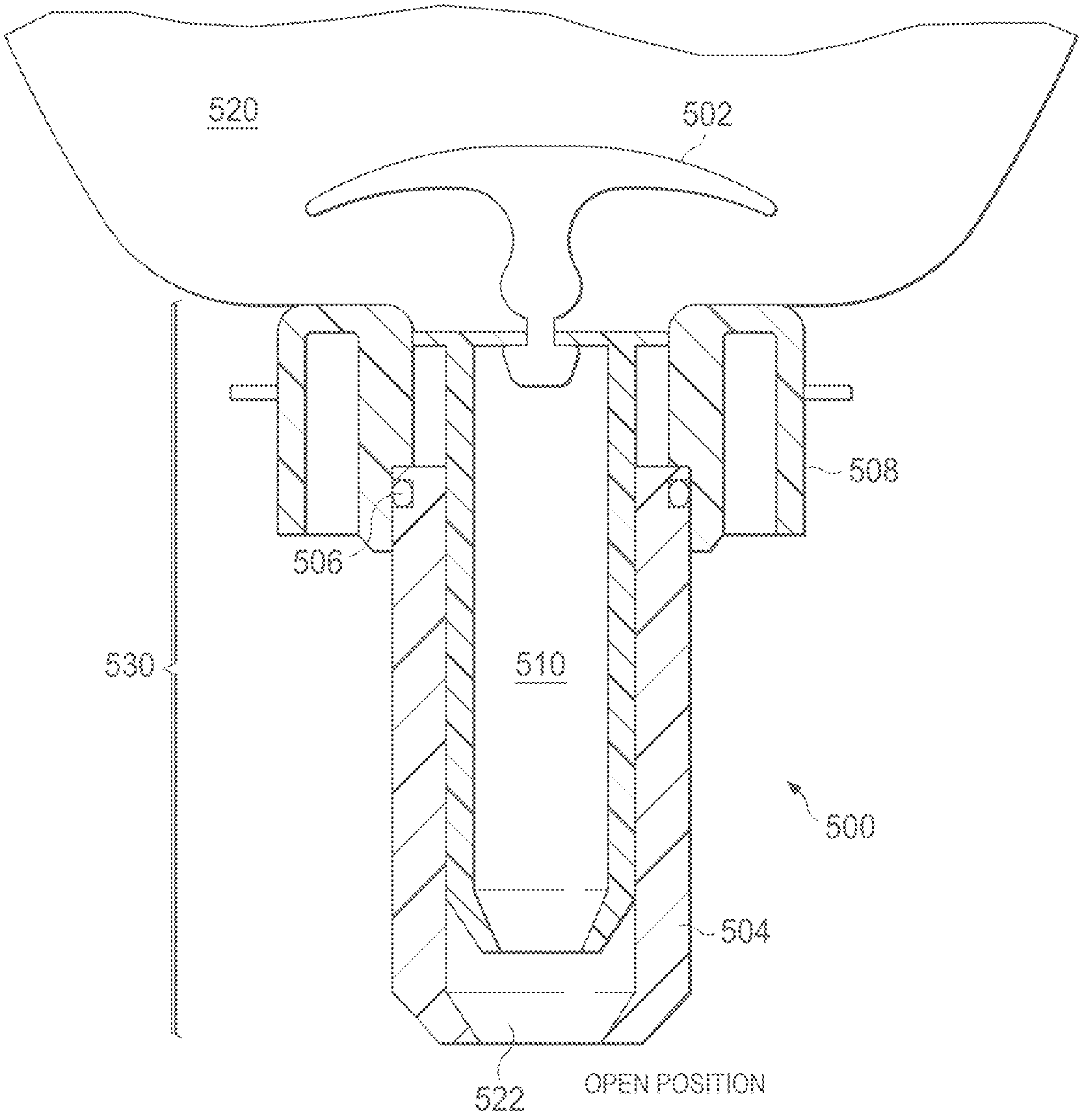
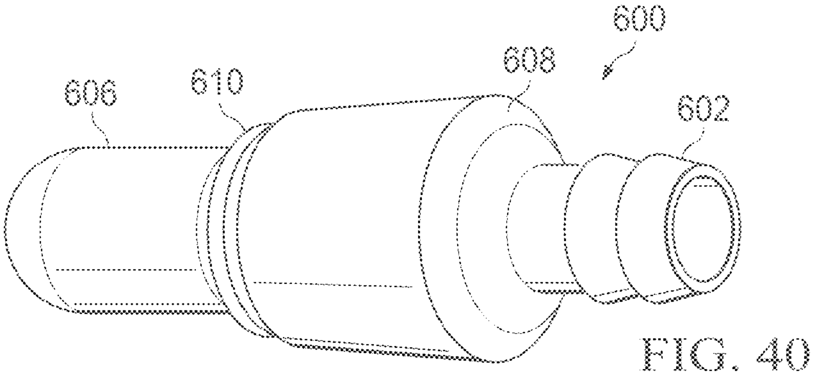
FIG. 40

LIQUID FOOD DISPENSER SYSTEM AND METHOD

This application is a divisional of U.S. patent application Ser. No. 17/408,891, filed on Aug. 23, 2021, entitled "Liquid Food Dispenser System and Method," which is a divisional of U.S. patent application Ser. No. 16/744,843, filed on Jan. 16, 2020, entitled "Liquid Food Dispenser System and Method," now U.S. Pat. No. 11,097,938, issued on Aug. 24, 2021, which is a divisional of U.S. patent application Ser. No. 16/531,531, filed on Aug. 5, 2019, entitled "Liquid Food Dispenser System and Method," now U.S. Pat. No. 10,562,755, which is a divisional of U.S. patent application Ser. No. 15/894,571, filed on Feb. 12, 2018, entitled "Liquid Food Dispenser System and Method," now U.S. Pat. No. 10,370,236, which is a divisional of U.S. patent application Ser. No. 14/169,708, filed on Jan. 31, 2014, entitled "Liquid Food Dispenser System and Method," now U.S. Pat. No. 9,890,030, which is a divisional of U.S. patent application Ser. No. 13/903,658, filed May 28, 2013, entitled "Liquid Food Dispenser System and Method," now U.S. Pat. No. 8,678,234, which is a divisional of U.S. patent application Ser. No. 13/453,996, filed Apr. 23, 2012, entitled "Liquid Food Dispenser System and Method," now U.S. Pat. No. 8,448,827, which is a divisional of U.S. patent application Ser. No. 12/307,723, filed Jan. 6, 2009, entitled "Liquid Food Dispenser System and Method," now U.S. Pat. No. 8,181,822, which is a national filing under 35 U.S.C. § 371 of International Application No. PCT/US2007/015663, filed on Jul. 6, 2007, which application claims priority to two U.S. Provisional Applications: U.S. Provisional Application No. 60/819,178, filed on Jul. 7, 2006, entitled "Liquid Food Dispenser System and Method," and U.S. Provisional Application No. 60/912,626, filed on Apr. 18, 2007, entitled "Liquid Food Dispenser System and Method," all of which applications are hereby incorporated herein by reference.

TECHNICAL FIELD

The present invention relates generally to a system and method of dispensing fluids, and more particularly to a system and method for dispensing liquid beverages.

BACKGROUND

Beverage dispensing machines generally are intended to expel or deliver a beverage or beverage concentrate in a reasonably sanitary manner. Generally, beverage dispensing machines require a mechanism to pump or expel the beverage, a nozzle or interface between the beverage and the external environment, and a method or device to control the flow rate of the beverage.

Typically beverage dispensing machines expel the beverage or beverage concentrate either by using a diaphragm pump, a peristaltic pump, a direct gas pump, or by using gravity to cause the liquid to flow out of the ingredient storage container.

A diaphragm pump uses a movable diaphragm to directly push the beverage out of the storage container. A disadvantage of this type of prior art pump is that the ingredient being pumped comes in direct contact with internal parts of the diaphragm pump. Such contact increases the risk of bacterial contamination and makes the system difficult to clean and sanitize.

A peristaltic pump, on the other hand, comprises a rotating apparatus which periodically squeezes a substance through a flexible tube. One disadvantage with using a peristaltic pump is that whenever new product is loaded into the system, the operator must mate the disposable tube to the permanent peristaltic pump tube. Another disadvantage of the peristaltic pump is that the permanent tube comes in contact with the product and must be washed out regularly to maintain appropriate levels of sanitation.

Another way to expel a beverage is with a compressed gas system as is done, for example, with a beer keg. In a compressed gas system, a compressed gas is introduced into the liquid container, the pressure of which expels the liquid. A major drawback with this method, however, when applied to edible or organic products, is that the propellant gas coming in direct contact with the product makes the product more prone to spoilage or environmental contamination.

In a gravity flow system, the weight of the ingredient is used to provide the force to expel the product. One disadvantage of the gravity flow system, however, is that the flow rate of the dispensed liquid is dependent on the head pressure of the ingredients. As the ingredient empties, the head pressure decreases, which results in a reduction of flow rate. A second disadvantage of the gravity flow system is that more viscous ingredients will flow at unacceptably slow flow rates.

In order to maintain a sanitary environment to dispense beverages and other liquid food items, attention must be given to the dispensing and closure nozzle, the designs of which can vary widely, because the nozzle provides an interface between the liquid and the external environment. This is particularly an issue with low-acid products that are high in nutrients, which are particularly prone to bacterial growth.

In the bag-in-box industry, for example, it is common for a bag to have a long tube with a closed tip used for transportation and storage. When the beverage is ready for dispensing, the tube is placed through a pinch valve mechanism and the end of the tube is cut, allowing the product to be dispensed when the pinch valve is open. One disadvantage with this method is that once the tube is cut, it cannot be resealed without resorting to a mechanical means to pinch the tube shut. Another disadvantage with this method is that the end of the tube is exposed to the environment, resulting in the possibility of contamination and the potential for the ingredient to dry in the tube. Another disadvantage is that, because the tube must be physically cut, the cutting device also requires cleaning and sanitizing. In addition, the cutting device can be lost, dulled, misused and left unclean. The tube can also be incorrectly cut, whether cut at an angle, jagged, or cut too high or too low on the tube.

Another dispensing and closure nozzle technique employed in the bag-in-box industry is to use a bag cap that mates to a receiving fitment that is connected to a larger dispensing system. A disadvantage with this method is that it requires at least two external pieces. Another disadvantage with this method is that these external pieces and the associated pumping mechanism need to be cleaned regularly or replaced if good sanitation is to be maintained.

Another issue with prior art beverage dispensing machines involves automatic product changeover for beverage dispensing systems that employ a plurality of product storage containers. Generally, vacuum sensors either mechanically or electromechanically switch from an empty product container to a full product container by sensing the level of vacuum pulled on the empty product container. A disadvantage of sensing vacuum levels, however, is that an in-line device is necessary to determine if a vacuum level is low. An in-line device, such as a vacuum sensor, can come in contact with the beverage and create contamination issues.

Another issue with prior art beverage dispensing machines involves splattering during the initiation of dispensing. With some nozzle designs, there may be a problem during the opening or closing of the nozzle, especially when the opening or closing is performed slowly. As the nozzle plunger lifts into the nozzle body, breaking the nozzle seal and allowing product to flow through the newly-created gap, the flow may disassociate and splatter as it dispenses in a non-uniform fashion. When the nozzle becomes fully open, the flow generally returns to a smooth and uniform flow.

Another issue with prior art beverage dispensing machines it that prior art machines have been unable to provide precise mixtures of various dairy products, for example, milk, cream, and water. While mixing dairy products is used in the large scale commercial production of dairy goods, an ability to mix dairy products on the fly in a dispensing machine has not been introduced in dairy dispensing machines. One of the difficulties in providing dairy mixtures is that precisely controlling the ratios of dairy products is difficult to achieve with gravity flow dairy dispensing devices, and also machines that dispense individual servings. Another difficulty involves mixing different products in a manner that is not apparent to the user.

Yet another issue with beverage dispensing systems pertains to tracking the amount of remaining product left in the machine that is available for dispensing. Beverage dispensers may employ both direct and indirect methods to determine the amount of product remaining.

Indirect methods of determining the remaining quantity of product include counting the number of cycles a pump turns to expel a product and counting the time during which the dispensing valve is open. With the pump cycle count method, if the amount of material dispensed for each pump cycle is known as well as the initial amount of ingredient prior to pumping, the remaining ingredient amount can be calculated. In the time count method, the remaining ingredient amount can be calculated if the flow rate and the initial ingredient amount are known. Indirect methods of determining remaining product quantity, however are prone to error because of inaccuracies in flow rate assumptions and inaccuracies in initial product volume.

A direct method of measuring remaining product quantity, on the other hand, weighs the ingredient container using a load cell or pressure sensor. The product container might rest on a shelf integrated with a sensor, or it might sit directly on a sensor. A disadvantage of this method is that the sensing system or portions of the sensing system sit below the ingredient container. Since food ingredient containers need to be washable, any sensor that sits below an ingredient container may be prone to issues relating to cleaning, sanitation, and difficulties caused by spilling or leaking ingredients. Another problem with the load cell approach is that the product package is usually attached to the product cavity whose volume is being measured. Since the product package is weighed along with the product inside it, measuring inaccuracies may result.

Another direct method of measuring product volume is to put measuring devices in-line with product flow. Vacuum, pressure, or conductivity can be sensed in-line to determine when the product bag is empty. A disadvantage of the in-line sensing method is that it requires measuring devices that come in physical contact with the product. This is a potential source of contamination that requires proper cleaning and sanitation.

SUMMARY OF THE INVENTION

These and other problems are generally solved or circumvented, and technical advantages are generally achieved, by preferred embodiments of the present invention, which include a system and methods for dispensing liquid in a sanitary manner, determining the quantity of remaining liquid, and utilizing nozzles limiting exposure of the liquid to the external environment.

In accordance with a preferred embodiment of the present invention, a system for dispensing a liquid beverage comprises a pressure sealed chamber having an interior environment, a compressible container containing the liquid beverage, the compressible container disposed inside of the sealed chamber, wherein the compressible container isolates the liquid beverage from the sealed chamber interior environment, an outlet for dispensing the liquid beverage in the compressible container, a gas source providing gaseous pressure in the sealed chamber, the gaseous pressure exerting force on an exterior surface of the compressible container, a pressure sensor disposed within the sealed chamber interior environment, and an electronic controller controlling the gas source based on input from the pressure sensor.

In accordance with another preferred embodiment of the present invention, a system for dispensing a liquid beverage system comprises a gas-tight chamber having an interior environment, a compressible container containing the liquid beverage, the compressible container disposed inside of the gas-tight chamber, wherein the compressible container isolates the liquid beverage from the gas-tight chamber interior environment, a nozzle for dispensing the liquid beverage in the compressible container, wherein the nozzle seals the liquid beverage from an external environment when the nozzle is closed and minimizes a surface area of surfaces exposed to both the liquid beverage and the external environment, a gas source providing gaseous pressure in the gas-tight chamber, the gaseous pressure exerting force on an external surface of the compressible container, a pressure sensor disposed within the gas-tight chamber interior environment, a temperature sensor disposed within the gas-tight chamber interior environment, and an electronic controller controlling the gas source based on input from the pressure sensor and the temperature sensor.

In accordance with another preferred embodiment of the present invention, a nozzle for dispensing a liquid comprises a nozzle adapter having a cylindrical inner surface, a nozzle tip comprising an outer surface, an inner surface having a helical groove, and a top end rotatably coupled to the nozzle adapter cylindrical inner surface, and a plunger disposed within the nozzle tip, the plunger comprising a body having a cylindrical outer surface, a top end, a tapered lower end that mates with a bottom of the nozzle tip inner surface to form a liquid tight seal between the plunger and the nozzle tip when the nozzle is closed, and at least one projection along the body outer surface between the top end and the lower end keyed to fit within the helical groove of the nozzle tip, wherein rotational motion of the nozzle tip causes axial motion of the plunger relative to the nozzle adapter without appreciable axial motion of the nozzle tip relative to the nozzle adapter.

In accordance with another preferred embodiment of the present invention, a method for operating a nozzle, wherein the nozzle comprises a nozzle tip with a tapered cavity and a plunger with a tapered end disposed within the nozzle tip, comprises rotating the nozzle tip in a first rotational direction to move the plunger in a first axial direction, thereby opening the nozzle and dispensing a liquid, and rotating the nozzle tip in a second rotational direction opposite the first rotational direction to move the plunger in a second axial direction opposite the first axial direction, thereby closing the nozzle and forming a liquid tight seal.

In accordance with another preferred embodiment of the present invention, a method for dispensing a liquid comprises measuring the temperature inside a chamber, the chamber containing a membrane having the liquid to be dispensed, measuring a first pressure inside the chamber introducing an amount of gas inside the chamber after measuring the first pressure, measuring a second pressure inside the chamber after introducing the amount of gas, and adjusting the pressure in the chamber to dispense the liquid at a desired flow rate after measuring the second pressure.

In accordance with another preferred embodiment of the present invention, a method for dispensing a liquid beverage comprises measuring the temperature inside a chamber containing a compressible container having a liquid to be dispensed, measuring a first pressure inside the chamber, introducing an amount of air inside the chamber by running an air pump for a predetermined period of time after the measuring the first pressure, measuring a second pressure inside the chamber after the introducing the amount of air, adjusting the pressure inside the chamber to dispense the liquid beverage at a desired flow rate after the measuring the second pressure, opening a nozzle, dispensing a liquid beverage out of the nozzle, closing the nozzle, and repeating the adjusting the pressure inside the chamber to dispense the liquid at a desired flow rate.

In accordance with another preferred embodiment of the present invention, a method for determining a volume of a liquid in a container comprises measuring a temperature inside a sealed chamber containing the container of the liquid, measuring a first pressure inside the chamber, introducing an amount of gas into the chamber after the measuring the first pressure, measuring a second pressure inside the chamber after the introducing the amount of gas, and, after the measuring the second pressure, determining the volume according to the equation $VP=VC-(n_\Delta*R*T)/(P2-P1)$, where $n_\Delta$ is the amount of gas introduced into the chamber between the first measuring and the second measuring, R is a gas constant, T is the measured temperature of the chamber, $P_1$ is the first measured pressure, $P_2$ is the second measured pressure, and $V_C$ is a volume of the chamber.

In accordance with another preferred embodiment of the present invention, a system for dispensing a liquid beverage comprises a source of a liquid beverage, the source being under pressure, a nozzle coupled to the source, wherein the pressure causes the liquid beverage to flow from the source to the nozzle when the nozzle is in an open position, and a hat valve attached to the nozzle, wherein the hat valve prevents flow of the liquid beverage from the nozzle to the source.

In accordance with another preferred embodiment of the present invention, a method for dispensing a liquid beverage comprises pressurizing a source of a liquid beverage, the source of the liquid beverage coupled to a nozzle comprising a hat valve separating the source of the liquid beverage from an interior of the nozzle, opening the nozzle, wherein the opening comprises opening the hat valve, wherein the liquid beverage flows past the hat valve through the nozzle, and closing the nozzle, wherein the closing comprises closing the hat valve.

In accordance with another preferred embodiment of the present invention, a pressurized beverage dispensing system comprises a pressurized gas source, and a source of a liquid beverage contained within a bag-in-box container, the bag-in-box container comprising a flexible fluid container disposed within a box, wherein the box comprises outer walls and a vent hole disposed in an outer wall, and wherein pressurized gas from the pressurized gas source exerts pressure on the source of the liquid beverage.

In accordance with another preferred embodiment of the present invention, a bag-in-box container for storing and dispensing a liquid beverage comprises a box disposed within a pressure-sealed chamber, the box comprising an opening through which pressurized gas can pass, a flexible fluid container disposed within the box, wherein gas pressure exerted on the surface of the flexible fluid container is transferred to contents of the flexible fluid container via flexible walls of the flexible fluid container.

In accordance with another preferred embodiment of the present invention, a method for operating a beverage dispenser comprises installing a bag-in-box container in a pressure-sealed chamber in the beverage dispenser, the bag-in-box container comprising a liner disposed within a box, wherein a liquid beverage is contained within the liner, pressurizing the chamber, and dispensing the liquid beverage.

In accordance with another preferred embodiment of the present invention, a nozzle for dispensing a liquid comprises a nozzle adapter having a barbed fitting for attaching to a tube, a nozzle tip comprising an outer surface, an inner surface having a helical groove, and a top end rotatably coupled to the nozzle adapter, and a plunger disposed within the nozzle tip, the plunger comprising a body having a cylindrical outer surface, a top end, a tapered lower end that mates with a bottom end of the nozzle to form a liquid tight seal between the plunger and the nozzle tip when the nozzle is closed, and at least one projection along the body outer surface between the top end and the bottom end keyed to fit within the helical groove of the inner surface of the nozzle tip, wherein rotational motion of the nozzle tip causes axial motion of the plunger relative to the nozzle adapter without appreciable axial motion of the nozzle tip relative to the barbed fitting.

In accordance with another preferred embodiment of the present invention, a system for dispensing a liquid comprises a product chamber, a first product container comprising a liquid disposed within the product chamber, wherein the first product container comprises a path for a gas pressure to be exerted on the liquid, and wherein a height of the first product container is less than a width and a length of the product chamber, a gas pressure source coupled to the product chamber, wherein the gas pressure source exerts the gas pressure on the liquid to be dispensed, and an outlet disposed on the first product container through which the liquid is dispensed.

In accordance with another preferred embodiment of the present invention, a method for dispensing a liquid beverage comprises applying a gas pressure to an inside of a chamber, wherein the gas pressure is transferred to a liquid beverage contained within a container disposed in the chamber, and dispensing the liquid beverage from the container, wherein the container comprises a height less than each of a width and a length of the chamber.

In accordance with another preferred embodiment of the present invention, a system for dispensing a liquid beverage comprises a storage container comprising a liquid beverage, the storage container disposed within a pressure-sealed chamber, a tube, wherein a first end of the tube is coupled to the storage container, whereby the liquid beverage can pass from the storage container through the tube, a tube chute, wherein the tube is disposed within the tube chute, and a nozzle coupled to a second end of the tube opposite the first end of the tube.

In accordance with another preferred embodiment of the present invention, a system for dispensing a liquid beverage comprises a first liquid storage container disposed within a first chamber, the first liquid storage container comprising an outlet for dispensing the liquid beverage, a second liquid storage container disposed within a second chamber, the second storage container comprising an outlet for dispensing the liquid beverage, a first check valve coupled to the first liquid storage container outlet, wherein the first check valve is oriented so that the liquid beverage is prevented from flowing back toward the first liquid storage container, a second check valve coupled to the second liquid storage container outlet, wherein the second check valve is oriented so that the liquid beverage is prevented from flowing back toward the second liquid storage container, and a tee fitting comprising a first input port coupled to the first check valve, a second input port coupled to the second check valve, and an exit port.

In accordance with another preferred embodiment of the present invention, a method for dispensing a liquid beverage comprises dispensing a liquid stored in a first container within a first chamber at a first flow rate until the first container is substantially empty, after the first container is almost empty, dispensing a liquid stored in a second container within a second chamber at a second flow rate while dispensing the remaining liquid in the first container at a third flow rate until the first container is empty, wherein the liquid flow from the first container is combined with a liquid flow from the second container to form a combined flow, the combined flow comprising a fourth flow rate, and after the first container is empty, dispensing the liquid from the second container within the second chamber at a fifth flow rate.

In accordance with another preferred embodiment of the present invention, a tube set for a beverage dispensing machine comprises a fluid tee connector comprising a first port, a second port and a third port, a first tube attached to the first port of the fluid tee connector, a second tube attached to the second port of the fluid tee connector, and a third tube attached to the third port of the fluid tee connector.

In accordance with another preferred embodiment of the present invention, a nozzle for dispensing a liquid comprises a nozzle tip comprising an outer surface and an inner surface, and a plunger disposed axially within the nozzle tip, wherein liquid is prevented from flowing through the nozzle when the plunger is in a closed position, and wherein liquid flows through the nozzle when the plunger is in an open position, and the plunger has a tip comprising a shape that redirects transaxial fluid flow to axial fluid flow.

In accordance with another preferred embodiment of the present invention, a liquid storage system comprises a chamber, a pressurized gas source coupled to the chamber, a liquid storage container disposed inside the chamber, wherein the liquid storage container comprises an orifice, and wherein the pressurized gas source imparts a pressure on liquid stored within the liquid storage container, and a dispensing nozzle coupled to the orifice, the dispensing nozzle dimensioned to couple with a check valve disposed on a serving container.

In accordance with another preferred embodiment of the present invention, a method for dispensing a beverage comprises placing a serving container on a nozzle disposed on a counter-top, wherein a check valve disposed on a bottom of the serving container mates with the nozzle, and filling the serving container with a liquid beverage, wherein the liquid beverage flows from a pressurized container through the nozzle and into the serving container.

In accordance with another preferred embodiment of the present invention, a method for dispensing a beverage comprises dispensing relative proportions of water, cream, and concentrated skim milk for making a first dispensed beverage, wherein the dispensing comprises dispensing a first amount of water, dispensing a second amount of cream, and dispensing a third amount of concentrated skim milk, and combining the water, the cream, and the concentrated skim milk of the first dispensed beverage.

In accordance with another preferred embodiment of the present invention, a system for dispensing a liquid comprises a first liquid source, the first liquid source being under a first pressure, a second liquid source, the second liquid source being under a second pressure, and a combiner comprising a first input port coupled to the first liquid source with a first connection, a second input port coupled to the second liquid source with a second connection, and an output port, wherein liquids entering the first input port combine with liquids entering the second input port to form a combined liquid, and wherein the combined liquid exits the output port, wherein flow rates of the first and second liquid sources can be adjusted by adjusting the first and second pressures, and wherein the ratio of the relative concentration of the first and second liquids at the output port is related to the ratio of the first and second flow rates.

In accordance with another preferred embodiment of the present invention, a nozzle for dispensing a plurality of liquids comprises a nozzle adapter, the nozzle adapter comprising an outer input port and an inner input port, an upper nozzle tip rotatably coupled to the nozzle adapter, the upper nozzle tip comprising an inner surface and an outer surface, a lower nozzle tip rotatably coupled to the upper nozzle tip, the lower nozzle tip comprising an inner surface and an outer surface, an outer plunger disposed within the upper lower nozzle tip, the outer plunger comprising an inner surface and an outer surface, and an inner plunger disposed within the outer plunger, the inner plunger comprising an inner surface and an outer surface.

In accordance with another preferred embodiment of the present invention, a system for a nozzle comprises a plurality of outer components, wherein each outer component is capable of independent rotational motion, a plurality of plungers, wherein an axial position of one of the plurality of plungers is controlled by a rotational position of one of the plurality of outer components, and a plurality of fluid paths, wherein a flow of one of the fluid paths is dependent on the axial position of one of the plurality of plungers.

In accordance with another preferred embodiment of the present invention, a nozzle for dispensing a liquid comprising a nozzle adapter having a cylindrical inner surface, is provided. A nozzle tip comprises an outer surface, an inner surface having a helical groove, and a top end rotatably coupled to the nozzle adapter cylindrical inner surface. A plunger is disposed within the nozzle tip, the plunger comprising a body having a cylindrical outer surface, a top end, a tapered lower end that mates with a bottom of the nozzle tip inner surface to form a liquid tight seal between the plunger and the nozzle tip when the nozzle is closed, and at least one projection along the body outer surface between the top end and the lower end keyed to fit within the helical groove of the nozzle tip, wherein the plunger and the nozzle tip are configured so that rotational motion of the nozzle tip causes axial motion of the plunger relative to the nozzle adapter without appreciable axial motion of the nozzle tip relative to the nozzle adapter.

In accordance with another preferred embodiment of the present invention, a nozzle for dispensing a liquid comprising a nozzle adapter having a barbed fitting for attaching to a tube, is provided. A nozzle tip comprises an outer surface, an inner surface having a helical groove, and a top end rotatably coupled to the nozzle adapter. A plunger is disposed within the nozzle tip, the plunger comprising a body having a cylindrical outer surface, a top end, a tapered lower end that mates with a bottom end of the nozzle to form a liquid tight seal between the plunger and the nozzle tip when the nozzle is closed, and at least one projection along the body outer surface between the top end of the plunger and the bottom end of the nozzle keyed to fit within the helical groove of the inner surface of the nozzle tip, wherein the nozzle tip, the nozzle adapter, and the plunger are movably coupled such that rotational motion of the nozzle tip causes axial motion of the plunger relative to the nozzle adapter without appreciable axial motion of the nozzle tip relative to the barbed fitting.

In accordance with another preferred embodiment of the present invention, a nozzle for dispensing liquid comprising a nozzle adapter having an inner surface, the inner surface of the nozzle adapter comprising a guide track and a channel separated from the guide track is provided. A nozzle tip has a first end adjacent to the nozzle adapter and a second end facing away from the nozzle adapter, the nozzle tip having a projection located at least partially within the channel of the nozzle adapter and also having an inner surface, the inner surface of the nozzle tip comprising a helical rotation track. A plunger is located at least partially adjacent to the inner surface of the nozzle tip and at least partially adjacent to the inner surface of the nozzle adapter, wherein the plunger comprises a rotation pin that is at least partially located within the helical rotation track of the nozzle tip, a ridge that is at least partially located within the guide track of the nozzle adapter, the ridge movable in the guide track between a first position and a second position, the first position being closer to the second end of the nozzle tip than the second position, and a plunger end within the nozzle tip that forms a seal with the nozzle tip when the ridge is in the first position.

An advantage of a preferred embodiment of the present invention is that generally there is no external contact with the liquid food product except for at the nozzle tip. Such a lack of external contact provides a sanitary environment and decreases the risk of bacterial contamination of the liquid food product. The liquid food product is further protected from bacterial contamination because the propellant gas acts against the walls of the bag containing the liquid food product and does not come in contact with the liquid food product to be dispensed.

Further advantages of a preferred embodiment of the present invention are related to the dispensed beverage pour quality. The dispensed product's flow rate generally remains constant regardless of the product level and regardless of the beverage or liquid food product's viscosity. The pour is smooth, and there is no pulsation resulting from the pumping system as there would be with a peristaltic or diaphragm pumping system. Furthermore, the flow rate can be varied to specific values.

Yet another advantage of a preferred embodiment of the present invention is that the volume of the remaining product can be simply and accurately determined without any additional scales or sensors, and without requiring any additional cleaning steps as would be required by systems in which the dispensed product comes in physical contact with the measuring device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 28*a*-28*d* illustrate an embodiment of a liquid tee;

FIGS. 39*a* and 39*b* illustrate an embodiment system for an aseptic nozzle;

FIG. 40 illustrates an embodiment nozzle system; and

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a beverage dispensing machine. The invention may also be applied, however, to other dispensing systems, or other systems with sanitary or fluid measurement requirements.

Figure 1A:
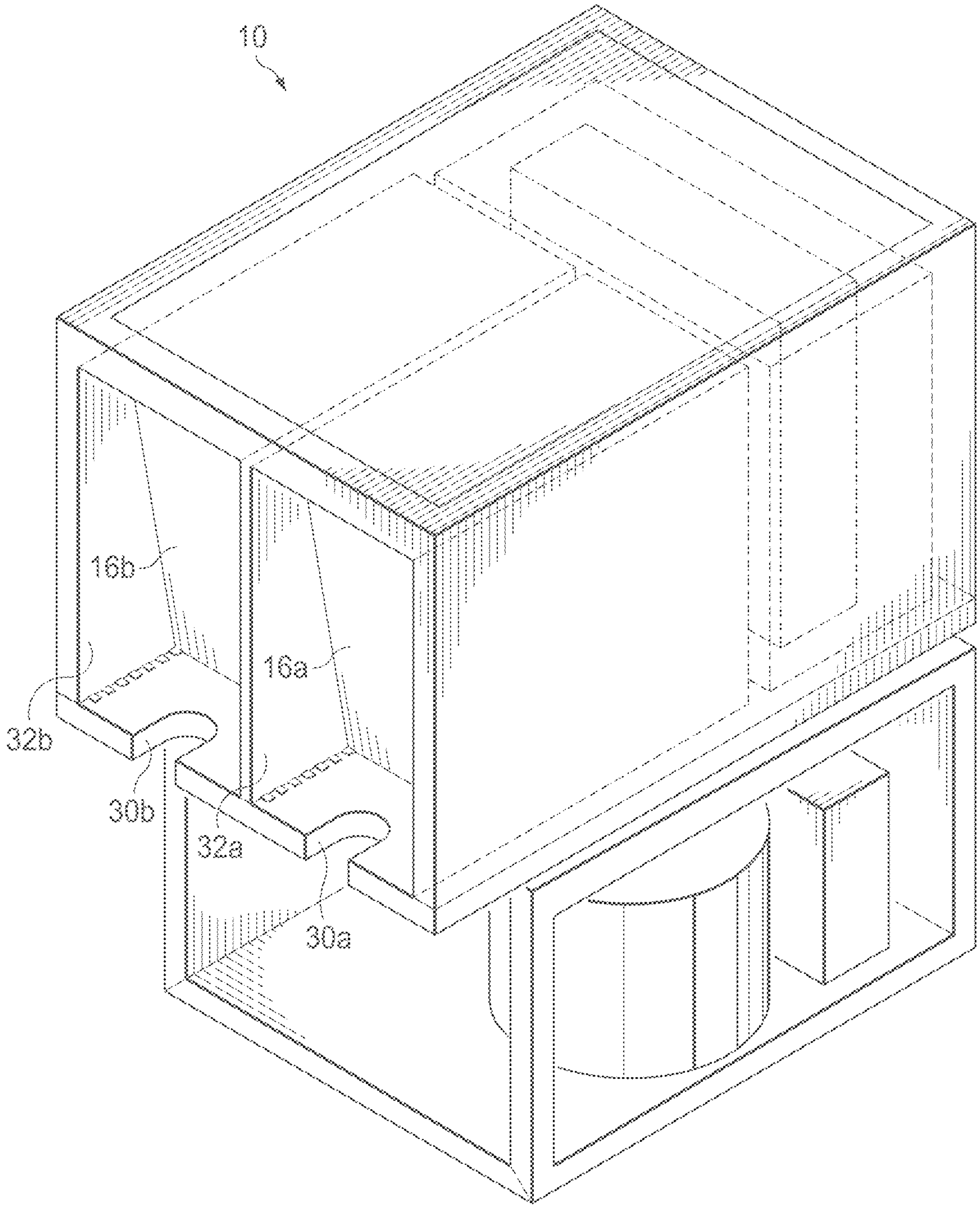
FIGS. 1*a*-1*d* illustrate one embodiment of a beverage dispensing system.

In illustration of one embodiment of the present invention, FIG. 1*a* shows a three-dimensional view of a beverage dispensing machine 10. The liquid product is stored in a bag (not shown) disposed within boxes 16*a* and 16*b*. The liquid product could be milk, juice, beverage concentrate, or other liquids. The liquid product is usually sold by the box, and the beverage dispensing machine operator will replace the bag-in-box with a new one when the liquid product has been depleted. Boxes 16*a* and 16*b* are placed within a respective product chamber 32*a* or 32*b*. Most commercially available bag-in-box products are shipped in cardboard boxes inside of which the product is contained in a bag liner usually made of a flexible plastic material which is capable of being heat sealed together. In a preferred embodiment, the liner is made up of four panels. The first and second panels are made of linear low density polyethylene and the third and fourth panels are made of metallized polyester laminated to polyethylene, however, other materials, including polyolefin, polypropylene, polyvinyl chloride, polyester, nylon, and the like, including co-extruded and laminated materials, which exhibit similar characteristics, may be used. The product is dispensed through a respective product outlet 30*a* or 30*b*, usually comprising a spout or a flexible plastic tube.

Figure 1B:
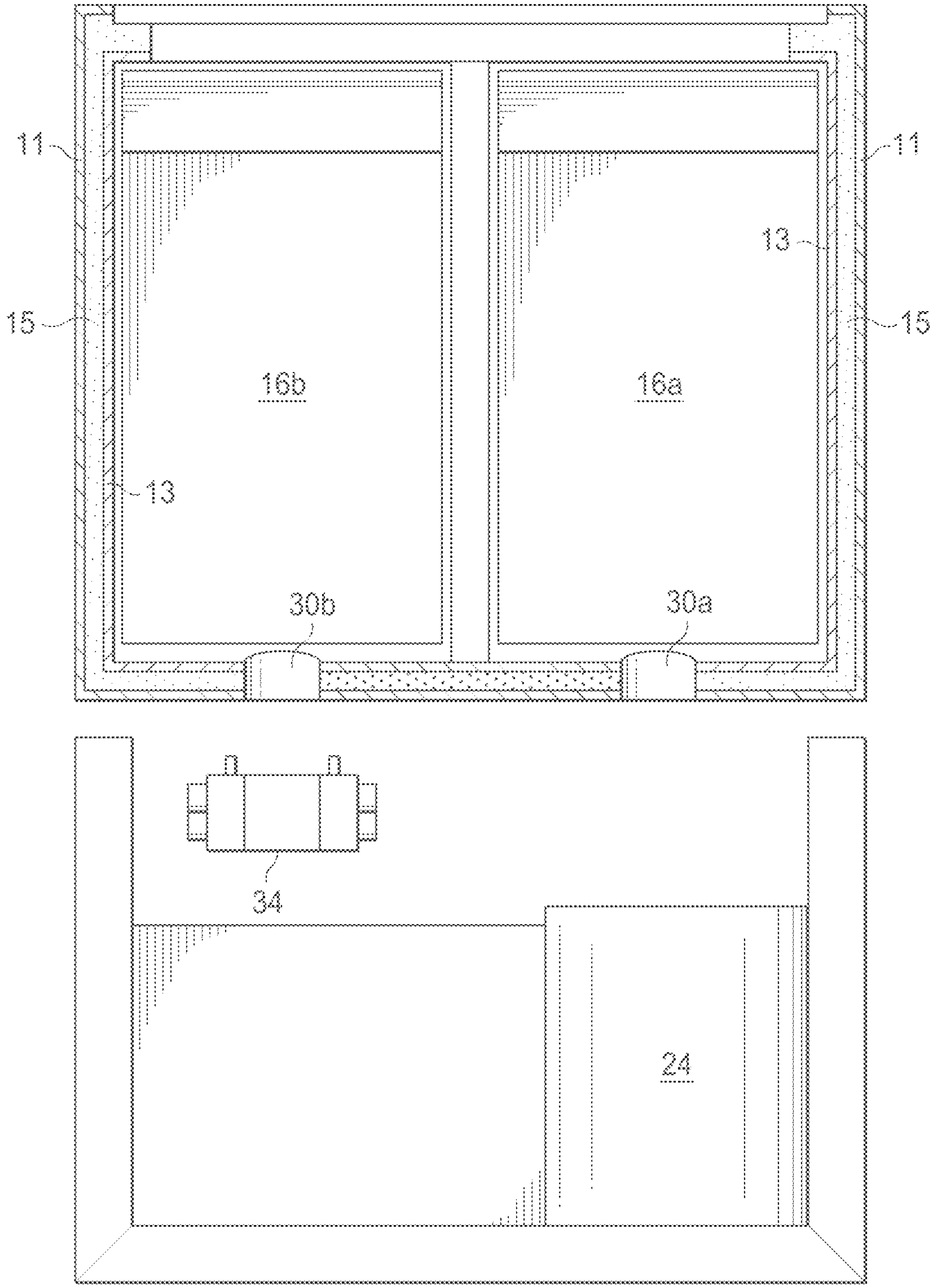

Turning to FIG. 1*b*, the product chambers 32*a* and 32*b* (FIG. 1) are pressurized by pump 34, and the product is dispensed through outlets 30*a* and 30*b*. Product chambers 32*a* and 32*b* are defined by inner walls 13 made of stainless steel in the present embodiment, but, in other embodiments, they can be made of high density polyethylene. Between outer wall 11 and inner wall 13 is a layer of foam insulation 15. In preferred embodiments of the present invention, foam sheets or injected foam may be used. In a preferred embodiment of the present invention, polyurethane foam is used, although other types of foam such as pnenolformaldehyde may be used in other embodiments. Alternatively, non-foam forms of insulation such as evacuated air packets may be used also. Foam insulation 15 serves a number of purposes. First, foam insulation 15 acts as thermal insulation to keep the product warm or cold. Second, foam insulation 15 provides mechanical support to inner walls 13 which, in some embodiments, may be flexible and wobbly without the support. Without support, inner walls 13 may be prone to "tin canning" when pressurized. Because the product volume determination, discussed herein below, uses the inner volume of the chamber as a constant in the calculation, making inner walls 13 more rigid using foam insulation 15 will provide a more accurate estimate of the product volume.

Outer wall 11, in a preferred embodiment, is made from stainless steel, but any other appropriate material such as powder-coated steel or high density polyethylene may be used.

Figure 1C:
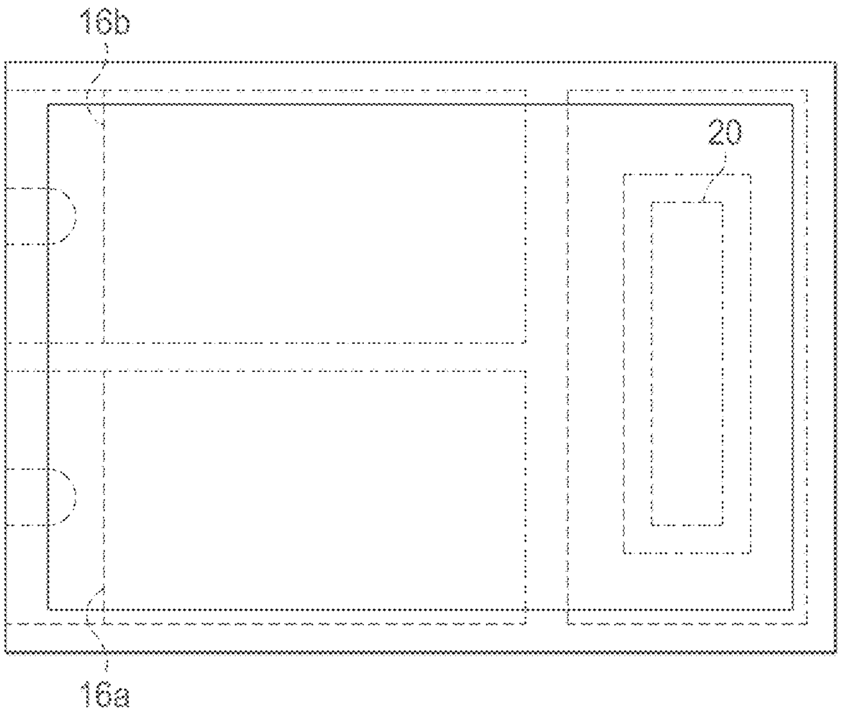
Figure 1D:
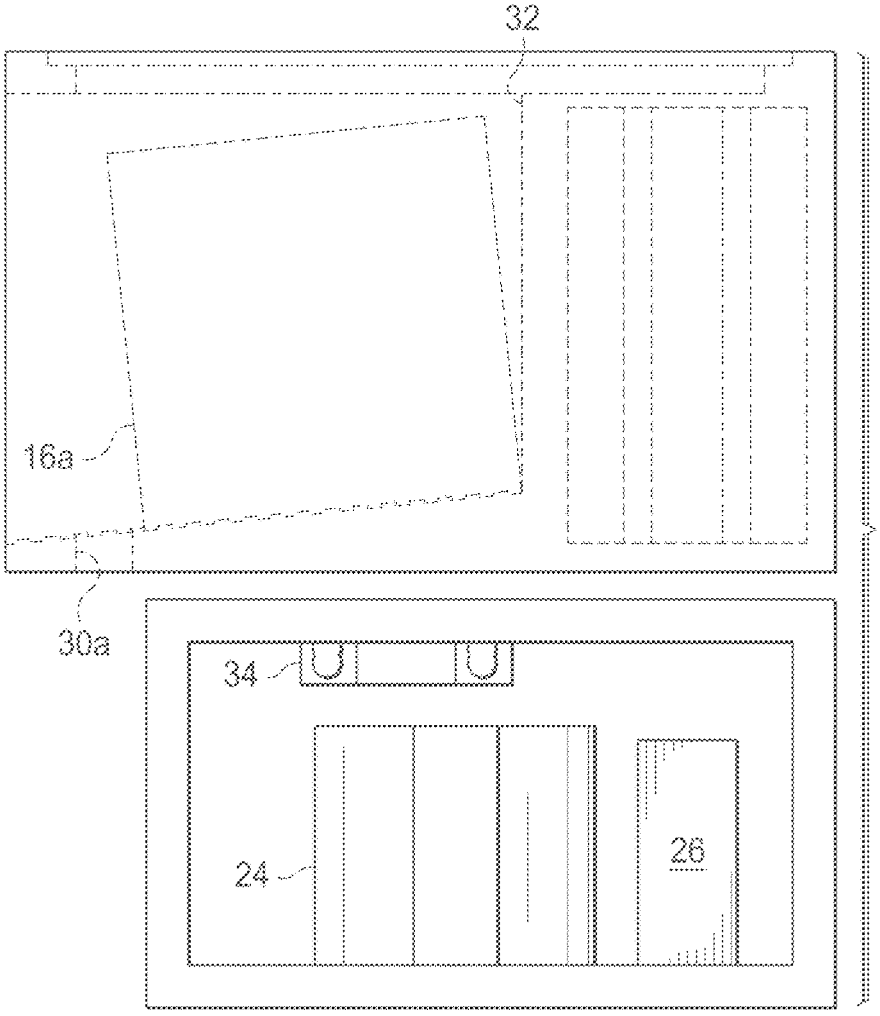

Referencing FIGS. 1*b*, 1*c* and 1*d*, the product is kept cold in part by a refrigeration system consisting in part of a compressor 24, a condenser 26, a chilled water tank 18 (not shown), and an evaporator 20. The refrigeration system operates in a manner consistent with other refrigeration systems used in the beverage dispensing industry.

Figure 2:
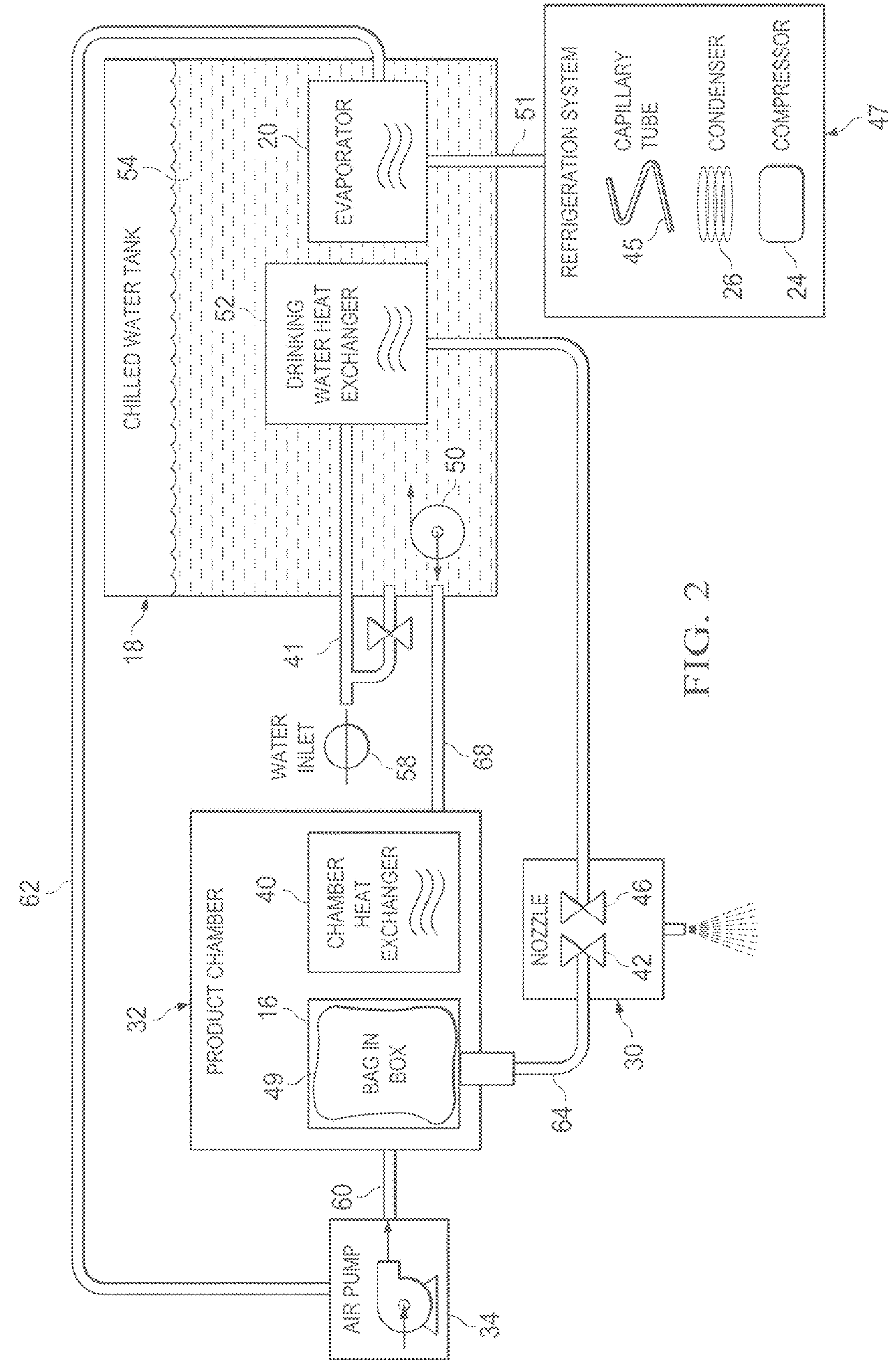
FIG. 2 is a block diagram of the fluid and gas components of a beverage dispensing system.

The operation of a gas, fluid and refrigeration system is shown in FIG. 2. A liquid product is stored in bag 49 contained within box 16, which is contained within a pressurized product chamber 32. This combination of bag 49 and box 16 is commonly referred to within the beverage dispensing industry as bag-in-box. Box 16 provides structure for handling and shipping, and bag 49 provides a fluid liner in which to store the liquid product. Pressurized systems usually exert pressure on a fluid directly without a liner or on a membrane separating the pressurized air from the liquid. Other methods, for example, those used in the medical industry, include hanging a bag from a bracket and then applying pressure to the bag.

Figure 3A:
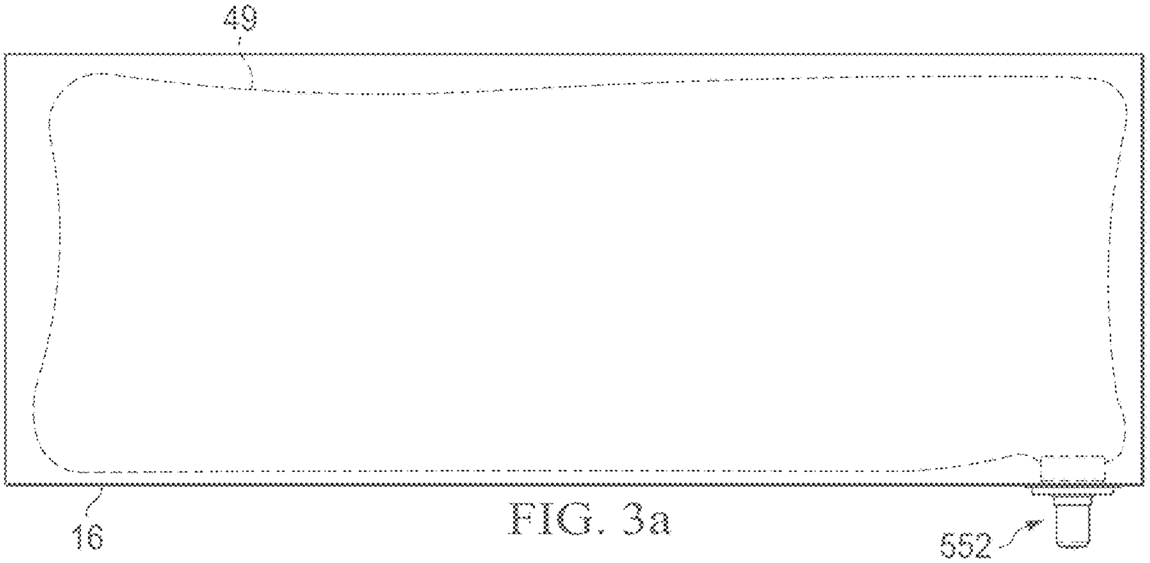
FIGS. 3*a*-3*d* illustrate an embodiment of a bag-in-box beverage container.
Figure 3B:
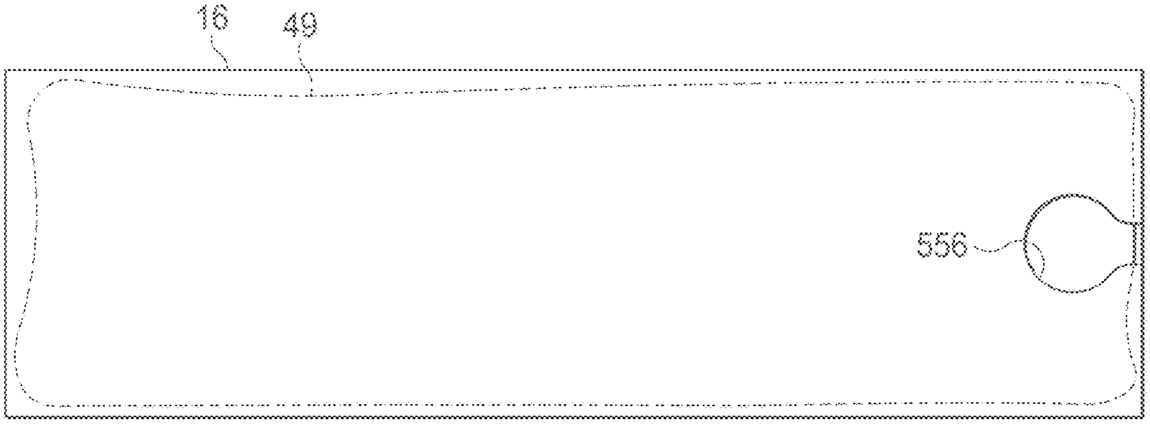
Figure 3C:
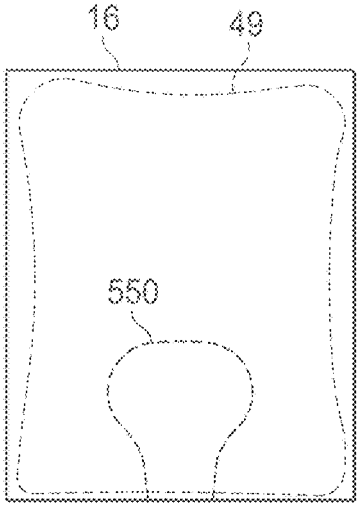
Figure 3D:
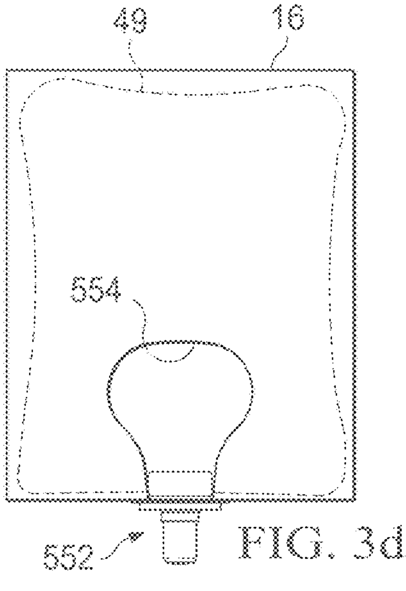

In a preferred embodiment of the invention, FIGS. 3*a*-3*d* illustrate a system and method for a packaging integration with a pressurized dispenser for the beverage dispensing industry. An integrated bag 49 in box 16 package is manufactured such that it can be punctured or torn open and used in a pressured chamber. A spout nozzle 552 is located within a box opening 554 to allow for easy attachment to a beverage dispensing system. When box 16 is sold and transported, spout nozzle 552 resides behind a perforated tear-out 550 (FIG. 3*c*). When the bag-in-box is ready to be attached to a beverage dispensing machine, perforated tear-out 550 is removed from the box, and spout 552 is placed within tear-out section 556 (FIG. 3*b*). Opening 554 (FIG. 3*d*) and the structure of box 16 allow pressure to accurately impact the fluid liner container or bag 49 inside box 16. In alternative embodiments, pressure can be provided to bag 49 through vent holes, or other means of providing pressure to bag 49. These embodiments may be used with any compatible embodiment or combination of embodiments disclosed herein, such as the embodiments disclosed in FIGS. 1-2, 23-27, 30 and 37, for example.

Turning back to FIG. 2, air pump 34 provides air pressure to bag 49 via chamber port 60 and through vent holes or tear-outs (not shown) in box 16. Air pressure squeezes bag 49 and pushes the liquid product through tube 64 to nozzle 30, a nozzle within nozzle valve actuator assembly 42. Chilled water emanating from water inlet 58 travels through water inlet pipe 41, drinking water heat exchanger 52, chilled drinking water pipe 66 and finally through drinking water valve 46. The water can either be mixed with the liquid product if valve 46 is open while the liquid product is being dispensed, or the drinking water can be used to clean or wash nozzle 30.

In a preferred embodiment of the present invention, refrigeration system 47 consists of a compressor 24, a condenser 26, and a capillary tube 45. Refrigerant travels through re-circulating refrigerant line 51 and through evaporator 20 within chilled water tank 18. Cold air chilled by evaporator 20 is sent from evaporator 20 to air pump 34 through a chilled air duct 62. The cold air prevents heat from entering product chamber 32 and thus ensures that the liquid product stays chilled during operation of air pump 34.

Chilled water tank 18 stores cold water 54 chilled by evaporator 20. Water pump 50 pumps cold water 54 from chilled water tank 18 to chamber heat exchanger 40 via re-circulating cooling water pipe 68 in order to keep product chamber 32 cool. Cold water 54 is also used to chill drinking water via drinking water heat exchanger 52. Alternatively, other methods of cooling product chamber 32 may be used, such as blowing air across a heat exchanger that has chilled water running through it. The resulting cold air may then be vented through product chamber 32 for cooling. Other methods of chilling the water may be used, such as implementing a direct heat exchanger by running a water line through an evaporator for direct cooling of the drinking water supply. In some embodiments, on the other hand, the water may be warmed through a water heater instead of chilled and used to deliver hot water to the liquid product to supply a hot product.

Figure 4:
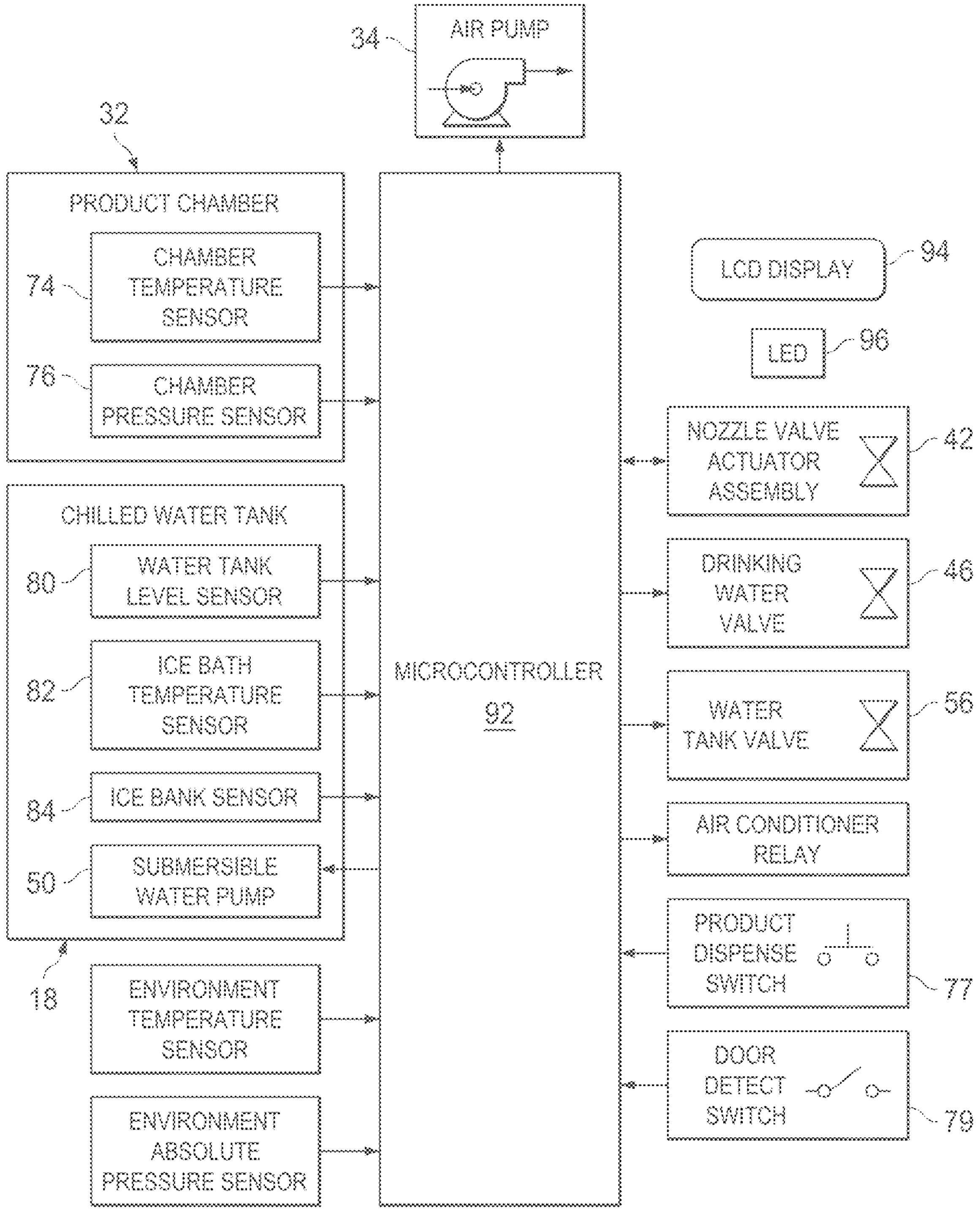
FIG. 4 is a block diagram showing the sensor and control interfaces of a system microcontroller.

A preferred embodiment of the present invention uses a microcontroller 92 to process sensor input and to control the operation of the beverage dispensing machine as shown in FIG. 4. Product chamber 32 contains a temperature sensor 74 and a pressure sensor 76 that provide sensor data to microcontroller 92. The data collected from temperature sensor 74 and pressure sensor 76 are used to provide feedback to maintain a constant flow rate and to monitor the system's performance.

Chilled water tank 18 contains a water tank level sensor 80, an ice bath temperature sensor 82, and an ice bank sensor 84. Ice bank sensor 84 measures the size of the ice buildup by measuring the change in conductivity in the region surrounding an ice bank sensing probe. The data from these sensors 80, 82 and 84 are used by the microcontroller 92 to maintain the proper temperature and water level within chilled water tank 18. Also within chilled water tank 18 is a submersible water pump 50 that pumps chilled water to product chamber 32 for cooling. Submersible water pump 50 is activated by microcontroller 92 in order to keep the temperature of product chamber 32 within a defined temperature range, typically between 32° F. and 40° F.

Microcontroller 92 is also used to control valves in the beverage dispensing system. Drinking water valve 46 is activated by microcontroller 92 whenever drinking water is dispensed either for dispensing as a beverage or for washing the nozzle, such as nozzle 30 of FIG. 2. Water tank valve 56 is activated by microcontroller 92 whenever the water level of chilled water tank 18 falls below a certain threshold as determined by water tank level sensor 80. Nozzle valve actuator assembly 42, on the other hand, has a bidirectional interface. Microcontroller 92 sends a signal which activates nozzle valve actuator assembly 42, and nozzle valve actuator assembly 42 sends valve position feedback to microcontroller 92. In one embodiment, nozzle valve actuator assembly 42 contains a valve drive motor and an optical position sensor that sends a signal back to microcontroller 92 indicating whether the valve is open. Normal operation of nozzle valve actuator assembly 42 would comprise microcontroller 92 activating the valve motor, waiting for the sensor to indicate that the valve is open, and then microcontroller 92 shutting off the valve. Alternatively, different valve control schemes could be used. In some embodiments, the position feedback of nozzle valve actuator assembly 42 can be used to allow the valve to be opened to a range of positions to help achieve varying desired flow rates. In other embodiments, valves that do not require feedback could be used, or valves that use non-optical position sensors, such as limit switches, could be used.

In a preferred embodiment of the present invention, microcontroller 92 also receives input from a product dispense switch 77 and a door detect switch 79. When product dispense switch 77 is pressed, microcontroller 92 starts a beverage dispensing sequence as discussed below. Door detect switch 79 signals microcontroller 92 that one of the doors or access panels on the beverage dispensing machine is open. This signal could be used to prevent the machine from dispensing product, or to articulate a warning signal.

Microcontroller 92 also can be configured to provide a user display such as an LCD display 94, one or more LEDs 96, or other user displays such as incandescent and fluorescent lights, electro-mechanical displays, CRTs, or other user displays. In other embodiments, the beverage dispensing machine may not have any user displays at all.

In a preferred embodiment of the present invention, microcontroller 92 is used to control the beverage dispenser. In other embodiments, however, a microprocessor, a computer, application specific integrated circuits, or any other device capable of controlling the system may be used.

Figure 5A:
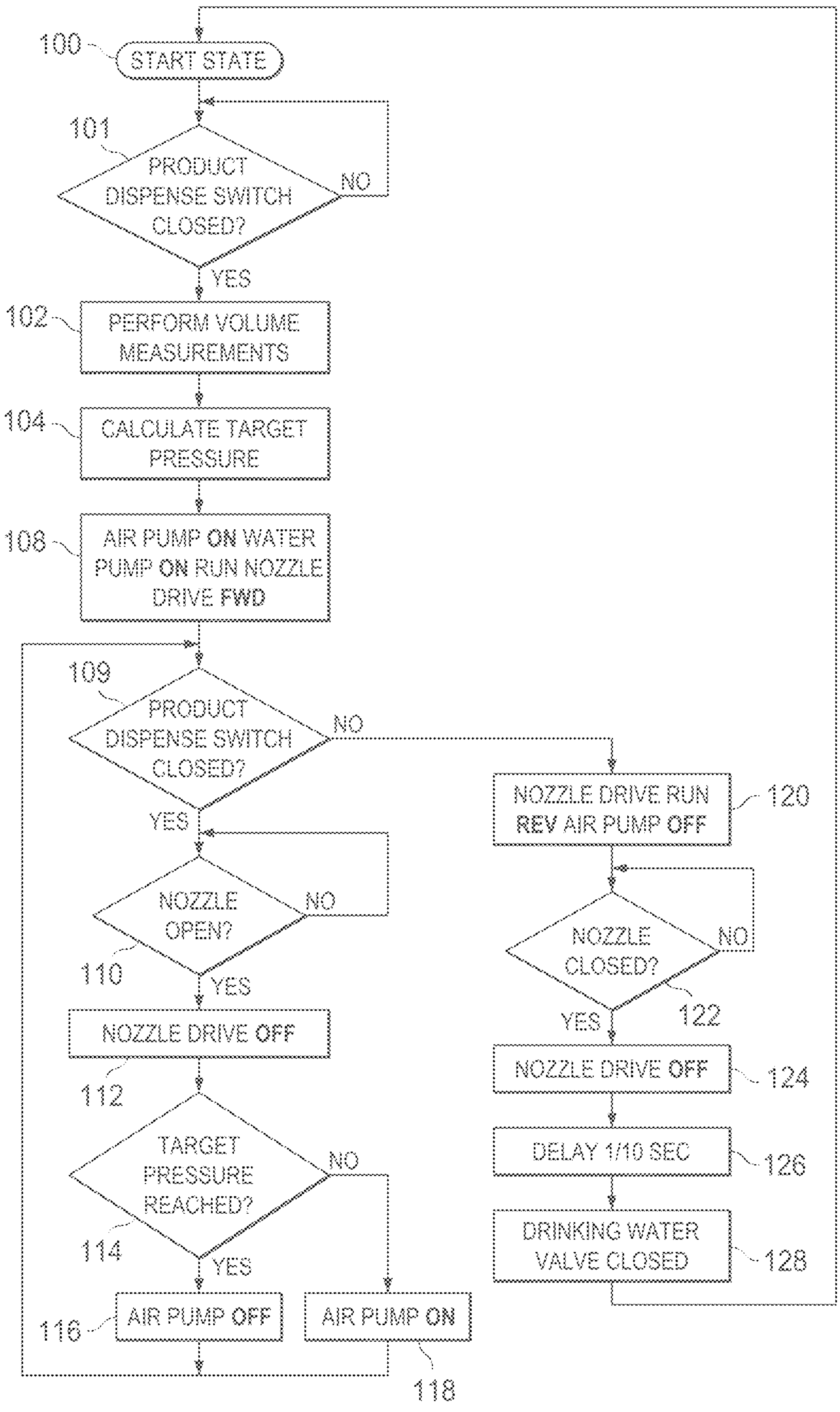
FIGS. 5*a* and 5*b* are flowcharts describing the operation of a beverage dispensing system.
Figure 5B:
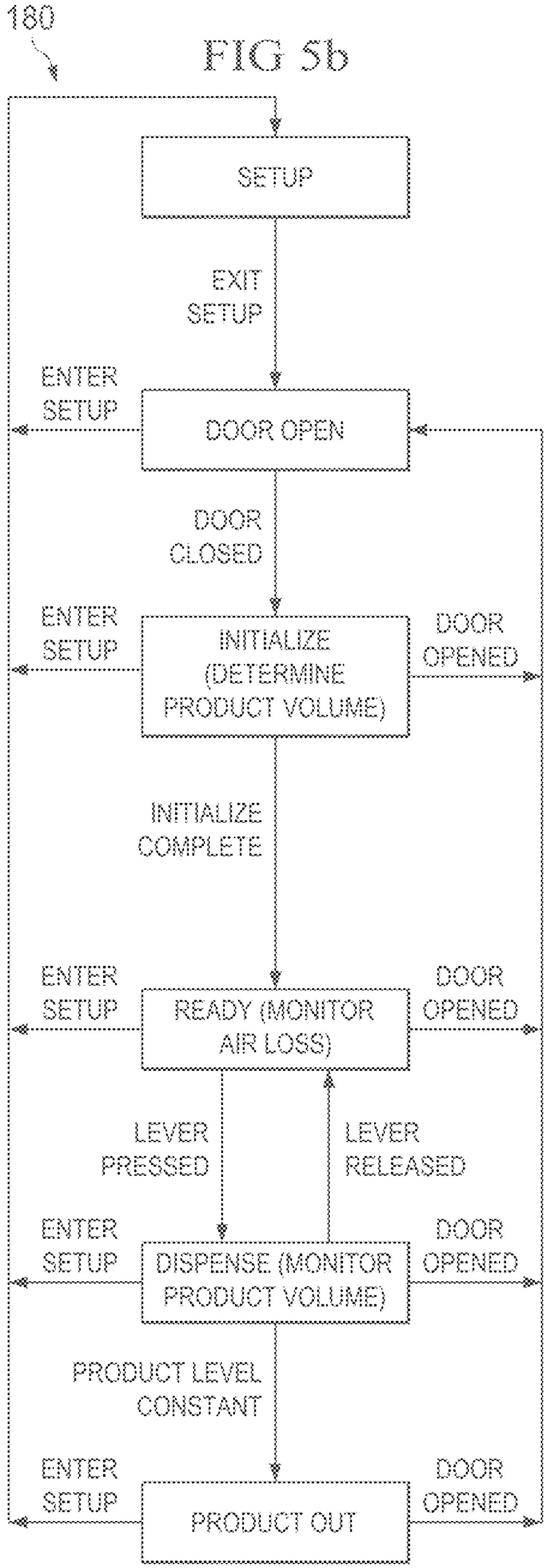
Figure 6A:
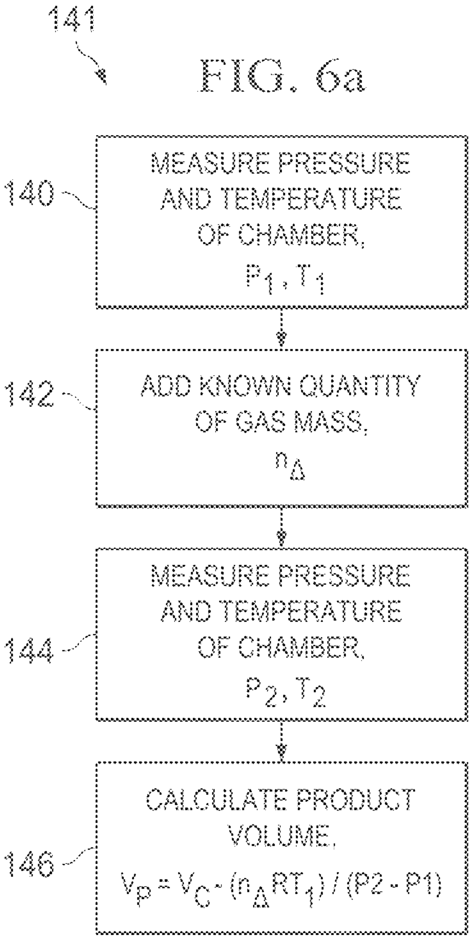
FIGS. 6*a* and 6*b* are flowcharts describing a product volume measurement procedure.
Figure 6B:
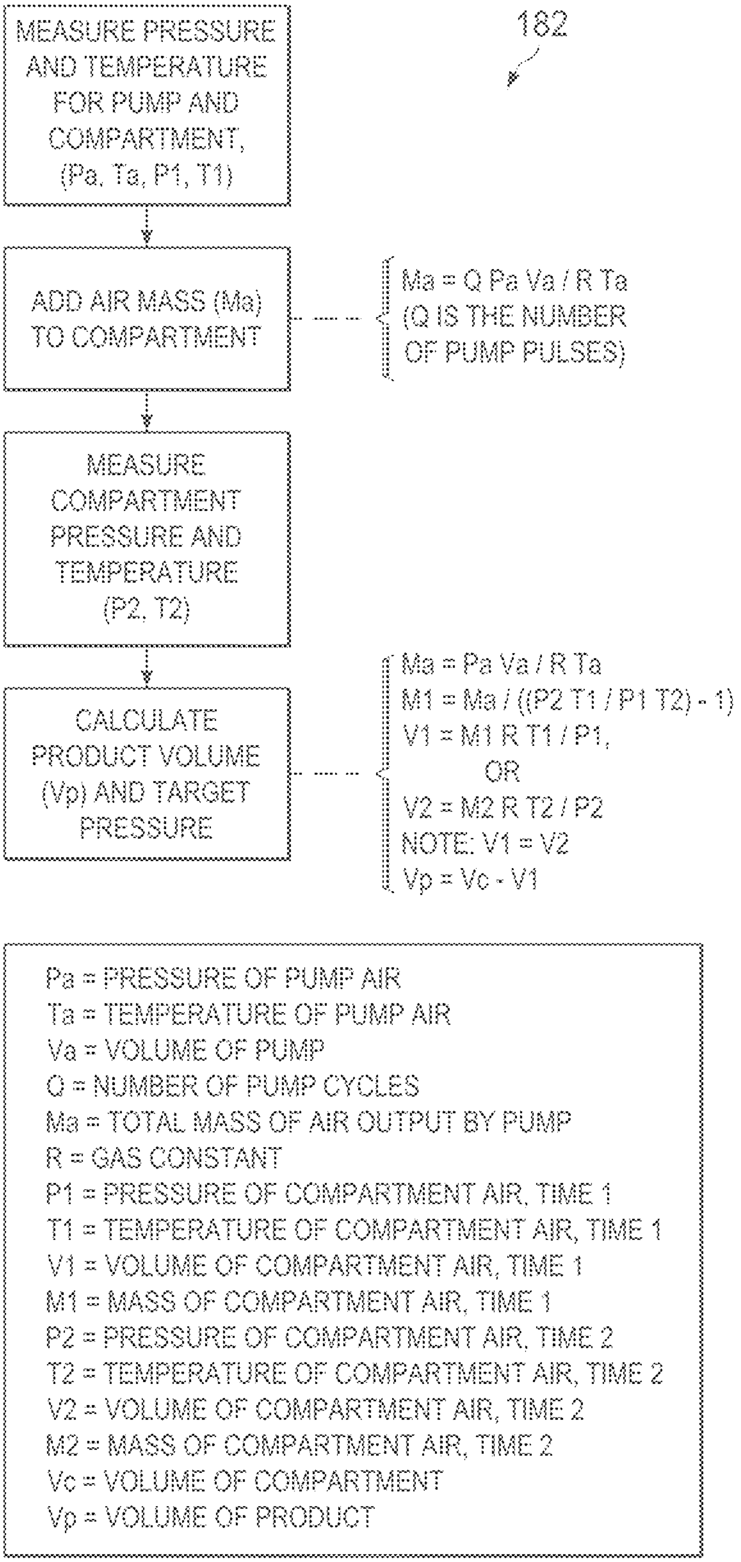
Figure 8:
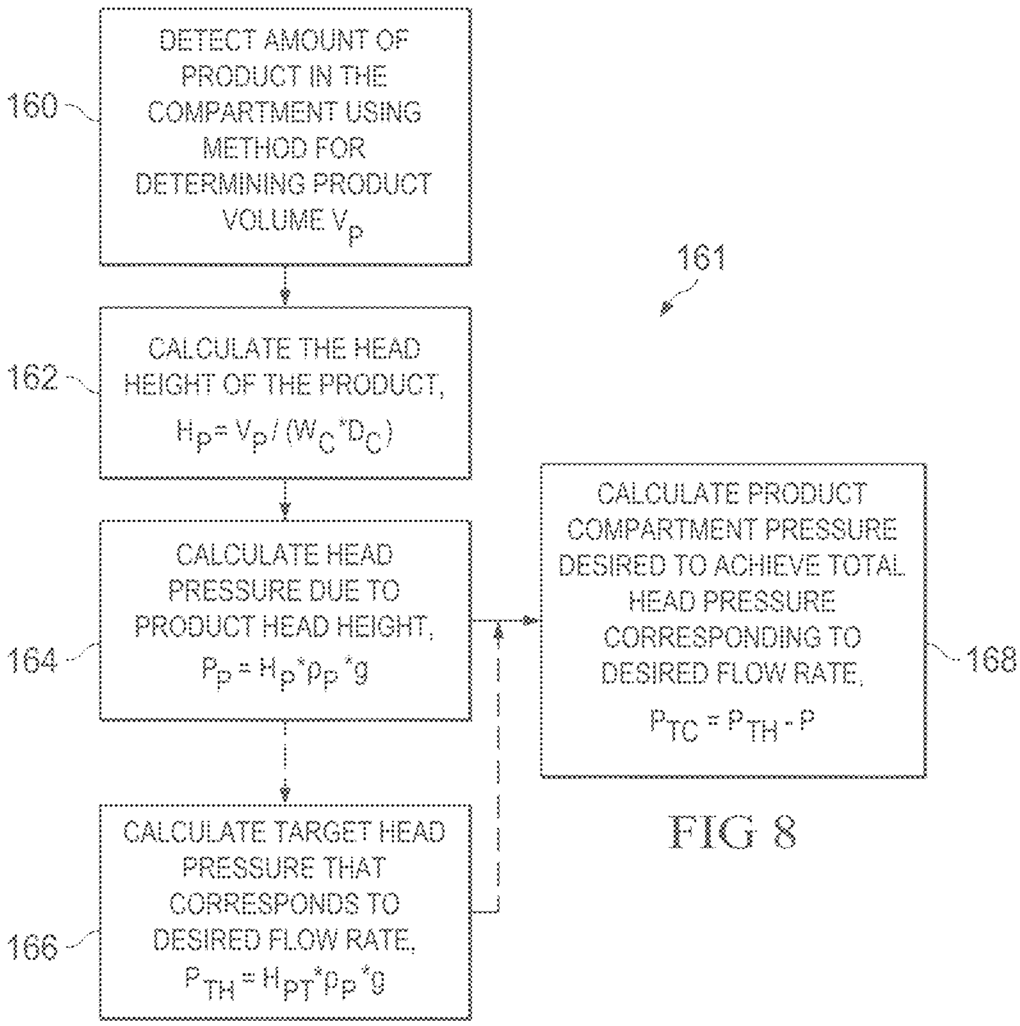
FIG. 8 is a flowchart describing a product compartment pressure calculation procedure.

FIG. 5*a* shows a control diagram for a preferred embodiment of the present invention. When power to the beverage dispenser is first applied, the program enters step 100, which is the start state. A microcontroller, such as microcontroller 92 of FIG. 4, then polls a product dispense switch, such as product dispense switch 77 of FIG. 4, in step 101 to determine if the product dispense switch is closed. If the microcontroller detects that the product dispense switch is closed, the product dispense sequence begins. First, a volume measurement is performed in step 102 as shown in FIG. 6*a* and as discussed below. Second, a product compartment pressure calculation is performed in step 104 as shown in FIG. 8 and as discussed below. Next, in step 108, an air pump, such as air pump 34 of FIG. 4, is turned on in order to pressurize a product chamber, such as product chamber 32 of FIG. 4, the drinking water valve, such as drinking water valve 46 of FIG. 4, is opened to provide water to mix with the dispensed liquid product, and a nozzle drive is run in a forward direction to open a nozzle valve actuator assembly, such as nozzle valve actuator assembly 42 of FIG. 4. In some embodiments, the drinking water valve may not be opened if an undiluted beverage is dispensed.

The microcontroller then determines whether the product dispense switch is still pressed in step 109. If the product dispense switch is pressed (yes to step 109), the microcontroller checks to see if the nozzle valve actuator assembly is open (step 110) via the bidirectional nozzle interface.

In a preferred embodiment, an optical sensor determines whether the nozzle valve actuator assembly is open in step 110. If the nozzle valve actuator assembly is not yet open (no to step 110, the microcontroller stays at step 110 until the nozzle valve actuator assembly is open. Once the nozzle valve actuator assembly is determined to be open (yes to step 110), the nozzle drive is shut off in step 112.

In step 114, after the nozzle has been opened, the microcontroller monitors the chamber pressure via a chamber pressure sensor, such as chamber pressure sensor 76 of FIG. 4. If the product compartment pressure has been reached (yes to step 114), the air pump is shut off in step 116. If the product compartment pressure has not been reached (no to step 114), however, the air pump remains on (step 118). After steps 116 and 118, the control routine goes back to step 109 and the microcontroller cycles through steps 109, 110, 112, 114 and 116 or 118 until the product dispense switch is opened (no to step 109).

Returning to step 109, if the product dispense switch is opened (no to step 109), the control routine will enter step 120 and begin to shut off the nozzle drive and turn off the air pump. That is, the air pump 34 (FIG. 4) is shut off and the nozzle drive is turned on in the reverse direction. In step 122, the control routine monitors the nozzle valve actuator assembly via the bidirectional nozzle interface. If the nozzle valve actuator assembly is open (no to step 122), the control routine continues to monitor the nozzle valve actuator assembly at step 112. If the nozzle valve actuator assembly is closed, i.e., when the optical sensor indicates that the nozzle is closed, the control routine proceeds to step 124. In step 124, the nozzle drive is shut off. In step 126, the microcontroller delays the execution of the control routine for a predetermined period of time. In a preferred embodiment of the present invention, this delay is approximately 0.20 seconds. In other embodiments, this delay may be longer, shorter, or substantially 0 seconds. Step 128 is then entered and the drinking water valve is closed. The delay (step 126) between the time that the nozzle drive is shut off (step 124) and the drinking water valve is closed (step 126) allows the nozzle to be rinsed with water after each time the liquid product is dispensed. Once the drinking water valve is closed, the control routine returns to step 101 and waits for the product dispense switch to be closed again.

Alternatively, FIG. **5*b* shows a control flowchart 180** of another preferred embodiment of the present invention.

FIG. **6*a* shows a flowchart describing a product volume measurement routine 141 for a preferred embodiment of the present invention. In step 140, chamber pressure and temperature measurements, $P_1$ and $T_1$ respectively, are made via a chamber temperature sensor, such as chamber temperature sensor 74 of FIG. 4, and a chamber pressure sensor, such as chamber pressure sensor 76 of FIG. 4. Next, in step 142, a known quantity of gas mass, $n_\Delta$, is introduced into the chamber. In a preferred embodiment, an air pump, such as air pump 34 of FIG. 4, is run for a predetermined period of time. Another set of chamber pressure and temperature measurements, $P_2$ and $T_2$, are taken in step 144. The product volume is then calculated according to the equation $V_P=V_C-(n_\Delta RT_1)/(P_2-P_1)$, in step 146**, where $V_C$ is the volume of the chamber and R is the gas constant.

Figure 7:
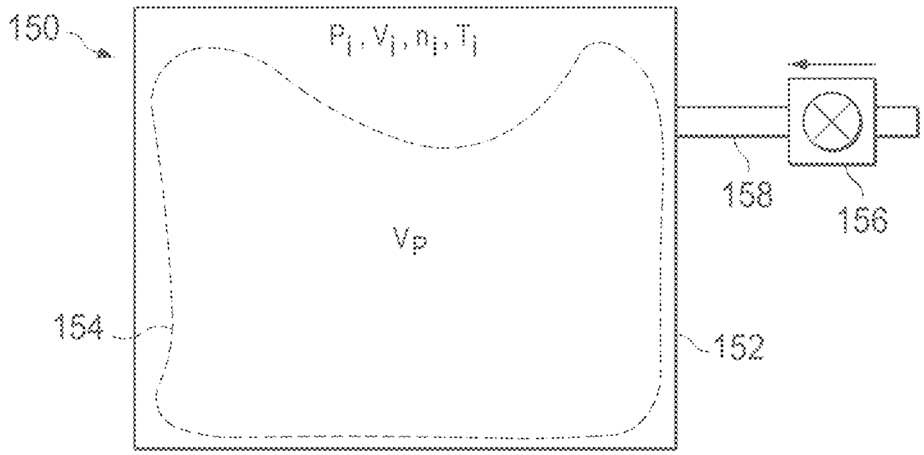
FIG. 7 is an explanatory illustration for a product volume measurement procedure.

FIG. 7 provides a descriptive illustration 150 of the product chamber and the variables related to the product volume calculation discussed previously. Product chamber 152 is depicted as a box with volume $V_C$. Bag-in-box 154 contains the product volume denoted as $V_P$. Variables $P_i$, $V_i$, $n_i$, and $T_i$, refer to the chamber pressure, the chamber volume, the quantity of gas, and the chamber temperature, respectively, at time i. Inlet 158 represents the gas inlet port of chamber 152 that receives pressurized gas from valve 156.

In order for an accurate measurement of the product volume to be made, generally the quantity of gas or air added to the chamber, $n_\Delta$, should be known within a reasonable certainty. This quantity of air, however, is dependent on pump speed and the physical properties of the pump used. One way to determine the quantity of air added per unit time would be to calibrate the system at the time of manufacture, or to simply use the pump manufacturer's data in the product volume calculation. Unfortunately, as air pumps get older, the diaphragm inside wears out, and any initial estimates or measurements of the pump's performance become less accurate over time. A calibration of the pump volume for a given period of operation can be made by taking a pressure measurement $P_1$, running the pump for a predetermined period of time, then taking a second pressure measurement $P_2$. The nozzle should remain closed during this operation. The quantity of gas added to the chamber, $n_\Delta$, can then be determined by the equation, $n_\Delta=(P_2-P_1)*V_C/(RT)$, where $V_C$ is the volume of the chamber, R is the gas constant, and T is the measured chamber temperature.

Alternatively, FIG. **6*b* shows a flowchart 182** describing the product measurement routine of another preferred embodiment of the present invention.

The flowchart in FIG. 8 describes a method 161 used to calculate the product compartment pressure in a preferred embodiment of the present invention. In step 160, the product volume, VP, is calculated as shown in FIG. **6*a*. Next, in step 162**, the head height of the product, HP, is calculated according to the equation $H_P=V_P/(W_C*D_C)$ where $W_C$ is the width of the product chamber and $D_C$ is the depth of the product chamber. In step 164, the head pressure, $P_P$, due to the product head height is calculated according to the equation $P_P=H_P*\rho_P*g$, where $\rho_P$ is the density of the product and g is the gravitational constant. Once the head pressure, $P_P$, is calculated, the product compartment pressure, $P_{TC}$, desired to achieve the total head pressure corresponding to the desired flow rate is calculated in step 168 according to the equation $P_{TC}=P_{TH}-P_P$, where $P_{TH}$ is an experimentally derived parameter. The magnitude of $P_{TH}$ can be up to about 10 psi or higher, but is preferably in the range of about 0.5 psi to about 3.0 psi. Alternatively, $P_{TH}$ can be determined in optional step 166 according to the equation $P_{TH}=H_{PT}*\rho_P*g$ where $H_{PT}$ is a target head pressure.

The equation for the desired product compartment pressure, $P_{TC}$, written in terms of product volume, $V_P$, is $P_{TC}=P_{TH}-(\rho_P*g*V_P)/(W_C*D_C)$. This equation shows that the larger the value of the $W_C*D_C$ product in the denominator, the less sensitive the desired product compartment pressure, $P_{TC}$, is to the product volume, $V_P$. For very wide and/or deep product chambers, the applied compartment pressure can be chosen to be a constant and the product volume calculation need not be calculated in order to maintain a near constant flow rate. Therefore, alternate embodiments of the present invention may be constructed with low, slim packages that allow the desired product compartment pressure, $P_{TC}$, to be a constant value. The magnitude of $P_{TC}$ can be up to about 10 psi or higher, but is preferably in the range of about 0.2 psi to about 2.8 psi.

Figure 9:
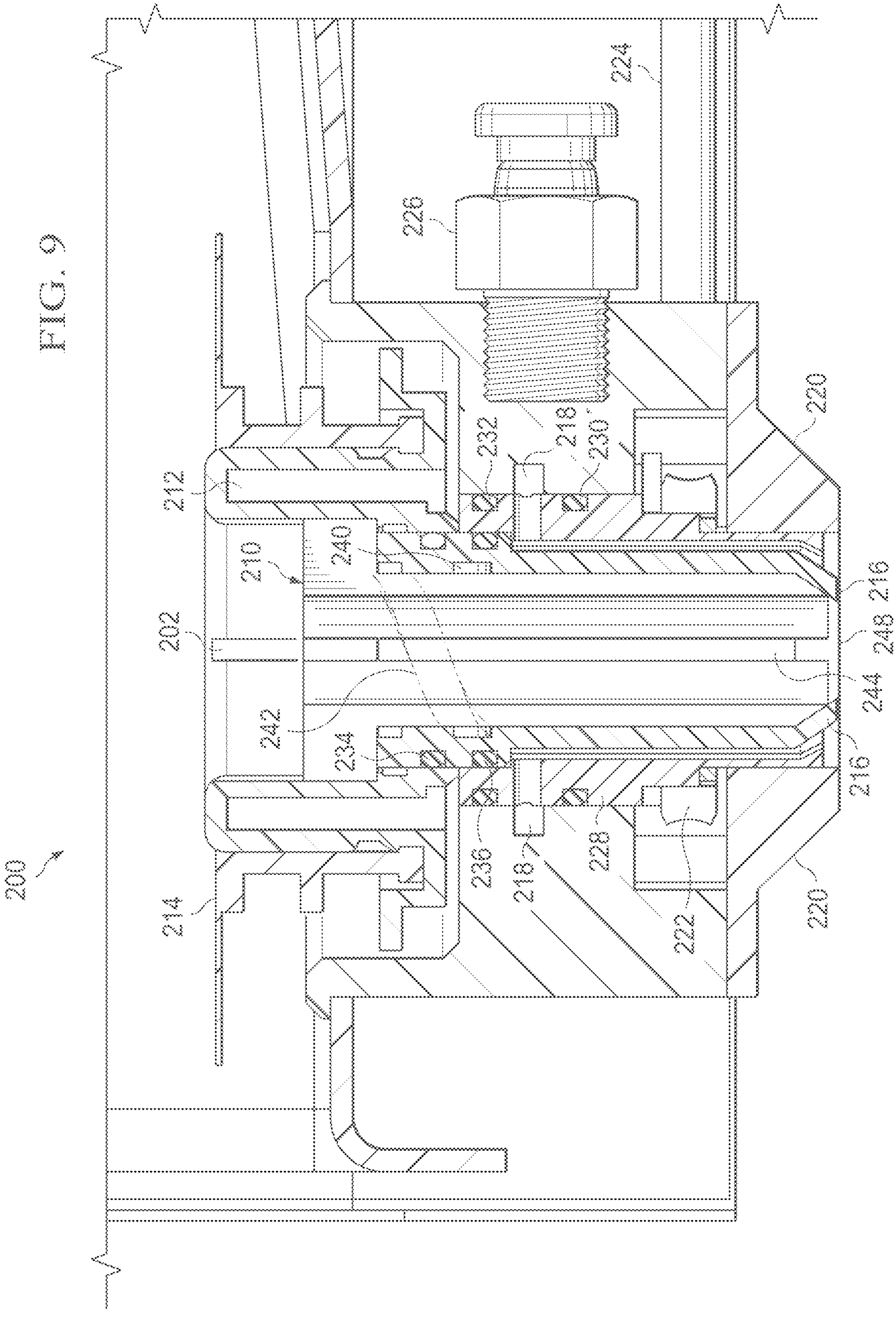
FIG. 9 is a cross-sectional illustration showing a nozzle situated within a beverage dispensing system.

FIG. 9 shows a cross-sectional view of a nozzle assembly 200 situated within a beverage dispensing system. A bag-in-box (not shown) is connected to nozzle assembly 200 by mating a product spout 214 to a nozzle adapter 212. A nozzle tip 216 extends from one end of nozzle adapter 212, inside of which is situated a plunger 210. If nozzle tip 216 is rotated, plunger 210 will move vertically, propelled by a helical nozzle tip rotation track 242, formed in nozzle tip 216, pushing against a nozzle plunger rotation pin 240.

Rotational motion of plunger 210 is prevented by the mating of vertical ridges 244 on the body of plunger 210 with vertical guides or tracks 202 inset within the inner diameter of nozzle adapter 212. In a preferred embodiment of the present invention, plunger 210, nozzle adapter 212, and nozzle tip 216 are made of high density polyethylene. Alternatively, in other embodiments, these components can be made from low density polyethylene, polyethylene terephthalate, and polypropylene.

When the tip 248 of plunger 210 is in its lowest vertical position resting against the bottom 256 of nozzle tip 216, a seal is formed at the bottom of nozzle tip 216 and no liquid product may flow out of the nozzle. When nozzle tip 216 is rotated and plunger 210 is lifted, the liquid product flows from the bag-in-box, through nozzle adapter 212, around the body of plunger 210, and out the bottom of nozzle tip 216.

Figure 10:
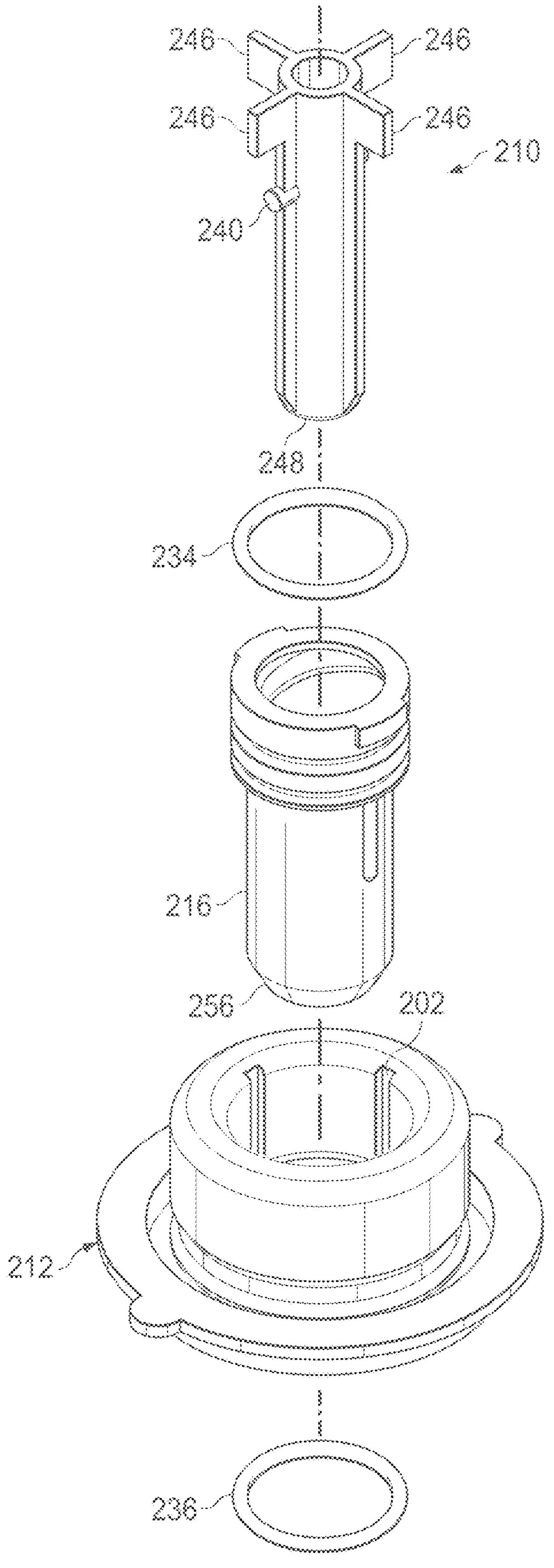
FIG. 10 illustrates an exploded view of a nozzle assembly.
Figure 11A:
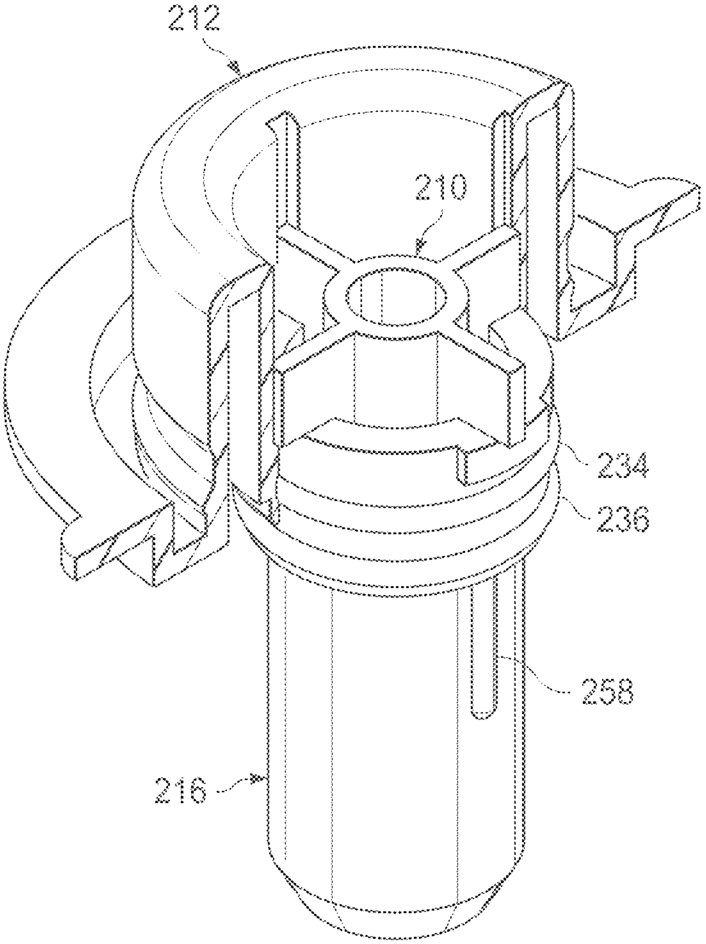
FIGS. 11*a* and 11*b* illustrate a nozzle assembly.
Figure 11B:
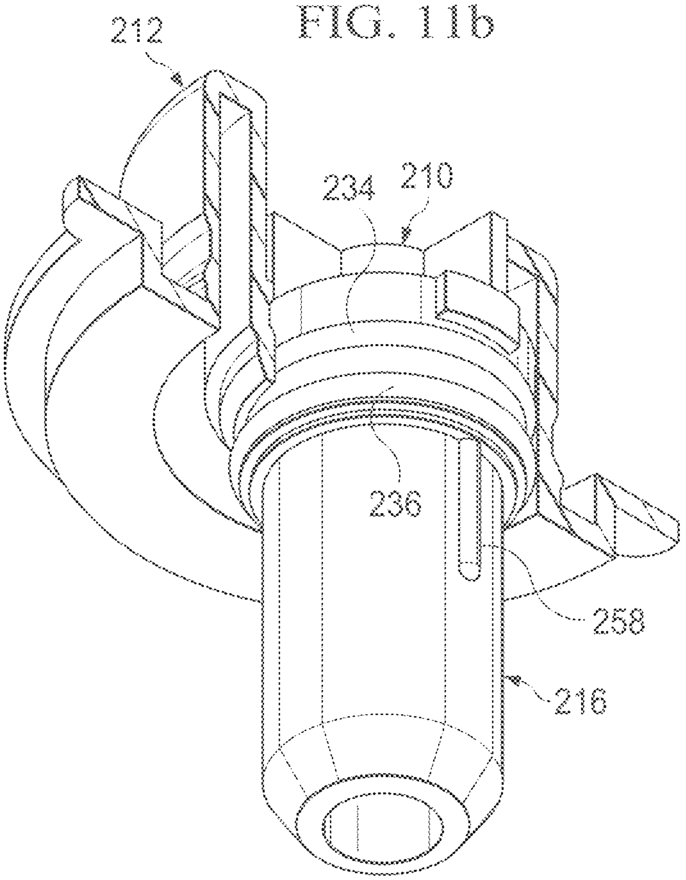
Figure 12A:
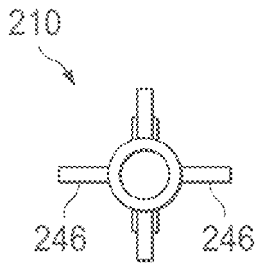
FIGS. 12*a*-12*f* illustrate a nozzle plunger.
Figure 12C:
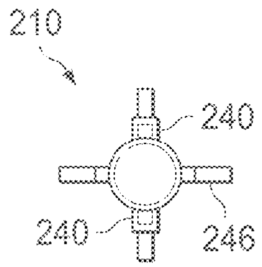
Figure 12B:
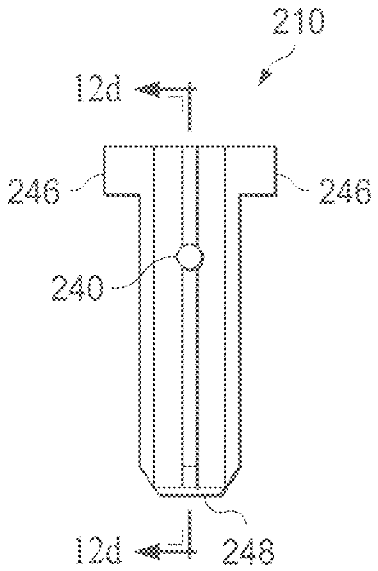
Figure 12D:
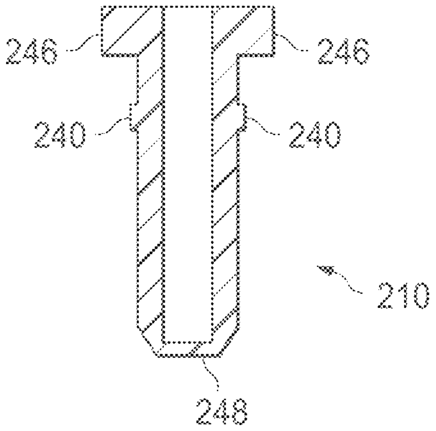
Figure 12E:
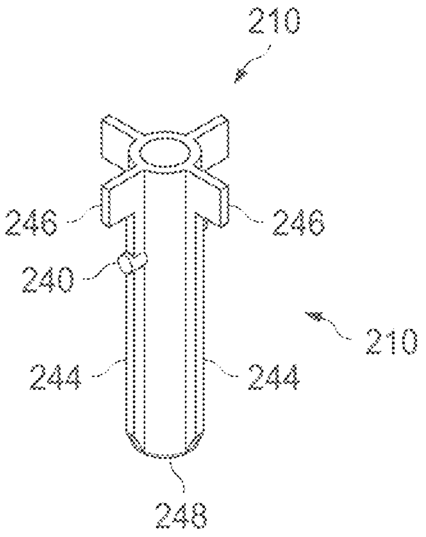
Figure 12F:
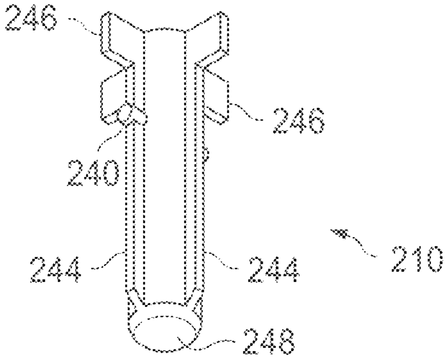
Figure 13A:
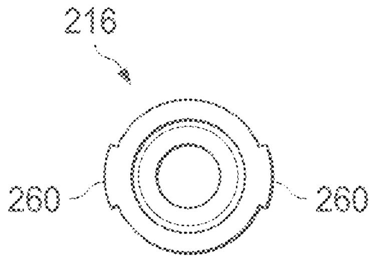
FIGS. 13*a*-13*f* illustrate a nozzle tip.
Figure 13C:
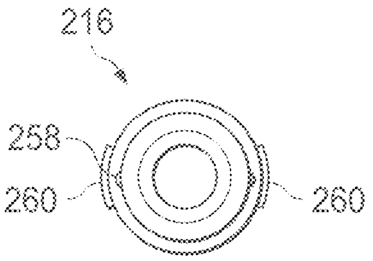
Figure 13B:
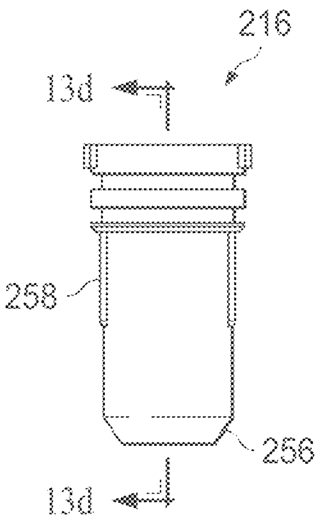
Figure 13D:
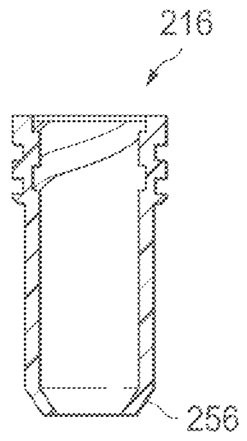
Figure 13E:
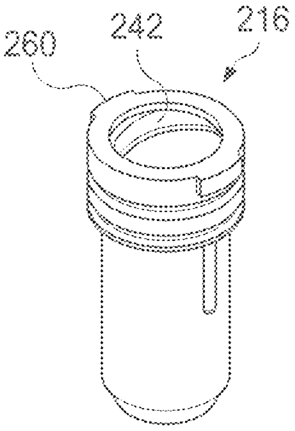
Figure 13F:
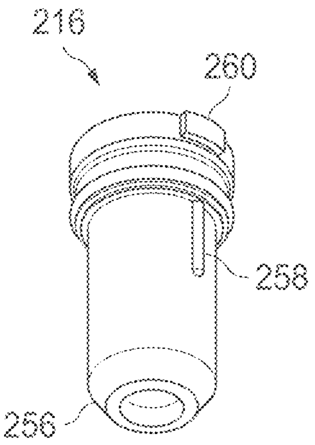
Figure 14A:
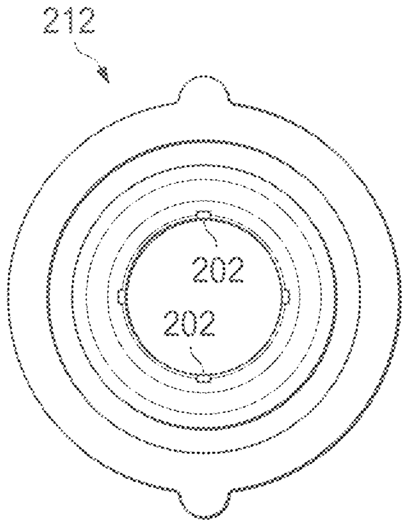
FIGS. 14*a*-14*e* illustrate a nozzle adapter.
Figure 14D:
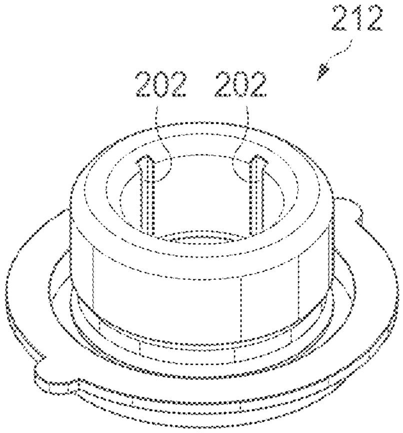
Figure 14B:
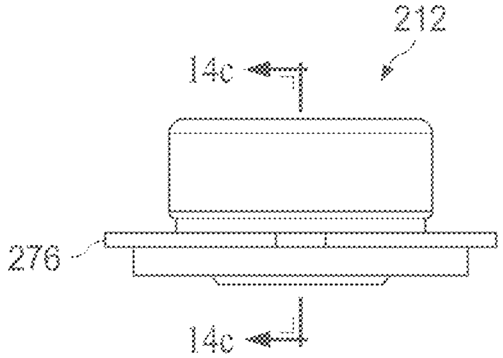
Figure 14E:
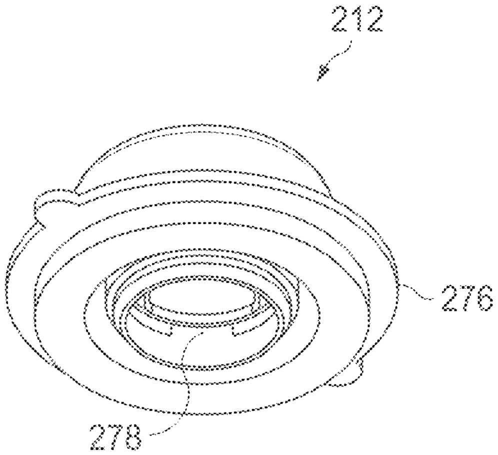
Figure 14C:
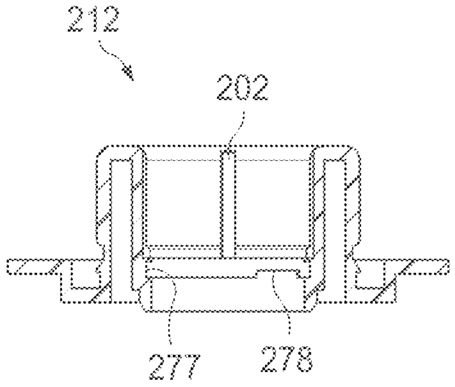

FIGS. 10-14 are drawings of nozzle assembly components. FIG. 10 shows an exploded view of a nozzle assembly and FIGS. 11*a* and 11*b* show isometric cross-sectional views of the nozzle assembly and illustrate how the components fit together. In particular, plunger 210 has slide stop tabs 246 that fit within grooves 202 (FIG. 14*c*) in the inner circumference of nozzle adapter 212. The tab and groove system allows vertical motion of plunger 210 while preventing rotational motion. Also shown in FIG. 11*a* is a nozzle tip ridge 258. Nozzle tip ridge 258 provides a surface through which to transfer rotational motion from nozzle drive 228 (FIG. 9) to nozzle tip 216. Rotation of nozzle tip 216 is limited to 90 degrees by the interplay of tab 260 on the outer circumference of nozzle tip 216 as shown in FIG. 13*a*, channel 277 in the inner circumference of nozzle adapter 212 as shown in FIG. 14*c*, and projection 278 within channel 277 as shown in FIG. 14*c*. When the upper end of nozzle tip 216 is inserted into the inner diameter of nozzle adapter 212, tab 260 rests within channel 277 where nozzle tip 216 is free to rotate radially but axial motion is prevented. Projection 278, however, limits the radial motion of nozzle tip 216 to 90 degrees by stopping the radial motion of tab 260. FIGS. 12*a*-12*f* show isometric and cross-sectional views of plunger 210; FIGS. 13*a*-13*f* show isometric and cross-sectional views of nozzle tip 216; and FIGS. 14*a*-14*e* show isometric and cross-sectional views of nozzle adapter 212.

Referring back to FIG. 9, in a preferred embodiment of the present invention, rotational motion of nozzle tip 216 is provided by rotating an actuator gear 222 with a worm gear (not shown) attached to a drive shaft 224. Actuator gear 222 is connected to nozzle drive 228 inside of which rests nozzle tip 216. O-rings 230 and 232 provide a seal between nozzle tip 216 and nozzle adapter 212 and prevent the liquid product from flowing down the sides of nozzle tip 216. O-ring 234 provides a liquid-tight seal for a product seal, and o-ring 236 provides an air seal. In a preferred embodiment of the present invention, o-rings 230, 232, 234, and 236 are made of ethylene propylene, or alternatively in other embodiments they can be made of buna-nitrile. In other embodiments, however, these o-rings can be eliminated and an interference fit may be used to prevent the product from leaking out from the bag liner. As with o-rings, the interference fit may provide a product and air seal while still allowing proper nozzle rotation. This may eliminate the additional cost of the o-rings and the associated assembly steps.

Within nozzle system 200 of a preferred embodiment of the present invention, a water inlet path 218 is provided to allow for the mixing of water with the liquid product. Water enters the system through a water line fitting 226, flowing through nozzle support section 220, through water inlet path 218, and around the outside of nozzle tip 216. Water can be used to mix and dilute a beverage, to dispense water, or simply to wash nozzle system 200. In a preferred embodiment of the present invention, water line fitting 226 is made of acetal, or alternatively in other embodiments it can be made of polypropylene. In a preferred embodiment of the present invention, nozzle support section 220 is made of acetal (Delrin), or alternatively in other embodiments it can be made of high density polyethylene.

Figure 15:
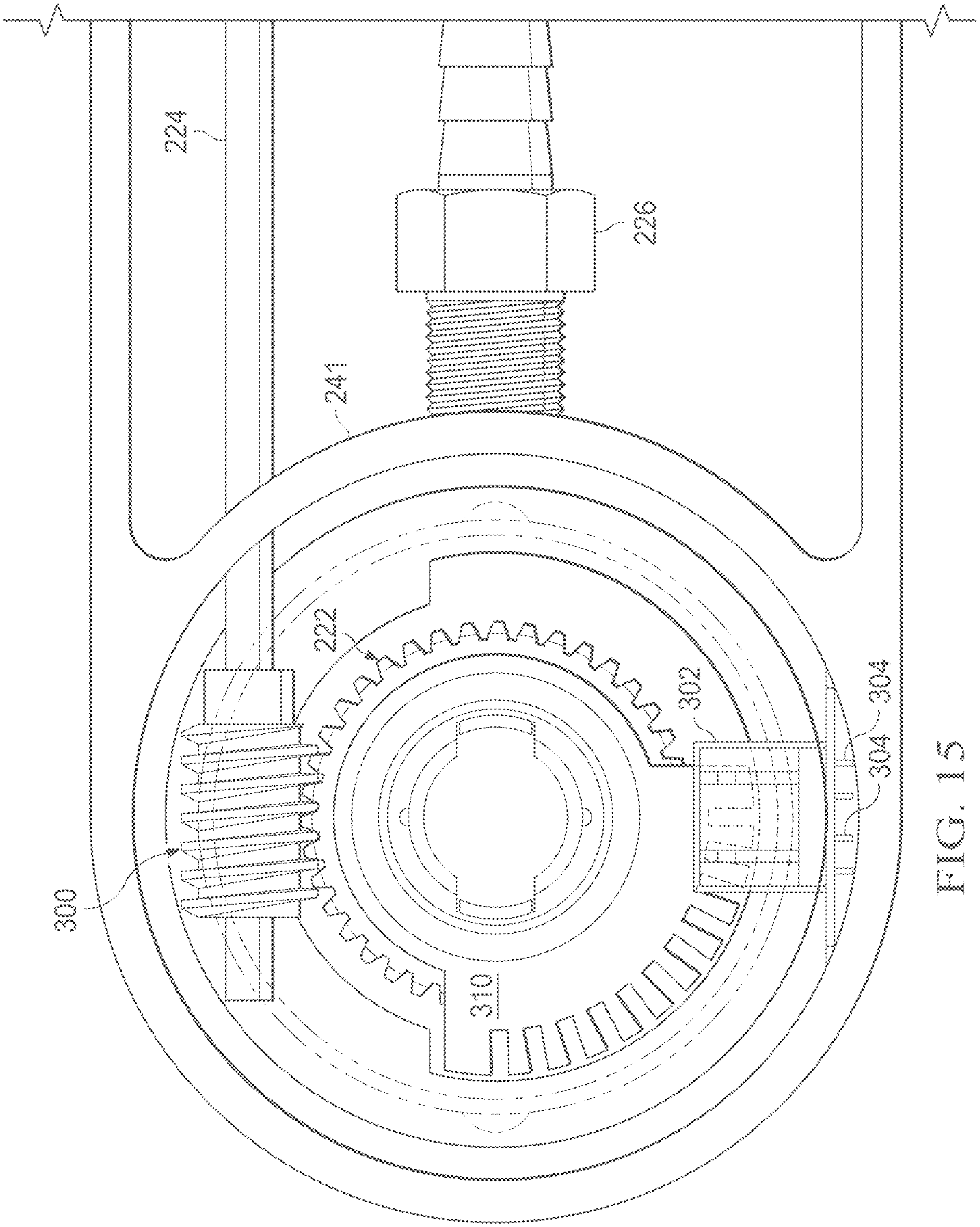
FIG. 15 illustrates a nozzle drive mechanism.

The nozzle drive mechanism is shown in FIG. 15. In a preferred embodiment of the present invention, nozzle (not shown) is opened and closed by rotating nozzle tip 216 (FIG. 9). An actuator gear 222 is attached to nozzle drive 228 (FIG. 9) in which nozzle tip 216 (FIG. 9) is situated. Worm drive 300 mounted on worm drive shaft 224 drives actuator gear 222. Worm drive shaft 224 and the nozzle assembly are mounted in nozzle adapter cradle 241. In a preferred embodiment of the present invention, actuator gear 222 is made of bronze, or alternatively in other embodiments it can be made of nylon (Nylatron). In a preferred embodiment of the present invention, worm drive 300 is made of carbon steel, or alternatively in other embodiments it can be made of nylon. In a preferred embodiment of the present invention, worm drive shaft 224 is made of stainless steel, or alternatively in other embodiments it can be made of aluminum. In a preferred embodiment of the present invention, nozzle adapter cradle 241 is made of acetal, or alternatively in other embodiments it can be made of high density polyethylene.

Figure 16:
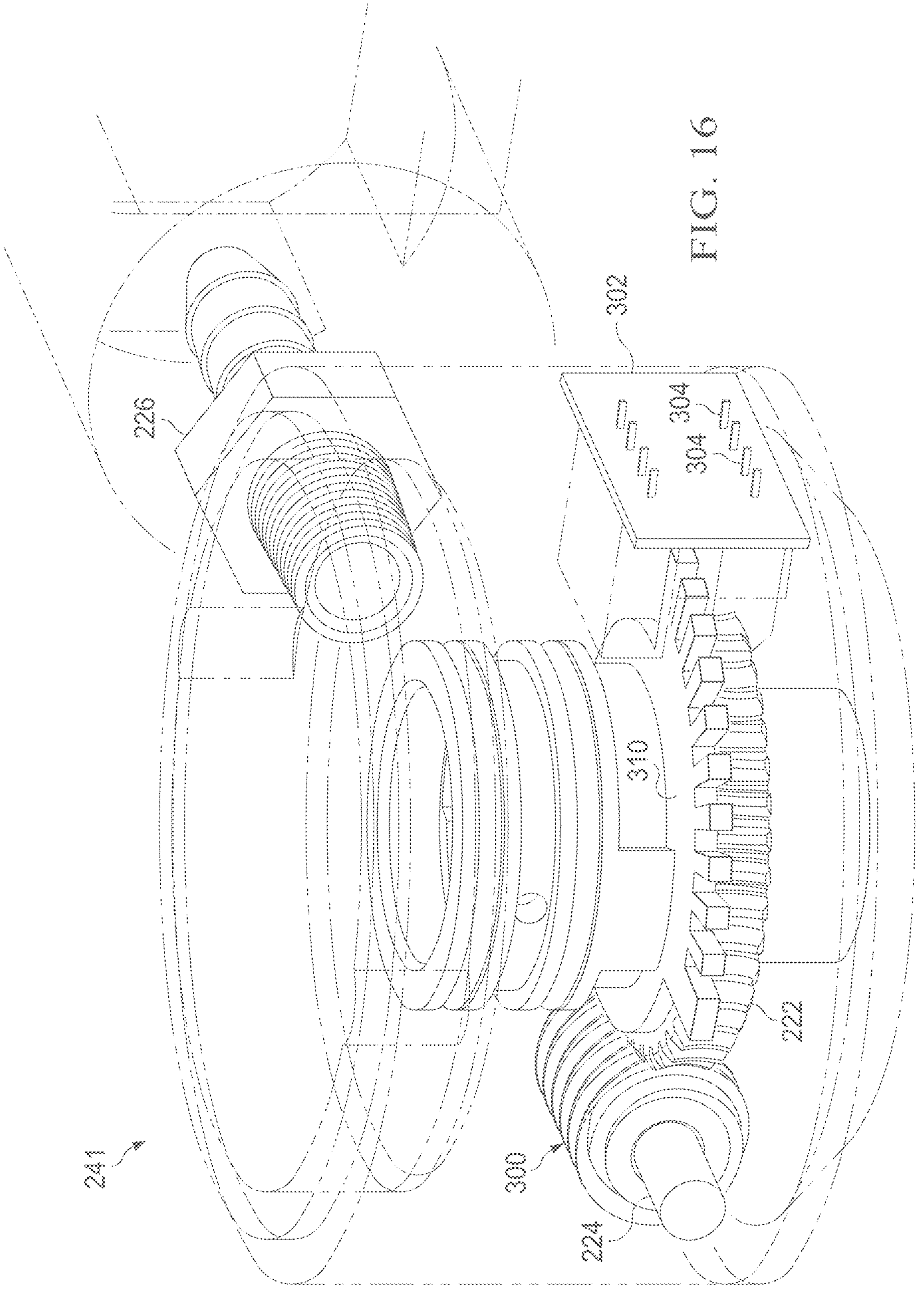
FIG. 16 illustrates an isometric view of a nozzle drive mechanism.
Figure 18:
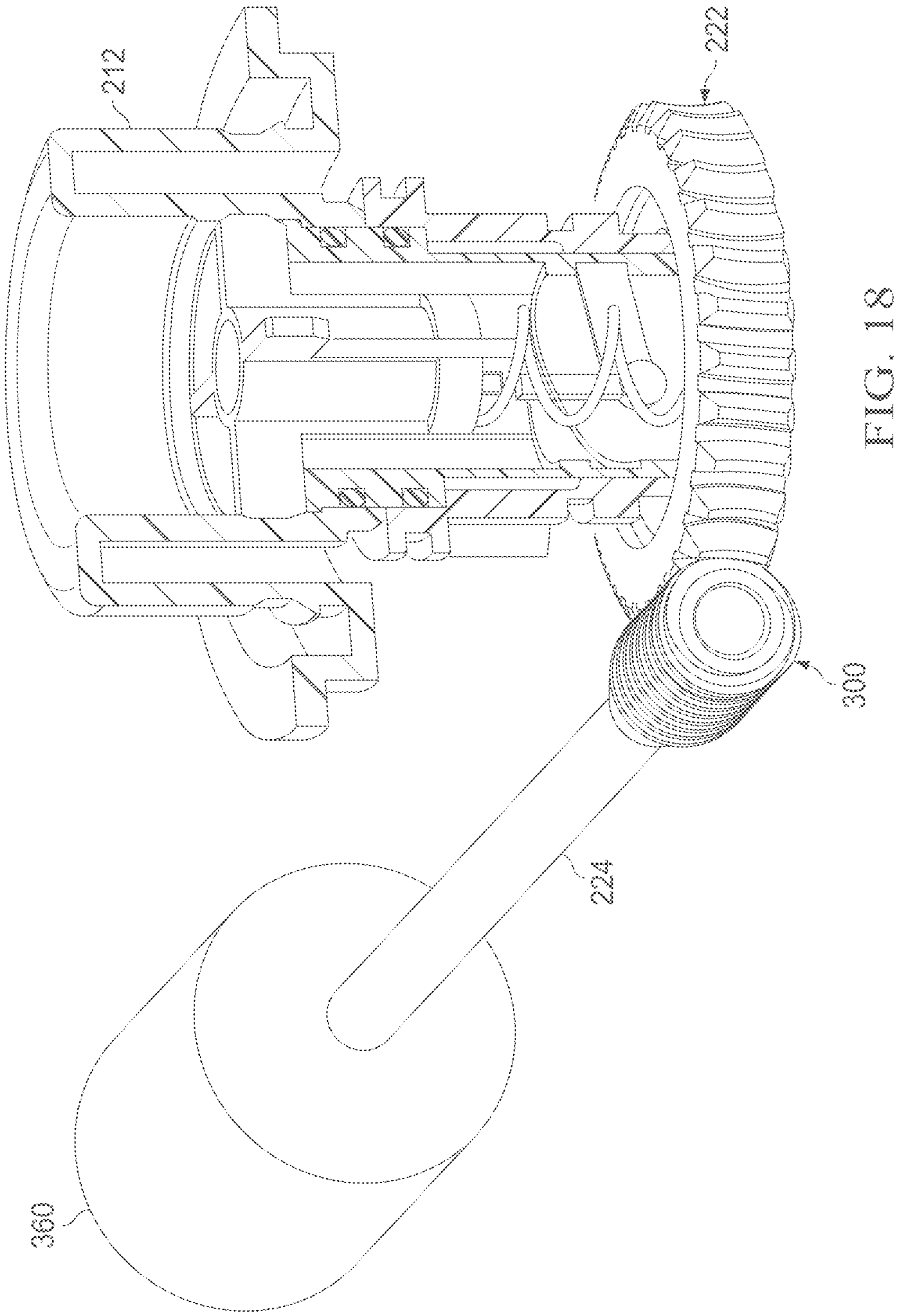
FIG. 18 illustrates another alternate embodiment of a nozzle system.

Position feedback is provided back to microcontroller 92 (FIG. 4) through the interplay between interrupter plate 310 and photo interrupter detector 302. Interrupter plate 310 is attached to actuator gear 222 so that each end of interrupter plate 310 passes by photo interrupter detector 302 when the nozzle is completely open and completely closed. Photo interrupter detector 302 signals microcontroller 92 (FIG. 4), or provides enough data to microcontroller 92 (FIG. 4) so that microcontroller 92 (FIG. 4) can determine if the nozzle is completely open, completely closed, or in some intermediate state. Connections (not shown) between photo interrupter detector 302 and microcontroller 92 (FIG. 4) are made to electrical contacts 304 on photo interrupter detector 302. FIG. 16 shows a three-dimensional semi-transparent view of worm drive 300 and actuator gear 222. FIG. 18 shows a three-dimensional view of worm drive 300, actuator gear 222, and drive motor 360.

Figure 17:
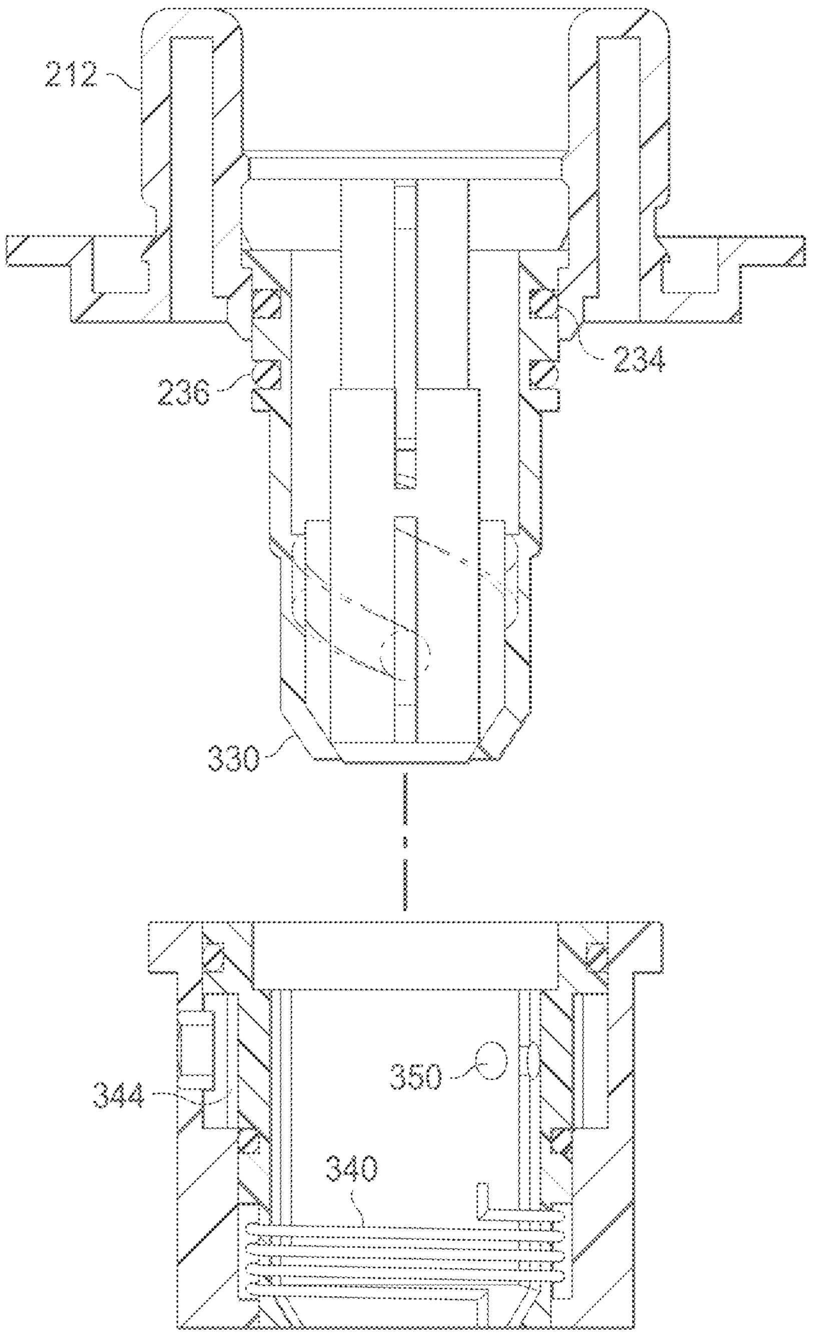
FIG. 17 illustrates an alternate embodiment of a nozzle system.

An alternate embodiment of the nozzle assembly and nozzle drive is shown in FIG. 17. Instead of using a mechanical worm drive to open and close the nozzle as is used in a preferred embodiment, water pressure is used to open and close the nozzle. In this embodiment, nozzle tip 330 is situated within nozzle socket 344. During nozzle operation, water is introduced into nozzle socket water inlet 350. Water pressure pushes up against the walls of water inlet 350 and rotates nozzle socket 344 while stretching or compressing spring 340. When the water stops flowing, spring 340 rotates nozzle socket 344 back into the nozzle closed position.

Figure 19A:
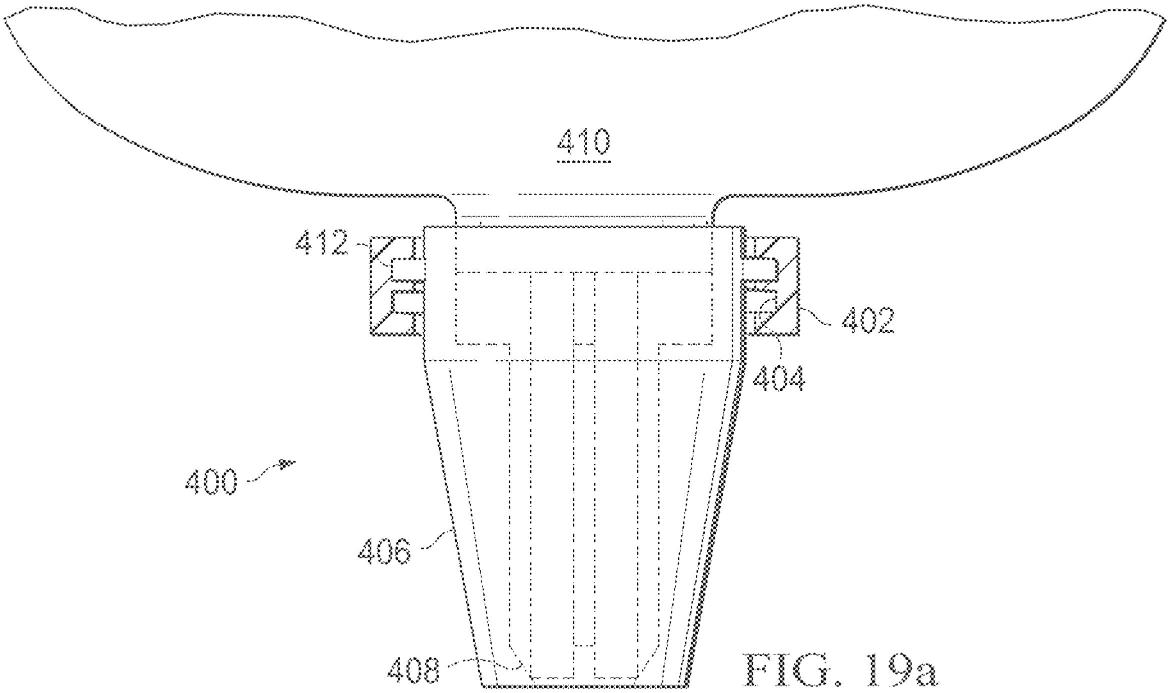
FIGS. 19*a*-19*c* illustrate another alternate embodiment of a nozzle system.
Figure 19B:
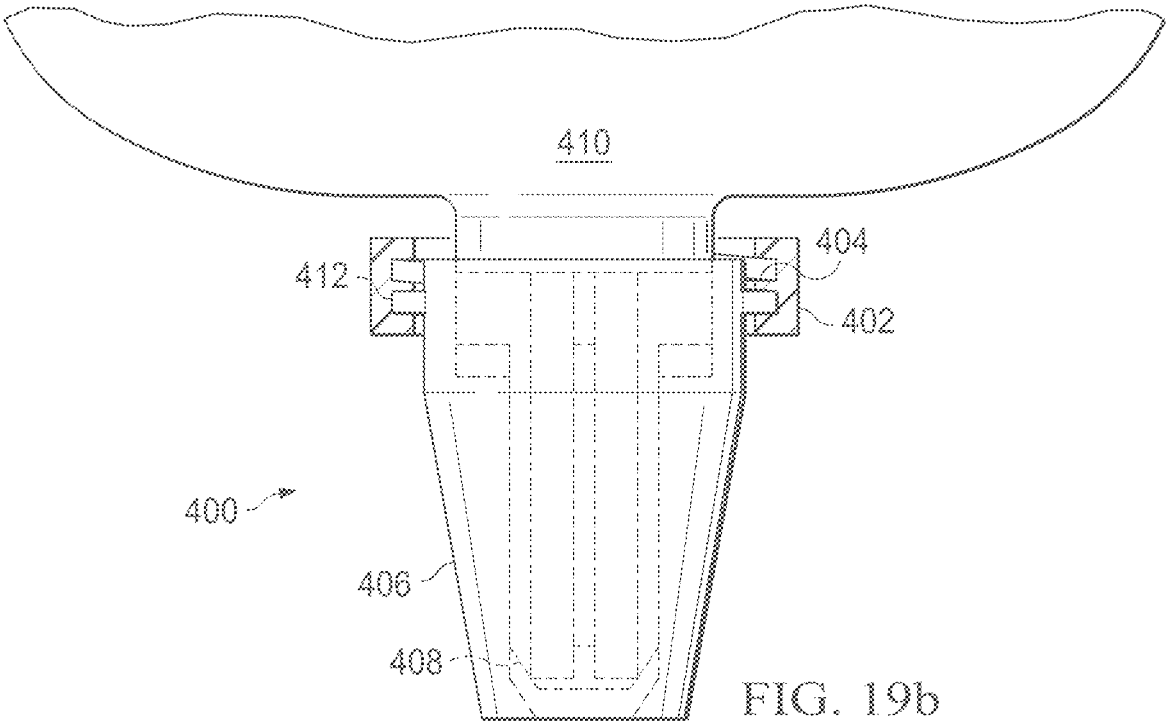
Figure 19C:
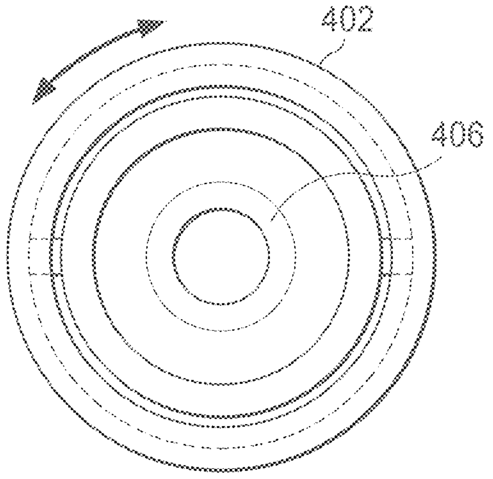

Another alternate embodiment of nozzle drive system 400 is shown in FIG. 19*a*. In this embodiment, nozzle tip 406 moves with a helical spin axially down a base and stem 408 to dispense liquid from container 410. Projections 412 in nozzle tip 406 fit into a helical drive slot 404 in an annular drive 402. FIG. 19*a* shows the nozzle in its closed position where the tip of base and stem 408 is aligned with the end of nozzle tip 406. FIG. 19*b* shows the nozzle in the open position where nozzle tip 406 is in a lower position with respect to base and stem 408. FIG. 19*c* shows a top view of annular drive 402 with arrows indicating spin. Annular drive 402 is coupled to a motor (not shown) or other mechanical means to spin annular drive 402 to open and close the nozzle.

Figure 20A:
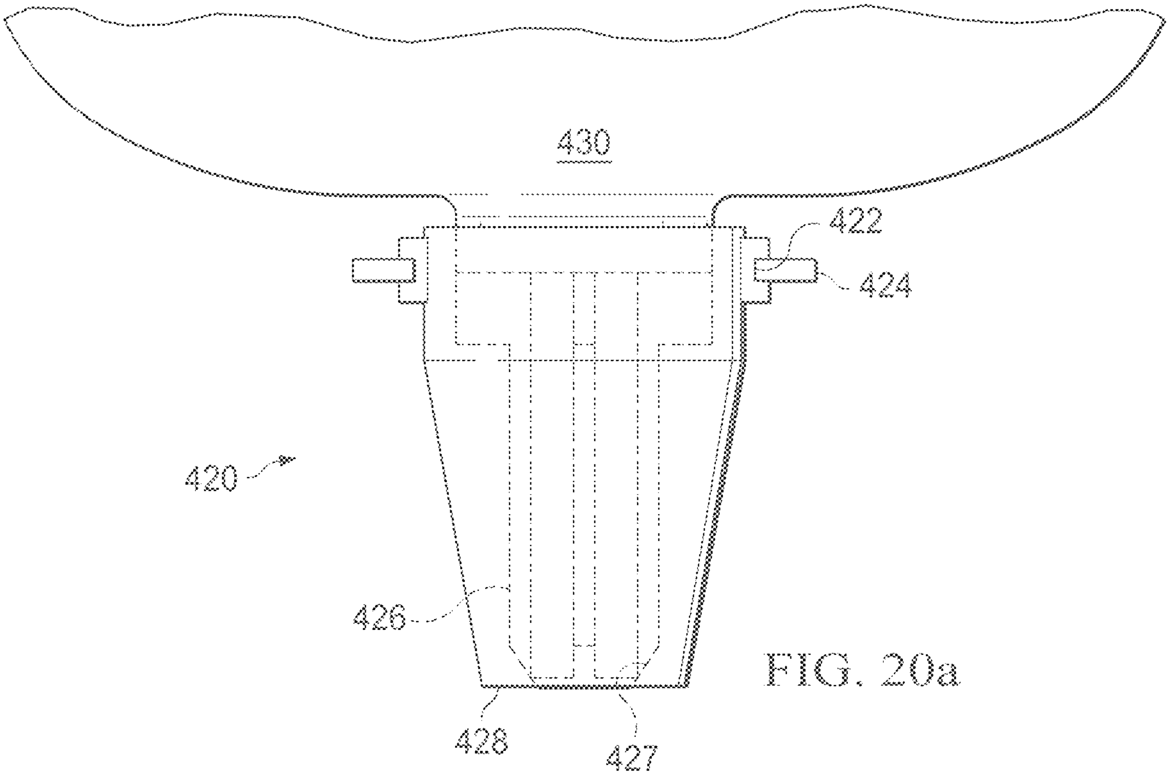
FIGS. 20*a*-20*c* illustrate another alternate embodiment of a nozzle system.
Figure 20B:
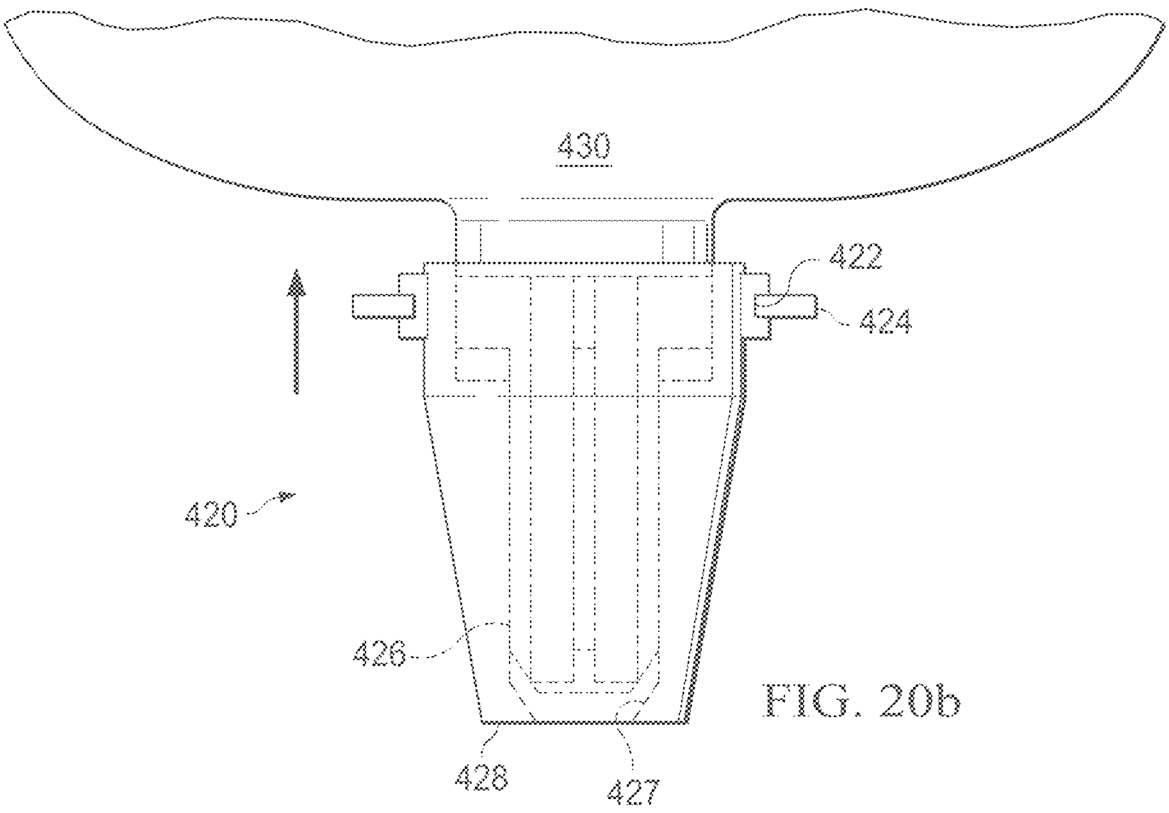
Figure 20C:
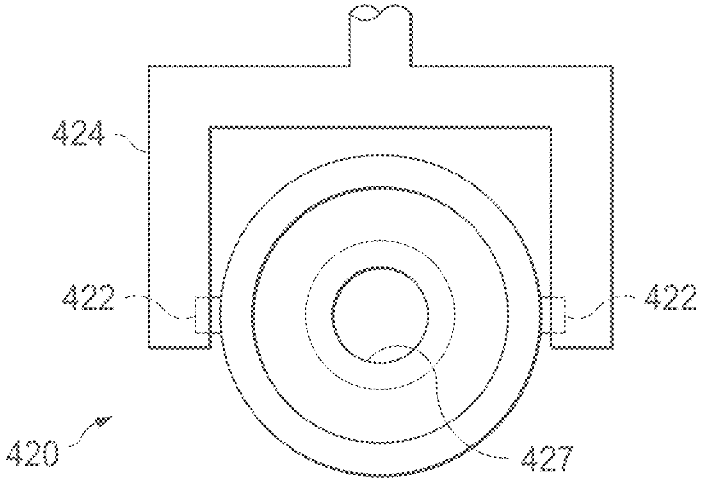

Yet another alternate embodiment of nozzle drive system 420 is shown in FIG. 20*a*. In this embodiment, nozzle tip 428 moves directly axially down base and stem 426. External drive fingers 424 fit within a circular groove 422 and move nozzle tip 428 directly up and down. FIG. 20*a* shows nozzle drive system 420 in the closed position. FIG. 20*b* shows that when external drive fingers 424 move downward, an opening 427 is created between nozzle tip 428 and base and stem 426. Liquid from container 430 is then able to flow through 427. FIG. 20*c* shows a top view of nozzle drive system 420. External drive fingers 424 are coupled to a motor (not shown) or other mechanical means to move external drive fingers 424 vertically to open and close the nozzle.

Figure 21:
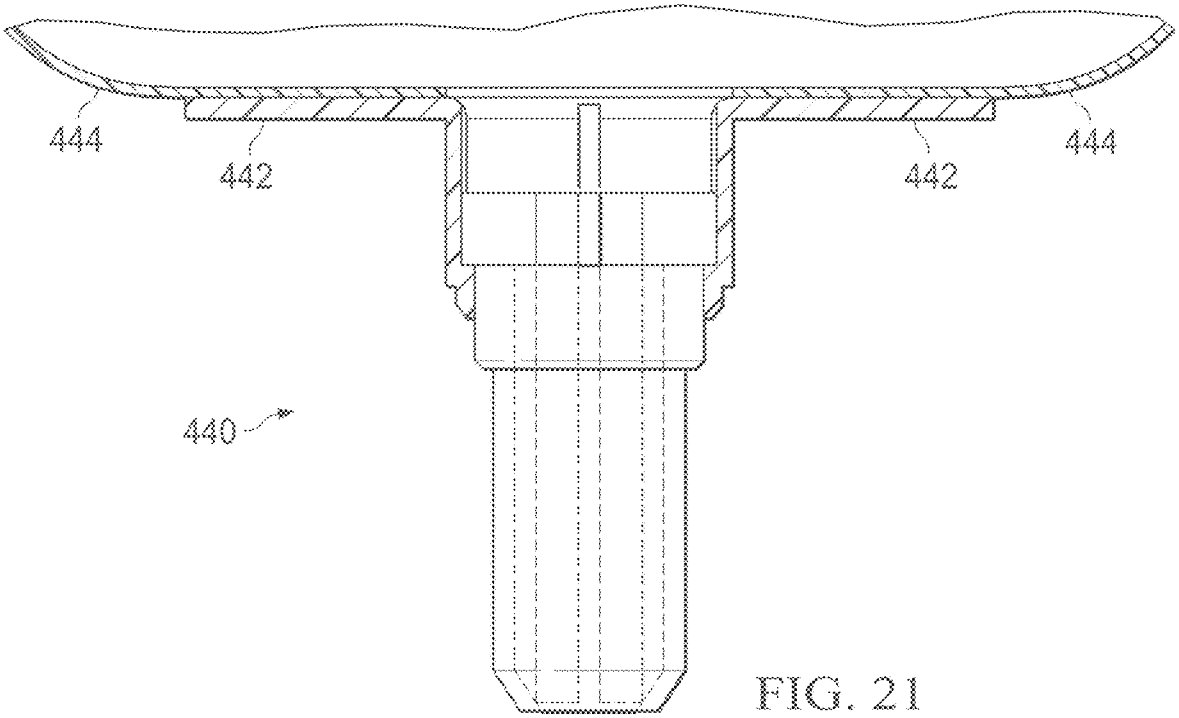
FIG. 21 illustrates another alternate embodiment of a nozzle system.

In FIG. 21, an alternate embodiment of nozzle system 440 is shown where nozzle adapter 442 is welded directly to bag liner 444. By welding nozzle adapter 442 directly to bag liner 444, nozzle adapter 212 (FIG. 9) and product spout 214 (FIG. 9) are combined into one piece. In this embodiment, nozzle adapter 442 is welded onto bag liner 444 ultrasonically. One advantage to this embodiment is that one piece is eliminated from the system by combining the spout and the nozzle adapter.

Figure 22:
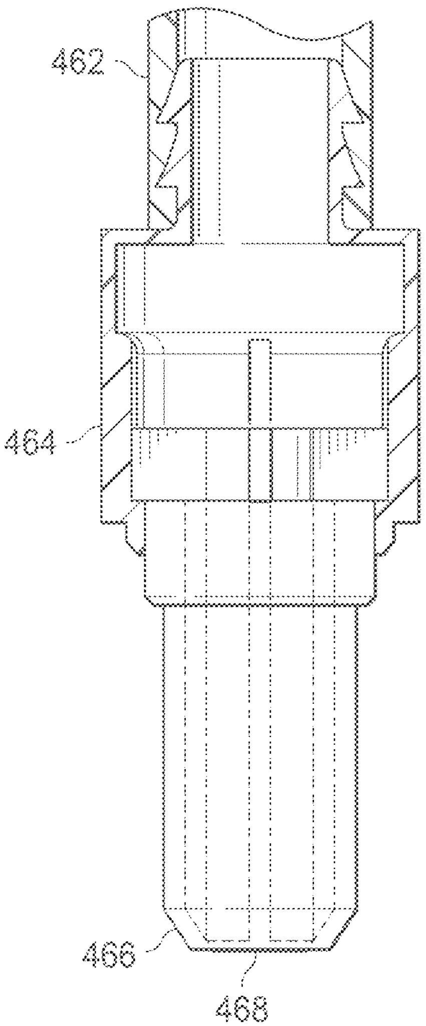
FIG. 22 illustrates another alternate embodiment of a nozzle system.

FIG. 22 shows an alternate embodiment of the present invention where nozzle adapter 464 is attached to the end of a tube 462. This alternate embodiment can be used where the product storage container (not shown) is located in a place other than the dispensing location. For example, the product storage container may be placed under a counter, while the nozzle is located above the counter. Attached to nozzle adapter 464 is a nozzle tip 466 and a plunger 468. Operation of this embodiment is similar to the operation of a preferred embodiment of this invention, however the alternate location for the dispense head (not shown) impacts the pressure equations. The height distance between the bottom of the product bag (not shown) to the bottom of the dispensing point (not shown) may be taken into consideration. Assuming the dispensing point is above the bottom of the product bag, the additional head pressure created by having the dispensing point above the product bag bottom is added to the starting system product compartment pressure, $P_{TC}$. Therefore, the compensated system starting pressure is denoted by the equation $P_{TCC}=P_{TC}+P_P$, where $P_P$ is the pressure due to head height.

Figure 23:
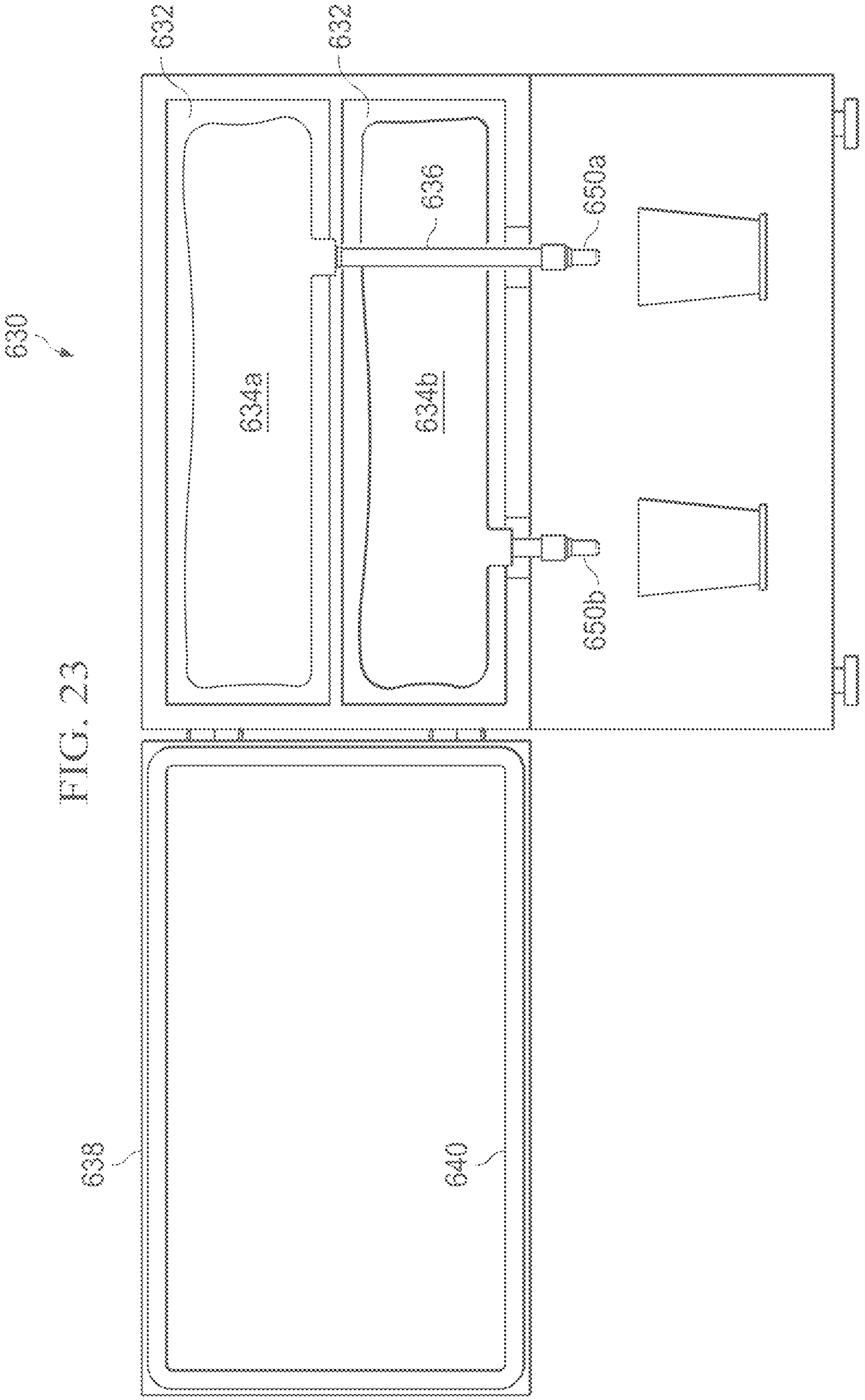
FIG. 23 illustrates an embodiment of a slim-package dispensing system.

FIG. 23 illustrates a preferred embodiment of a slim package pressurized dispenser 630. Dispenser 630 includes a pressurized chamber 632 coupled with a low, slim profile bag-in-box package 634*a* to substantially reduce or effectively eliminate the impact of head height pressure changes for the purpose of dispensing beverage concentrates. In a preferred embodiment, a first slim profile bag-in-box package 634*a* sits in pressurized chamber 632 connected to a nozzle 650*a* via product extension tube 636. Below the first slim profile bag-in-box package 634*a*, a second slim profile bag-in-box package 634*b* is installed and connected to nozzle 650*b*, which allows for an additional type of product to be dispensed from the same dispenser 630. For example, bag-in-box package 634*a* can contain whole milk, while bag-in-box package 634*b* below can contain skim milk. In a preferred embodiment, the slim profile bag-in-box packages 634*a* and 634*b* are installed in dispenser 630 behind door 638. A chamber seal gasket 640 attached to the inside perimeter of door 638 provides a thermal and pressure seal when dispenser 630 is in operation.

The pressure of chamber 632 may be regulated to a specific pressure as described hereinabove. Even though the head pressure may change slightly as the product empties, the difference in head pressure is not significant in comparison to the overall system pressure. As an example, if the head pressure changes only 0.1 psi and the system pressure is 5 psi, the impact of the head pressure change is only 2%. In addition, if the target flow rate is set when the bag is half full, the flow rate will be only 1% fast when the bag is full and only 1% slow when the bag is empty. Head height pressure exerted per foot of head height is usually in the range of about 0.4 psi to about 0.5 psi for most beverage concentrates. Therefore, to achieve a 0.1 psi drop from a full bag to an empty bag, the bag may be about 3" in height. Preferably, the slim profile bag-in-box package 634*a* or 634*b* is less than about 6" in height, more preferably less than about 5 inches in height, and still more preferably less than about 3" in height. In other embodiments, other dimensions may be used, and other packages besides bag-in-box packages may be employed. Because of the relative insensitivity head pressure to product volume for slim profile packages, more than one slim profile package 634*a* and 634*b* can share the same chamber 632 while maintaining similar product flow rates, even if one package contains a different volume from the other package.

The chamber may be pressurized by many methods, including pumping air or releasing pressurized $CO_2$ into chamber 632. The air pressure in chamber 632 may be held constant with an air pressure regulator (not shown). These embodiments may be used with any compatible embodiment or combination of embodiments disclosed herein, such as the embodiments disclosed in FIGS. 1-2, 23-27, 30 and 37, for example.

As discussed hereinabove, a beverage dispensing system and method may comprise a product bag with a spout and adapter that makes a seal to its product chamber. The spout is the outlet port of the bag that is physically welded to the bag liner, and the adapter is snapped into the spout. It has a feature that acts as a shutoff valve and a seal to the product chamber when placed in the product chamber. The adapter is designed to make an air-tight fit with the product chamber. In a preferred embodiment of the invention, however, the adapter can be connected to a tube, so that a nozzle can be connected remotely.

Figure 24A:
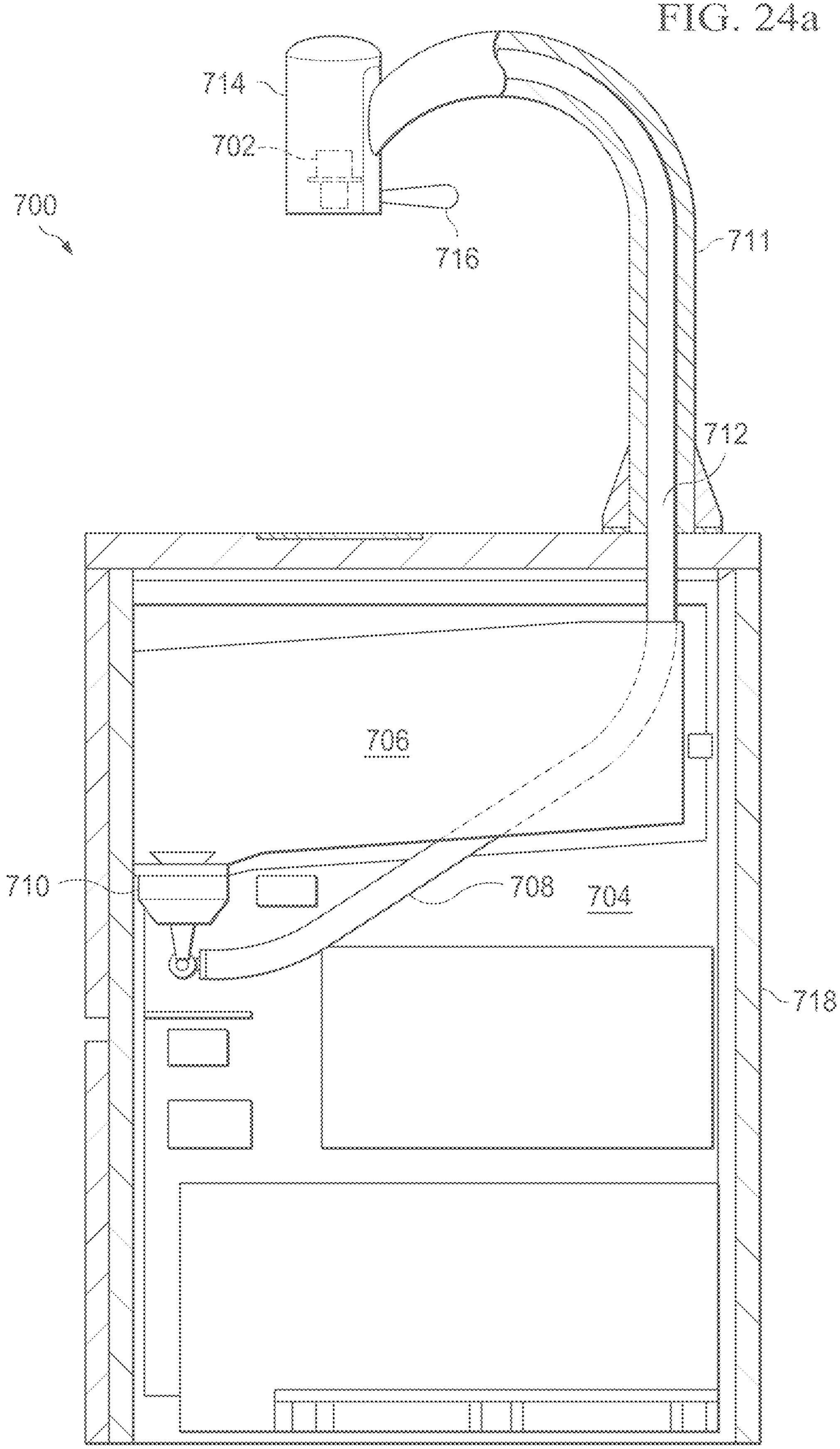
FIGS. 24*a*-24*h* illustrate embodiments of a remote nozzle dispensing system.

FIG. 24*a* illustrates a side view of an embodiment of the present invention where beverage dispenser 700 includes a remote nozzle 702 and bag-in-box product container 706 within pressurized product chamber 704 connected to tube or tube set 708 via bag adapter 710. Bag adapter 710 is connected to an outer bag tube or tube set 708, which may be run through a tube chute 712 within neck 711. Tube set 708 may comprise one or more of the following: the tube set adapters or connectors that connect to bag adapters 710, the tubing, a tee check valve, and nozzle 702 fitted with a hat or cap. The tubing may be made of linear low density polyethylene (LLDPE), polyurethane, Tygon®, nylon, or numerous other materials. The length and diameter of the tubing may be varied.

Figure 24B:
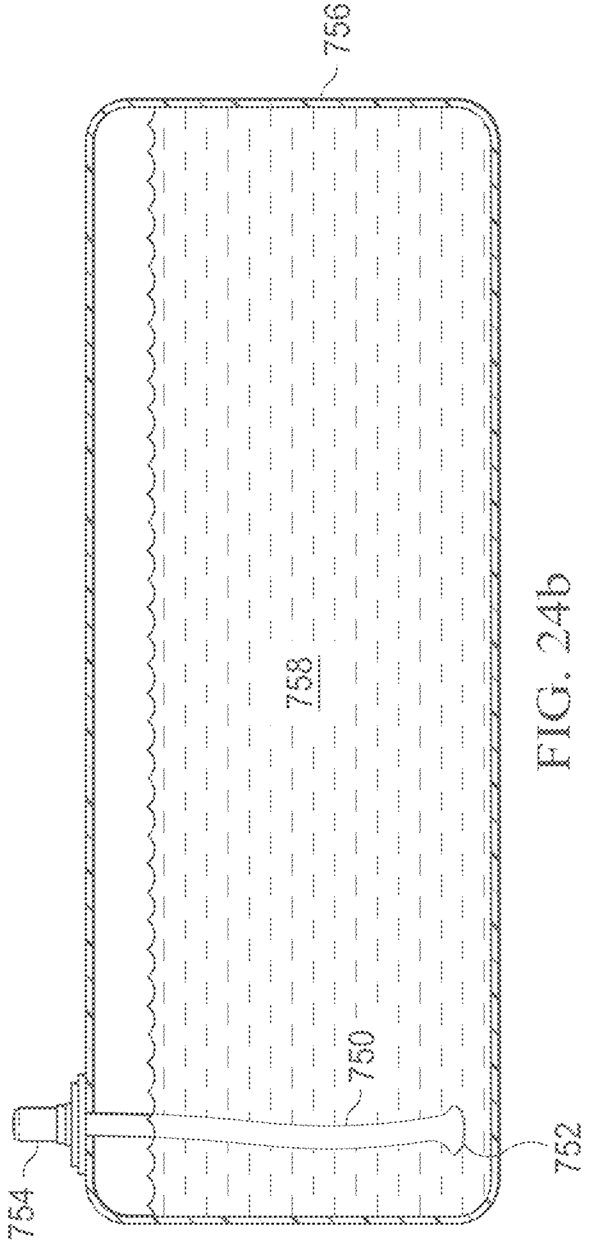

An alternative to bag-in-box product container 706 is shown in FIG. 24*b*. Instead of having a spout positioned near the bottom of container, product container 756 contains a tube 750 routed inside container 756 affixed to the bottom of the container 756 with a weld 752. Container 756 is usually made from a flexible plastic material such as linear low density polyethylene and/or other materials such as metallized polyester laminated to polyethylene, however, other materials, including polyolefin, polypropylene, polyvinyl chloride, polyester, nylon, and the like. Tube 750 is preferably made from linear low density polyethylene (LLDPE), polyurethane, Tygon®, nylon, or numerous other materials, and can be ultrasonically welded to the bottom of container 756. Pressure from the chamber (not shown) against the walls of container 756 propels product 758 through tube 750 and out through spout 754.

Turning back to FIG. 24*a*, tube set 708 may be routed through a tube chute 712 within neck 711 to dispense head 714. Tube set 708 may be easily replaced, allowing disposal after each use or after a designated period of time. Tube chute 712 may be refrigerated for products that require refrigeration. Tube chute 712 may be made of copper, stainless steel, plastic, or numerous other materials. Refrigeration of tube chute 712 may be omitted for aseptic products or other products that do not require refrigeration.

A preferred embodiment of the present invention can also include dispensing switch 716, which can be electrically coupled to a controller (not shown) in beverage dispensing machine 700. Switch 716 and nozzle 702 can be electrically connected to a controller (not shown) via a wire bus (not shown) running from dispense head 714 to the controller (not shown) in the body of machine 718. In alternative embodiments of the present invention, dispensing switch 716 can mechanically actuate nozzle 702.

Figure 24C:
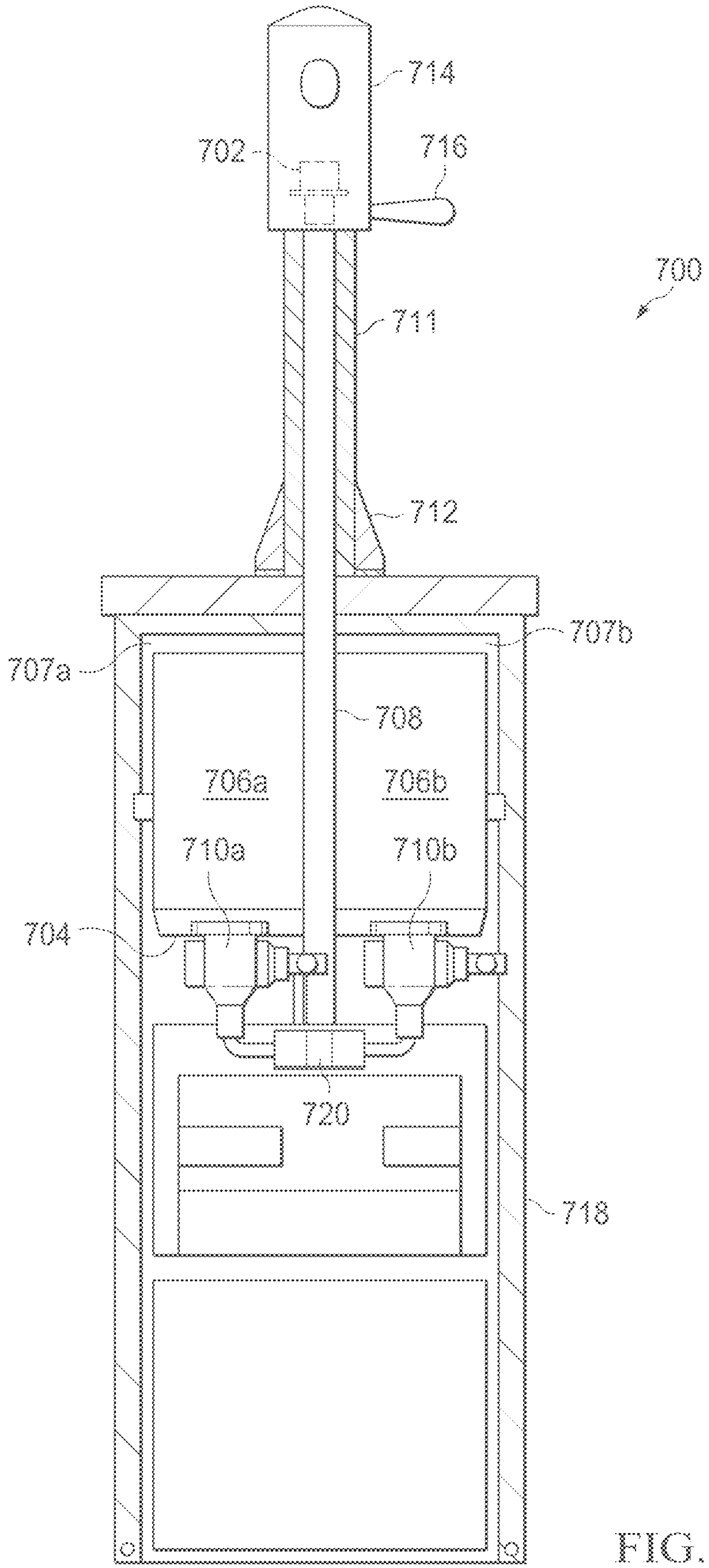

FIG. 24*c* illustrates a side-view of a preferred embodiment of beverage dispenser 700 discussed hereinabove. Beverage dispensing machine 718 contains two product packages 706*a* and 706*b* connected to tube 708 via tee check valve 720. Tee check valve 720 allows product packages 706*a* and 706*b* with the same product to be connected together. Product packages 706*a* and 706*b* each sits in its own separately regulated pressurized chamber 707*a* and 707*b*. By taking pressure measurements and using the volume measurement methods described hereinabove, a controller (not shown) can determine which of the two product packages 706*a* and 706*b* has a lower volume. In alternative embodiments, other methods of measuring the product volume in product packages 706*a* and 706*b* can be used, for example, measuring the weight of the product.

In a preferred embodiment of the present invention, the product package 706*a* or 706*b* with the lower of the two volumes is selected to be the package from which to dispense product first. By applying pressures to each of the two product packages 706*a* and 706*b*, so that the total head pressure of the chamber to be dispensed from slightly exceeds the total head pressure of the chamber not to be dispensed from, flow from the desired chamber can be achieved. In a preferred embodiment of the present invention, a pressure differential of only 0.1 psi between chambers is necessary to cause product to flow from one chamber 707*a* or 707*b* to nozzle 702, while preventing the product from flowing from the other chamber 707*a* or 707*b*.

Figure 24D:
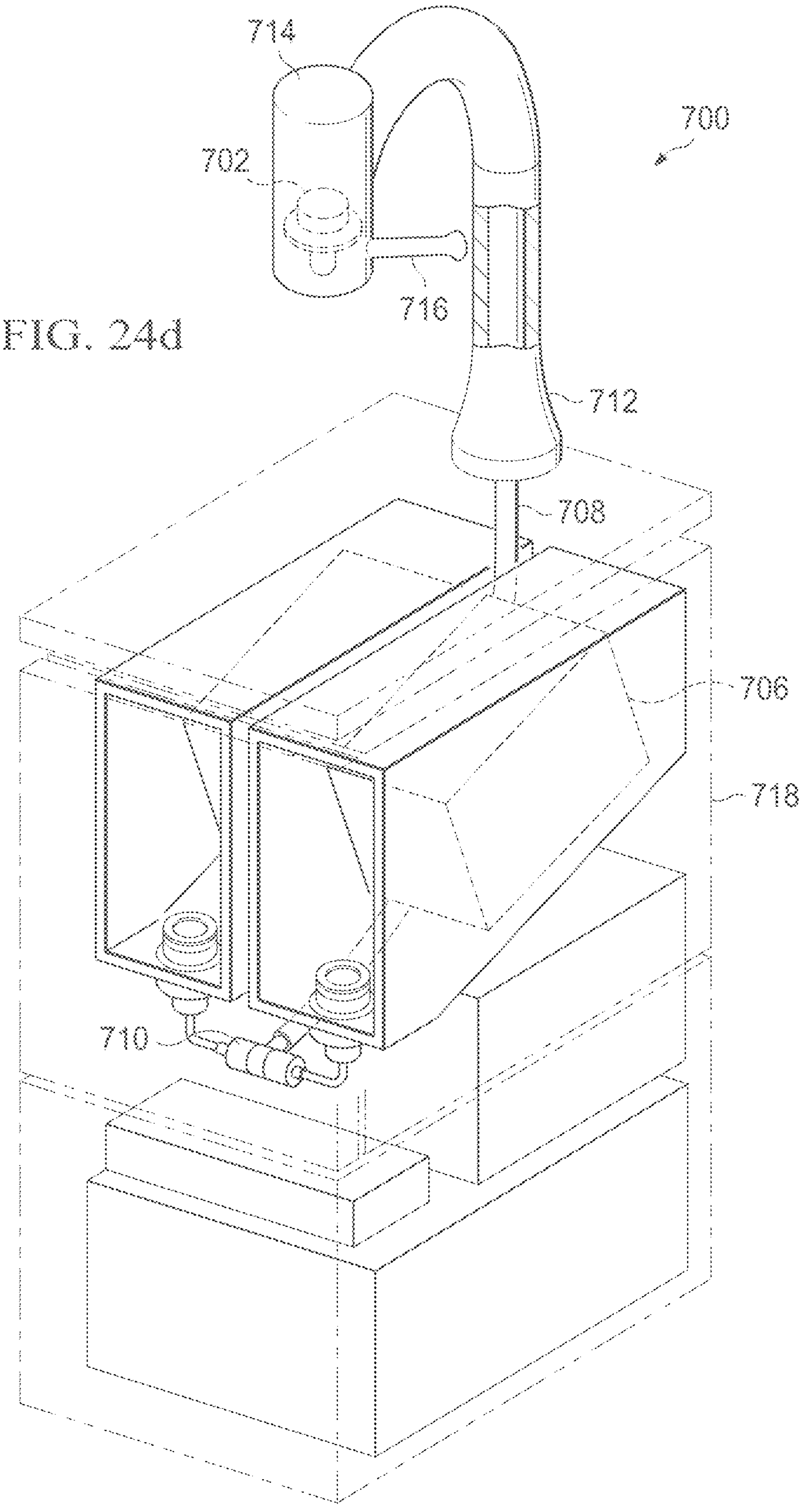
Figure 24E:
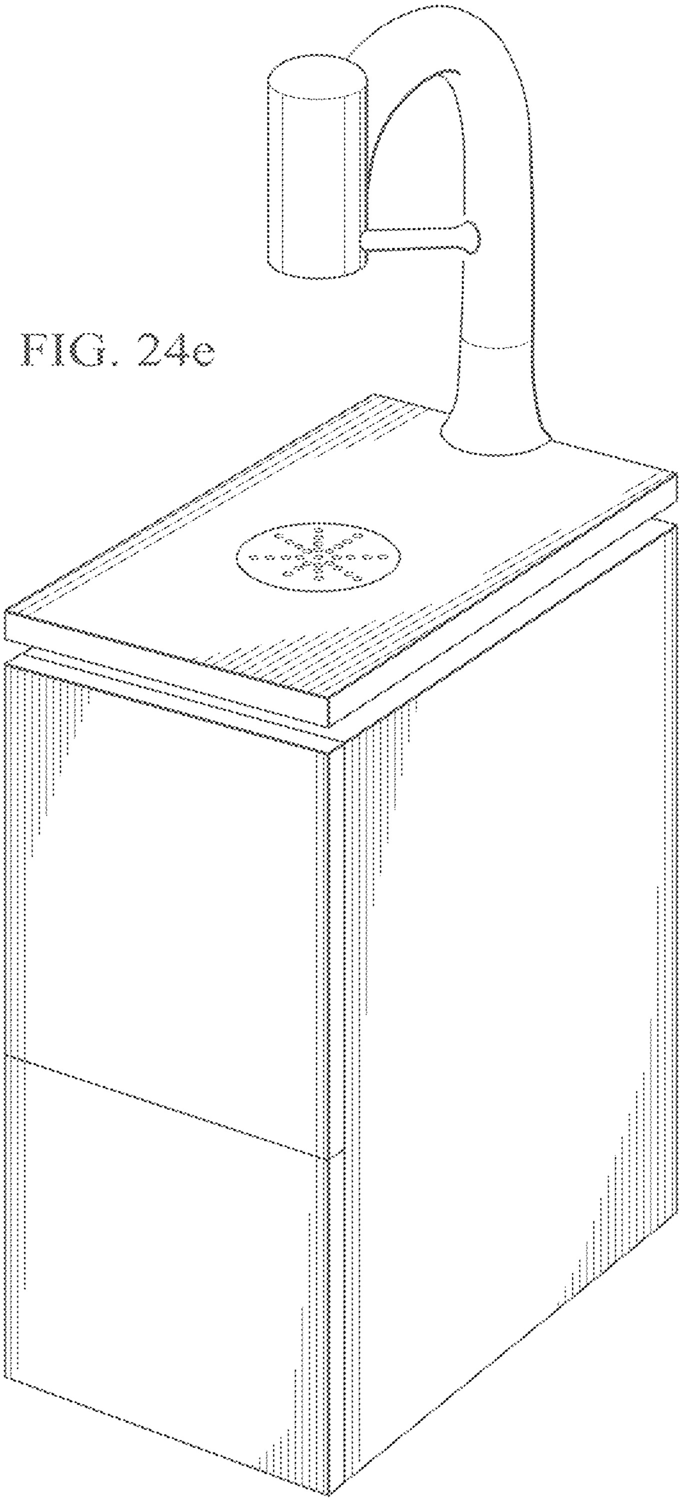

FIG. 24*d* illustrates an isometric view of beverage dispensing machine 700 with its inner components exposed, and FIG. 24*e* illustrates an isometric view of beverage dispensing machine 700 without its internal components exposed.

Figure 24F:
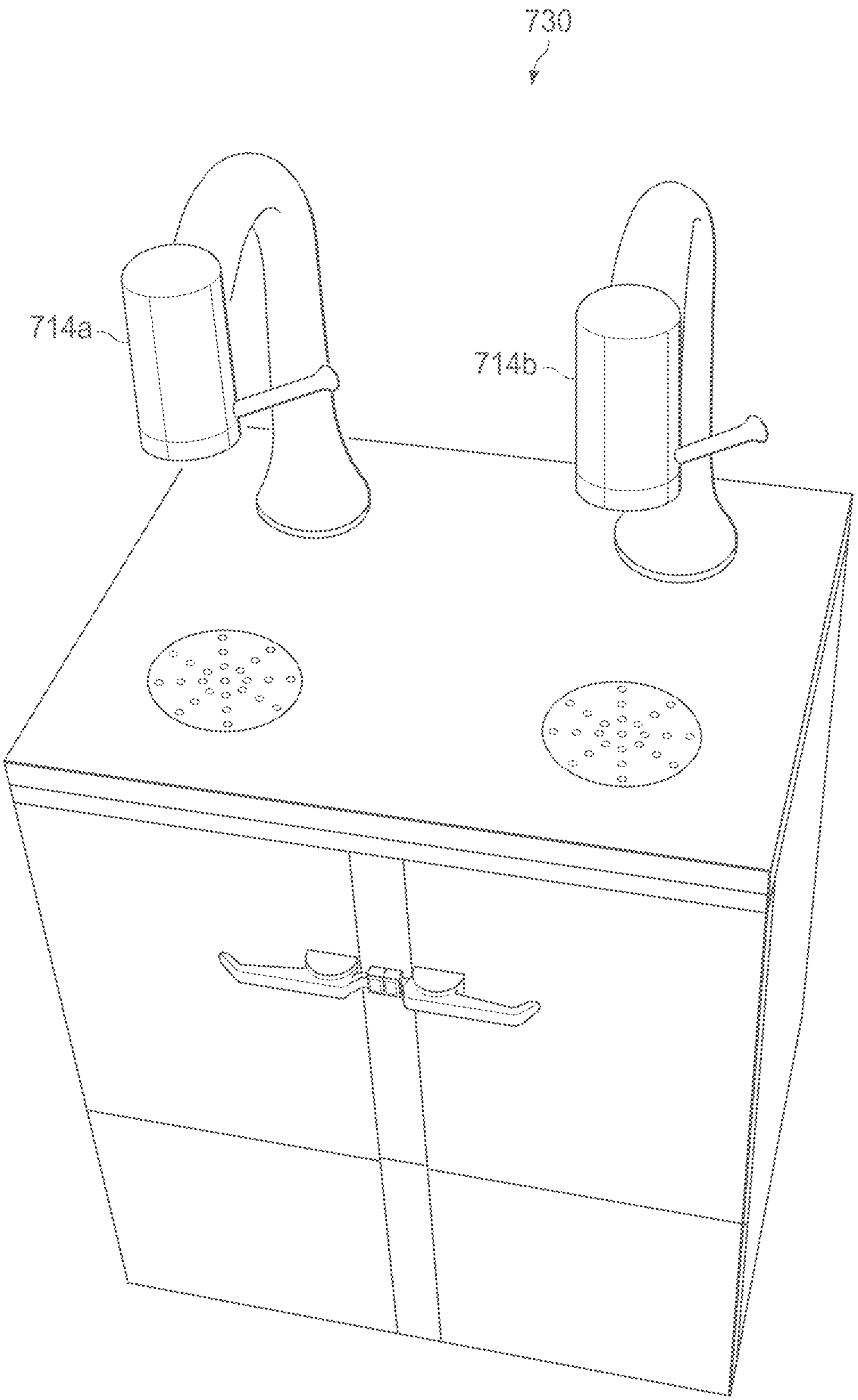

FIG. 24*f* illustrates an alternative embodiment of a preferred embodiment shown in FIG. 24*e*, wherein beverage dispensing machine 730 includes two dispense heads 714*a* and 714*b*. Alternatively, more than two dispensing heads could be included in a beverage dispensing machine.

Figure 24G:
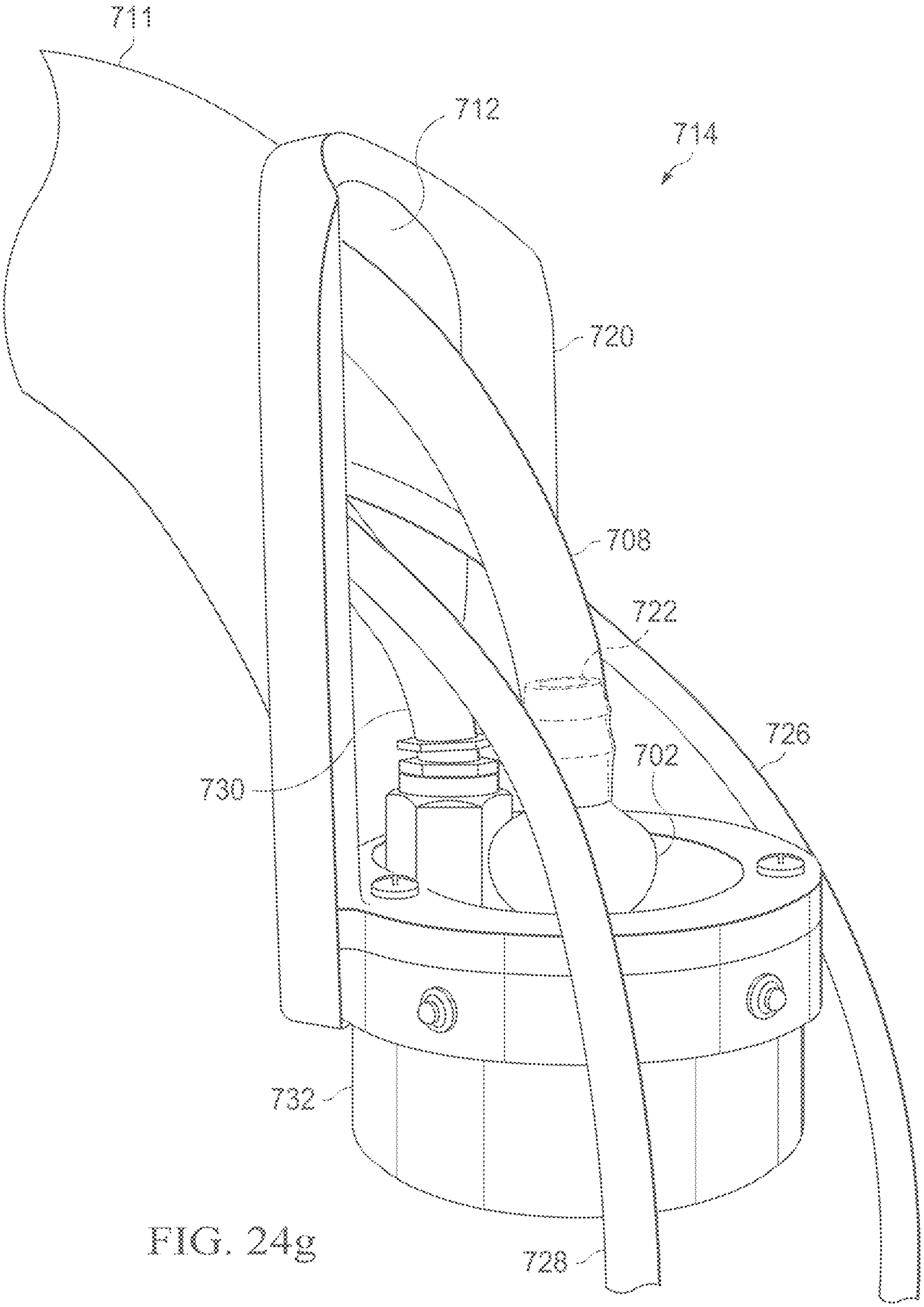

A cut-open view of dispense head 714 attached to neck 711 is shown in FIG. 24*g*. An end of tube 708 exiting tube chute 712 is attached to a barbed end of tube adapter 722 connected to nozzle 702. In addition to product tube 708, water line 730 and cooling lines 726 and 728 are also routed through tube chute 712. Water from water line 730 can be used to mix with the dispensed product and/or to rinse the end of nozzle 702 after product is dispensed. In a preferred embodiment of the present invention, the ends (not shown) of cooling lines 726 and 728 are connected together to allow for a cold liquid, such as water or other liquids, to recirculate within tube chute 712 and dispense head 714 in order to keep the product in tube 708 cool. Cup 732, which holds nozzle 702, also comprises a mechanical nozzle drive (not shown) which actuates nozzle 702, thus allowing for product to be dispensed.

Figure 24H:
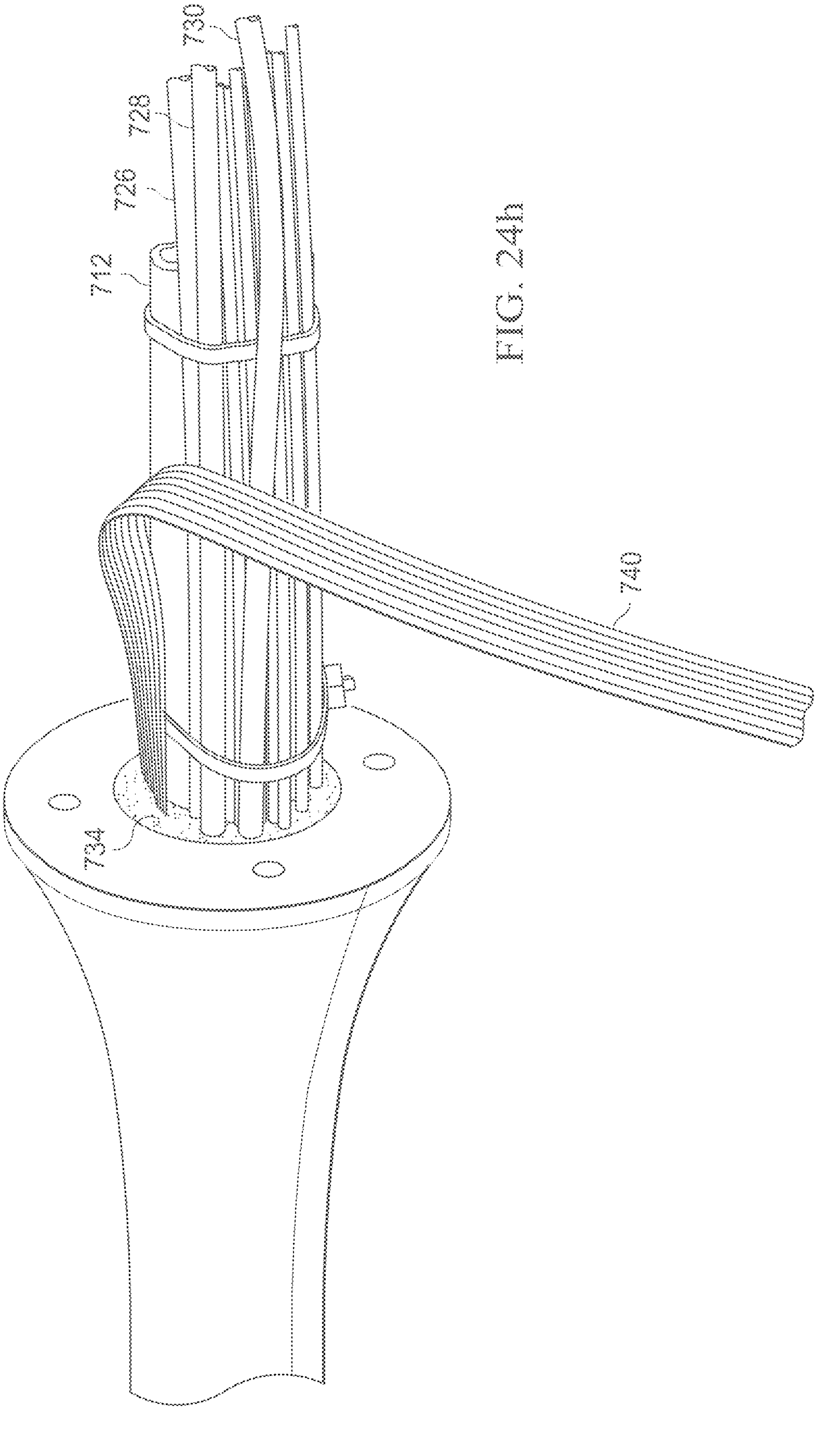

FIG. 24*h* shows a bottom view of neck 711 including tube chute 712 extending from the bottom end of neck 711. Water line 730 and cooling lines 726 and 728 encased in insulation 734 are also shown routed through neck 711. In a preferred embodiment of the present invention, water line 730 can cooling lines 726 can be made of copper or other metals, or rigid or flexible plastic materials such as PVC or polyethylene. Insulation 734 may comprise spray-on foam insulation such as polyurethane foam. Other types of foam and non-foam insulation may be used also. Electrical bus 740, which is also routed through neck 711, provides signaling and power to and from dispense switch 716 (FIG. 24*a*) and actuators (not shown) present on nozzle 702 (FIG. 24*a*). These embodiments may be used with any compatible embodiment or combination of embodiments disclosed herein, such as the embodiments disclosed in FIGS. 2-3, 8, 23 and 25, for example.

In the prior art, an open fluid container generally is filled from the top as the container captures liquid from a dispenser. Typically, the open fluid container is disposed under a nozzle or valve, the nozzle is opened, and the container is filled with product flowing out of the nozzle and through the top of the container. In a preferred embodiment of the invention, FIGS. 25*a* and 25*b* illustrate a beverage dispenser system 800 and a method for filling a pitcher or other storage container from the bottom of a container 802.

Figure 25A:
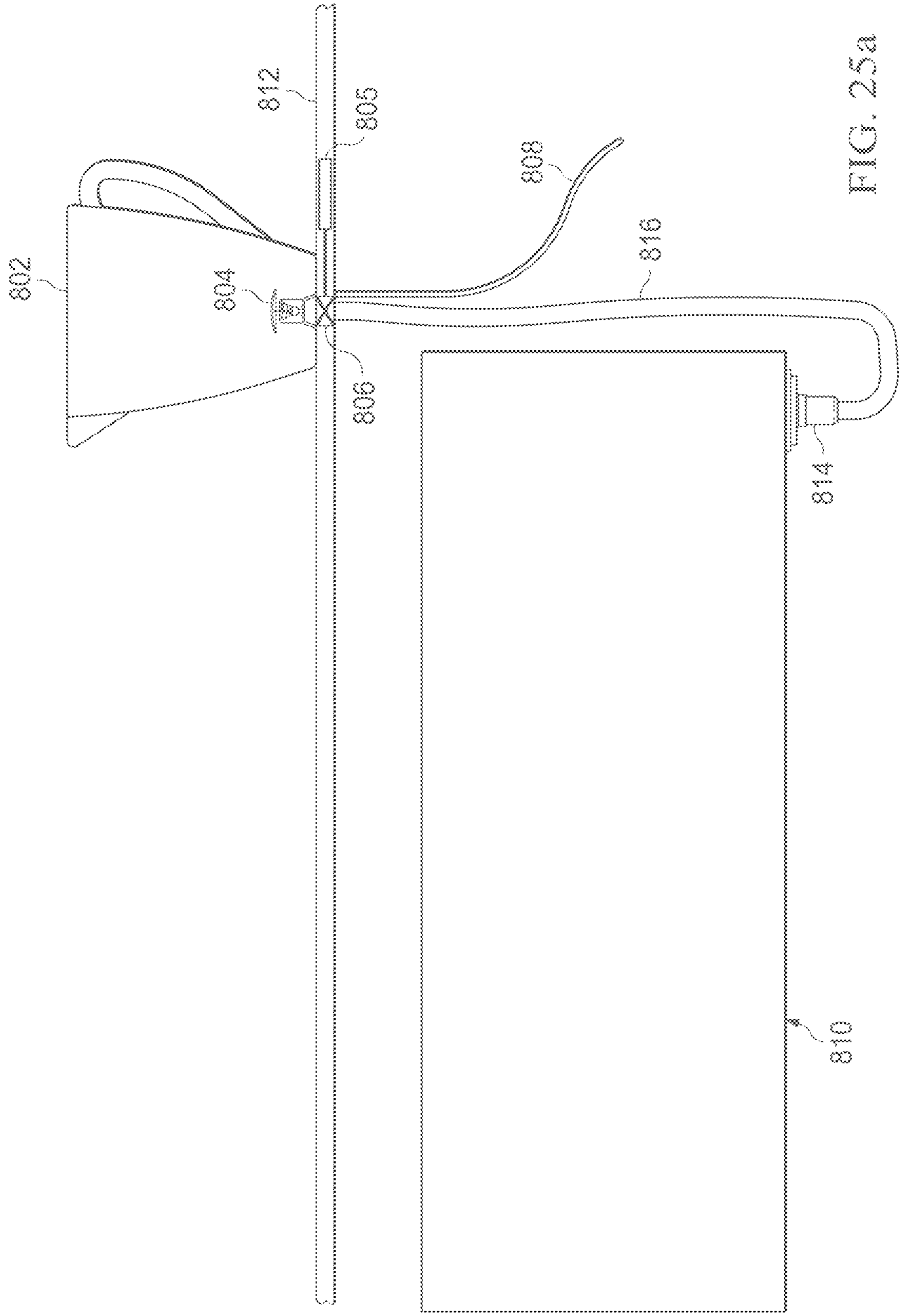
FIGS. 25*a* and 25*b* illustrate an embodiment of a remote container beverage dispensing system.

As shown in FIG. 25*a*, by placing a container 802 with a check valve 804 on top of a milk valve 806 that acts to both open the check valve 804 and dispense liquid into container 802, both the check valve 804 and milk valve 806 may be opened by valve actuator 805 to allow the product to be forced into container 802.

When container 802 is removed from milk valve 806, check valve 804 on container 802 closes, generally preventing product from flowing back out the bottom of container 802. A rinse supplied by water line 808 may be added to milk valve 806 to rinse the bottom of container 802 upon removal so that container 802 is substantially cleaned of any product residual on the outer surface. In a preferred embodiment of the present invention, milk tube set 816 is connected on one end to main product storage container 810 by adapter 814 and is connected to milk valve 806 on the other end. This system and method allow the main product storage container 810 to sit underneath countertop 812 while providing a way to transport the product up past countertop 812 and into container 802.

Figure 25B:
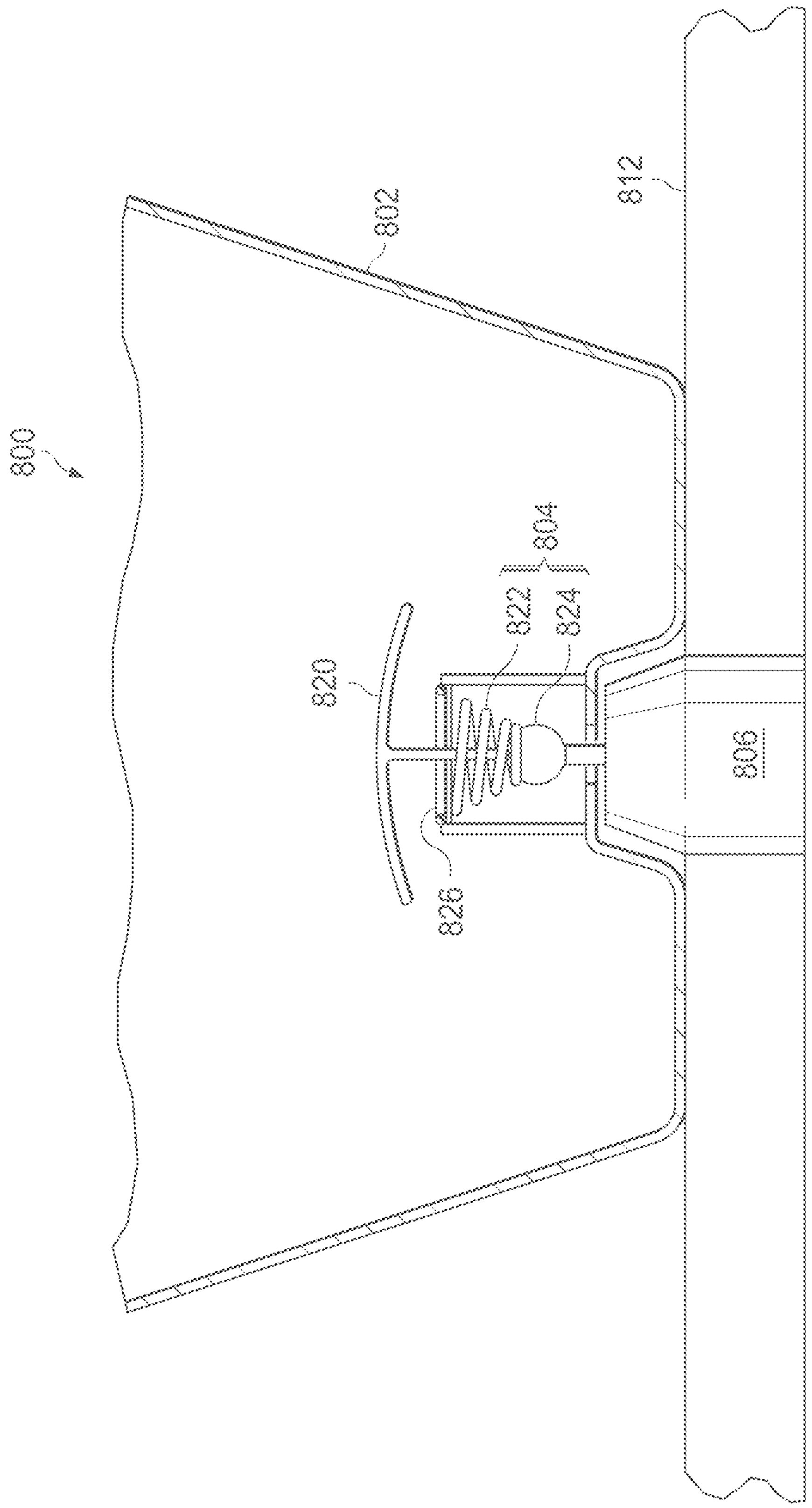

FIG. 25*b* shows a detailed view of the bottom of container 802, check valve 804, and milk valve 806. Check valve 804 includes a flow diverter 820, a spring 822, a valve ball 824, a check valve actuator 805, and an o-ring seal 826. Flow diverter 820 diverts the flow of product when check valve 804 is open so that product does not shoot directly out of container 802. O-ring seal 826 provides a seal between check valve 804 and the bottom of container 802, thereby preventing liquid from leaking from the bottom of container 802.

Alternatively, container 802 may be filled from the side instead of the bottom. The connection from container 802 to check valve 804 may be modified accordingly. Another alternative is to electromechanically open and close check valve 804 of container 802 instead of relying upon milk valve 806 to push open check valve 804. This may further assist in preventing any backflow as container 802 is disengaged from the fill nozzle or milk valve 806. Alternatively, a combination of electromagnetic and nozzle forces may be used to control check valve 804 of container 802. These embodiments may be used with any compatible embodiment or combination of embodiments disclosed herein, such as the embodiments disclosed in FIGS. 2-8, 23 and 26, for example.

Prior art soda dispensers may implement automatic product changeover. Generally, vacuum sensors either mechanically or electromechanically switch from an empty product container to a full container by sensing the level of vacuum pulled on the empty container.

A preferred embodiment of the invention is a beverage dispensing system and method for automatic changeover from used (e.g., empty) to new (e.g., full) product containers. As illustrated in FIGS. 26*a*-26*d*, check valves 1310 and 1312 may be used in combination with a pressurized dispensing system, as disclosed herein, to automatically change a dispenser from an empty product bag to a full product bag.

FIGS. 26*a*-26*d* illustrate a functional system level view of an embodiment of the present invention. Liquid product is located in two separate pressure chambers 1302 and 1304, labeled "chamber 1" and "chamber 2" in the figures. In preferred embodiments, each chamber 1302 and 1304 contains liquid product stored in a bag-in-box container or other container that comprises flexible walls so that pressure present in the chamber can be applied to the liquid product. Each chamber 1302 and 1304 is connected to a check valve 1310 and 1312 and oriented so that product generally flows away from each chamber, but product is prevented from flowing back toward each chamber. Liquid product that flows out of check valves 1310 and 1312 can be combined by a tee section 1314 and directed toward nozzle 1316. If one chamber is pressurized, product flows from that chamber, through its check valve, through the tee, and then up the common tube set tube 1315 to the exit nozzle. Generally, the product does not flow into the other bag because the other bag's check valve prevents backward product flow.

Figure 26A:
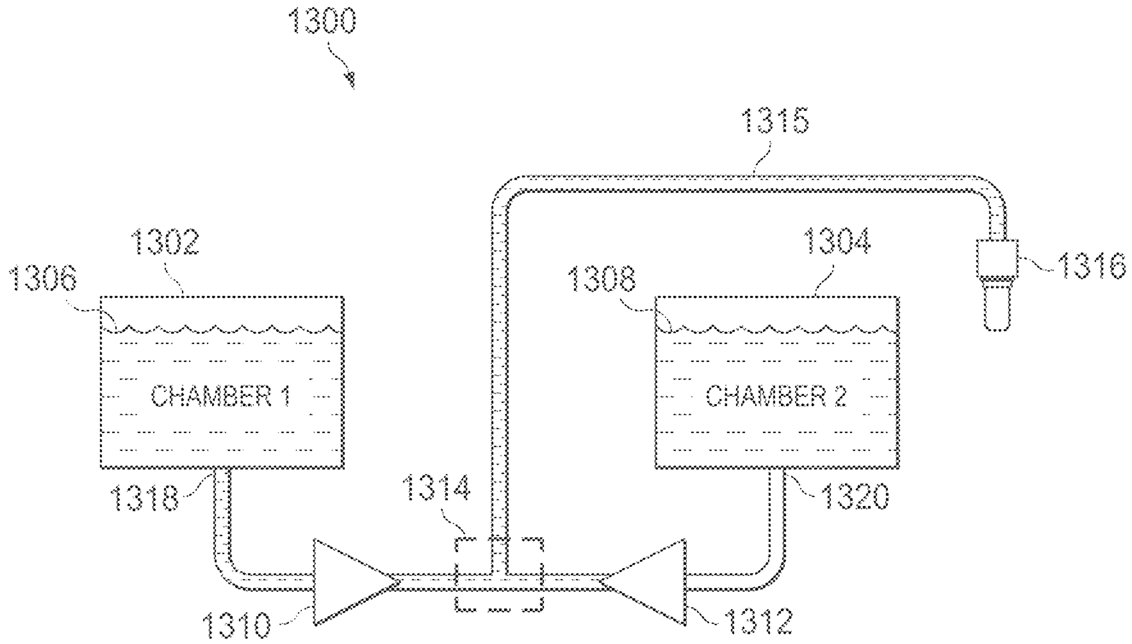
FIGS. 26*a*-26*d* illustrate an embodiment system and method of an automatic changeover system for beverage dispensing.

FIG. 26*a* illustrates a typical initial condition for dispensing machine 1300 where both product chambers 1302 and 1304 are filled with product, as denoted by product level indicators 1306 and 1308. Pressure is applied to both chambers 1302 and 1304, so that the pressure applied by the liquid product at exit point 1318 at the first chamber 1302 exceeds the pressure applied by the liquid product at exit point 1320 at the second chamber 1304. In preferred embodiments of the present invention, the pressure at exit point 1318 at the first chamber 1302 exceeds the pressure applied by the liquid product at exit point 1320 at the second chamber 1304. When nozzle 1316 is open, product will flow from first chamber 1302, through check valve 1310, tee section 1314 and out through nozzle 1316. Product will not flow through check valve 1312 and into second chamber 1304 because the pressure at the output of check valve 1312 exceeds the pressure at the input to check valve 1312.

In preferred embodiments of the present invention, beverage dispensing system 300 will select which bag to empty first. For example, beverage dispensing system 300 may select to dispense the liquid product from the container that contains the least amount of liquid product. Alternatively, the system can dispense a user selected chamber first. The system can determine the volume present in each container using the volume measurement techniques described hereinabove. For example, the volume of the liquid product present in each chamber can be determined by using differential pressure measurements described hereinabove. Alternatively, the volume of the product in each chamber can be measured using other methods, such as weighing the liquid product.

Figure 26B:
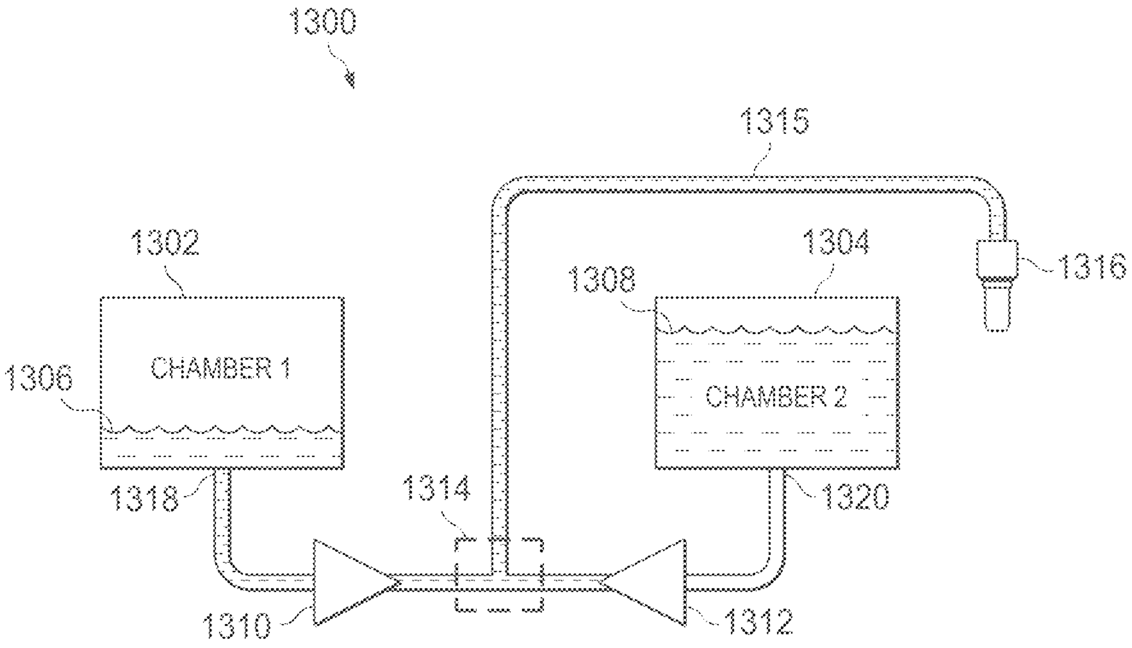

Turning to FIG. 26*b*, product level 1306 of first chamber 1302 is shown to be at a low level. In a preferred embodiment of the present invention, the pressure applied to first chamber 1302 is increased so that the remaining product can be squeezed from the first chamber 1302. In some embodiments the pressure may be increased when the product level of the first chamber 1302 reaches about 5% of its full capacity, and in other embodiments, the pressure may be increased when the product level reaches about 1% or about 0.5% of full capacity. Alternatively, other levels above and below 5% of full capacity may be chosen at the point at which to start increasing pressure to the first chamber 1302. As first chamber 1302 is emptying, the pressure of second chamber 1304 may be increased to the pressure of first chamber 1302 less a small amount of pressure, for example, in the range of about 0.05 psi to about 1.0 psi. By making the pressure of first chamber 1302 higher than the pressure of second chamber 1304, product generally will flow from first chamber 1302 until it is substantially empty.

Alternatively, as first chamber 1302 is emptying, the pressure in first chamber 1302 may be increased above the system product compartment pressure to help evacuate the product from first chamber 1302. Because first chamber 1302 is close to empty, any increased flow from first chamber 1302 generally is immaterial as the liquid of first chamber 1302 is combined with the liquid of second chamber 1304. The increased pressure in first chamber 1302 may be maintained for a predetermined time period after the changeover to help force out any residual product in first chamber 1302. This generally does not impact the product dispensing from second chamber 1304 because, although the pressure in first chamber 1302 is higher than that in second chamber 1304, the actual pressure introduced into the tube 1315 from first chamber 1302 generally is less than that from second chamber 1304 if little or no product is coming out of first chamber 1302.

Figure 26C:
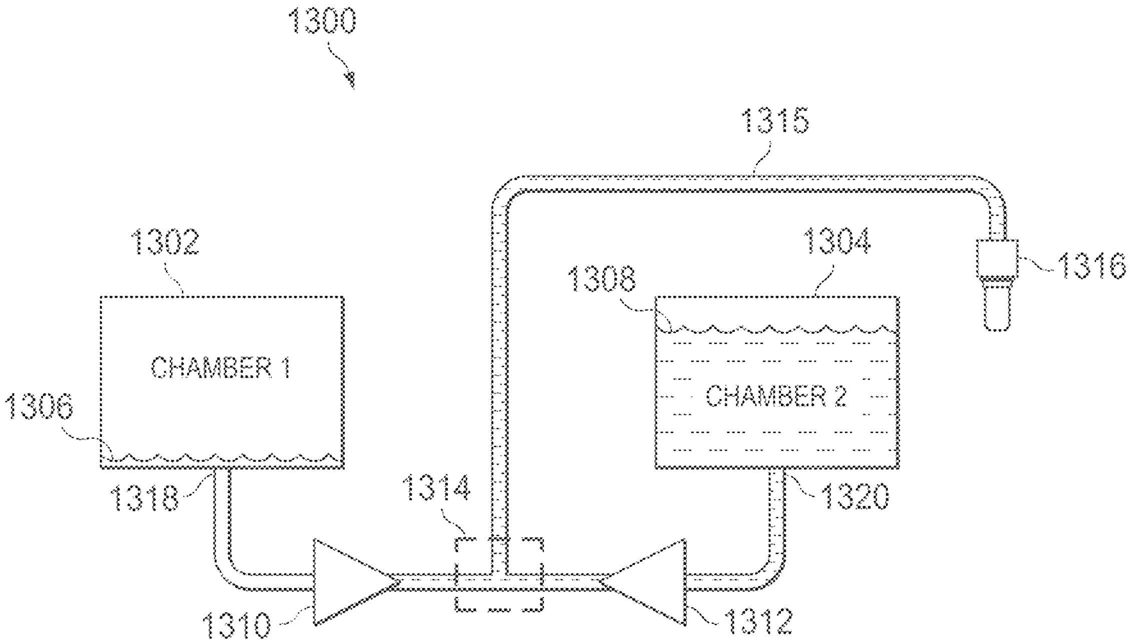

As the product empties from first chamber 1302, second chamber 1304 may be pressurized so that its product may begin flowing out of second chamber 1304, as shown in FIG. 26*c*. As first chamber 1302 empties, second chamber 1304's product is ready to take the place of first chamber 1302's product. After first chamber 1302 is substantially empty, the pressure in second chamber 1304 may be increased by a small amount of pressure to the target system pressure. This generally allows for a transparent changeover from first chamber 1302 to second chamber 1304. As long as the pressure of second chamber 1304 is higher than the atmospheric pressure plus any head pressure that must be overcome at exit point 1320, product generally will flow from second chamber 1304 to nozzle 1316. If the pressure in first chamber 1302 is removed or sufficiently reduced, its check valve 1310 will close and the product from second chamber 1304 generally will be prevented from entering into the empty first chamber 1302.

Figure 26D:
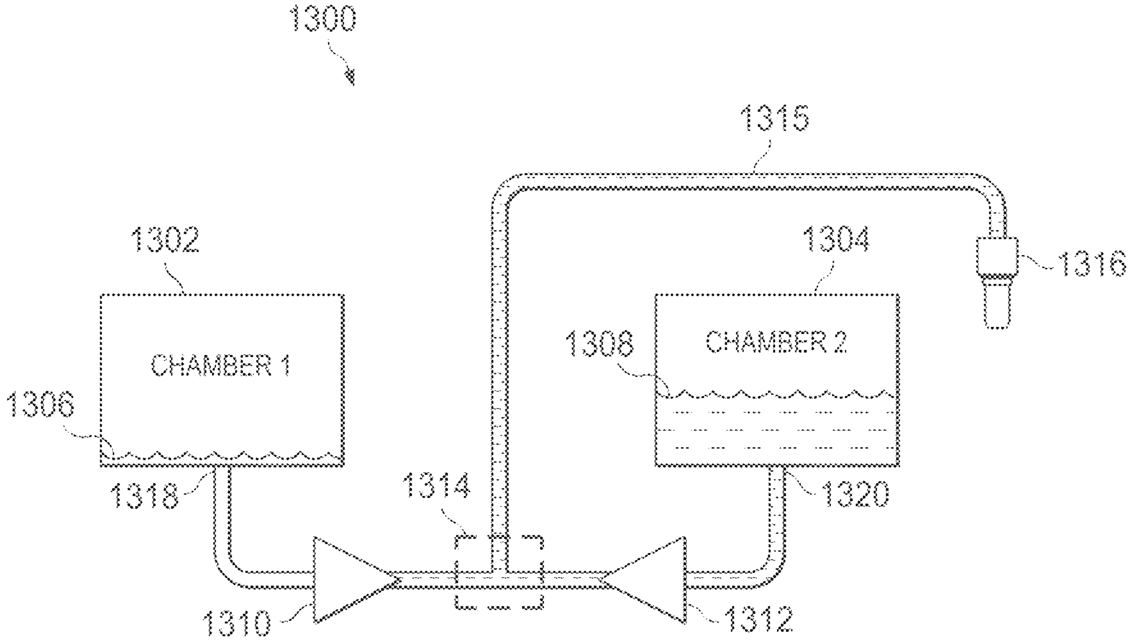

FIG. 26*d* illustrates the system as second chamber 1304 is emptying. As second chamber 1304 empties, the pressure applied to second chamber 1304 continues to be increased in order to compensate for the decrease in head pressure due to the decreased head height.

An advantage of this system and method is that it is very effective in emptying first chamber 1302 substantially completely while allowing a seamless changeover to second chamber 1304. The changeover may take place over a longer time period, such as one, two or more minutes of operation, versus a split-second of time when a determination of empty is made as happens in most prior art automatic changeover systems.

Figure 27A:
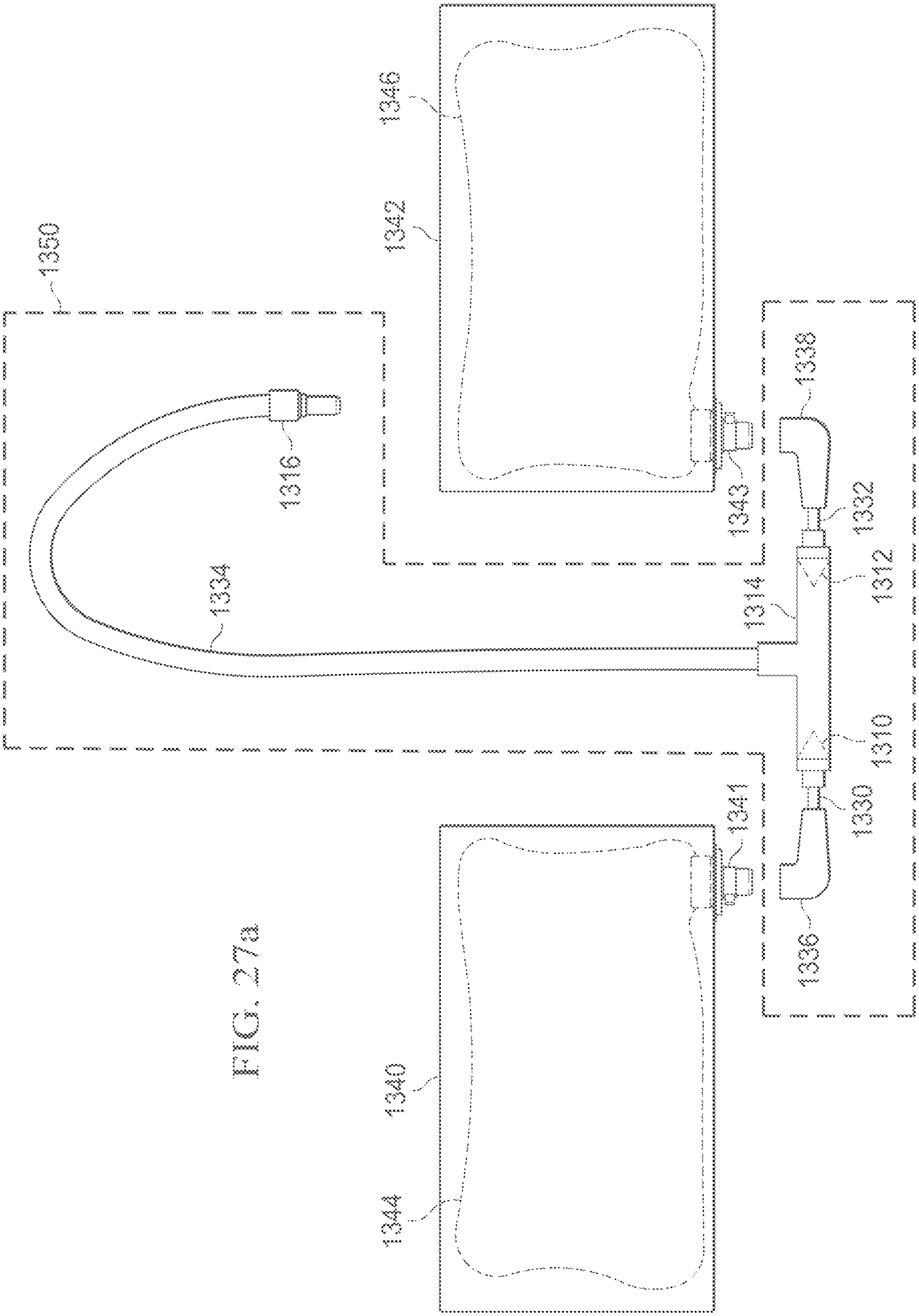
FIGS. 27*a* and 27*b* illustrate tube set embodiments.

In preferred embodiments of the present invention, check valves 1310 and 1312, tee connector 1314, quick disconnect valves 1336 and 1338, tube sections 1330, 1332 and 1334, and nozzle 1316 can be included in tube set 1350 shown in FIG. 27*a*. Tube set 1350 is preferably disposable. Typically, bag-in-box storage containers 1340 and 1342 comprising product bags 1344 and 1346, respectively, are discarded after all of the product has been dispensed from each bag 1344 and 1346. Tube set 1350, on the other hand, can be discarded after product from multiple bag-in-box containers has been dispensed. Quick disconnect valves 1336 and 1338, which couple tubes 1330 and 1332 to bag adapters 1341 and 1343, respectively, can be designed to easily snap on and off bag adapters 1341 and 1343 according to conventional techniques used in the art. In preferred embodiments of the present invention, quick disconnect valves 1336 and 1338 comprise a female configuration, however, in alternative embodiments of the present invention, other configurations, such as a male configuration, may be used. In some embodiments, bag adapters 1341 and 1343, or quick disconnect valves 1336 and 1338 may include shutoff valves built into them to allow for easy connection and disconnection to prevent spills. The connection allows each bag's content to flow out of bag 1344 or 1346 and into tube set 1350.

In preferred embodiments of the present invention, check valves 1310 and 1312 are included within tee connector 1314. In alternative embodiments, however, check valves 1310 and 1312 may be positioned outside of tee connector 1314. For example, check valves 1310 and 1312 may be integrated in bag adapters 1341 and 1343, or as independent sections attached to tubes 1330 and 1332.

Tube set 1350 may be implemented with lasting materials and cleaned in place, or it may be implemented with low cost materials and replaced on a routine basis, such as from a couple of hours to a couple of weeks. Advantages of using disposable low cost materials include the ability to easily maintain and clean a sanitary beverage dispensing system without incurring high maintenance costs. In alternative embodiments of the present invention, a combination or subset of the elements that comprise tube set 1350 may be disposable, while other elements are constructed to be long lasting. Numerous or all parts of tube set 1350 may be recycled, cleaned for additional use, or disposed of. For example, tubes 1330, 1332 and 1334 may be disposable, but tee connector 1314 may not be disposable. Furthermore, tube set 1350 may have various nozzle styles connected to its end. The check valves, tee, and adapters may be made from numerous materials, including polyethylene, polypropylene, nylon, or stainless steel.

Figure 29:
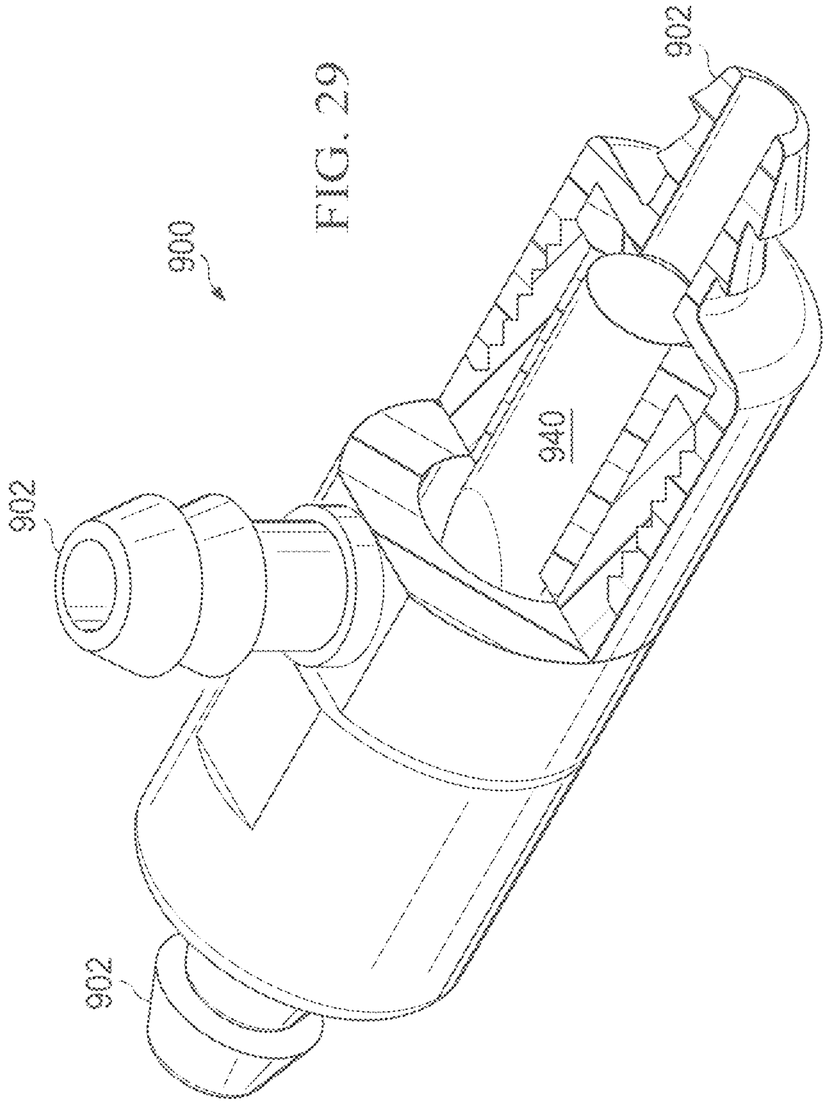
FIG. 29 illustrates an embodiment of a liquid tee.

FIGS. 28*a*-28*d* illustrate isometric and cross-sectional views of tee connector 900 according to a preferred embodiment of the present invention. Tee connector 900 includes barbed fittings 902 which couple to product tubes. Internal to the tee connector 900 are check valves 940. FIG. 29 illustrates a partially transparent three-dimensional view of tee connector 900.

An example of a system which utilizes the automatic bag changeover system described hereinabove is illustrated in FIG. 24*c*. Product packages 706*a* and 706*b* are shown connected to tee connector 720, which is in turn connected to nozzle 702 via tube section 708.

These embodiments may be used with any compatible embodiment or combination of embodiments disclosed herein, such as the embodiments disclosed in FIGS. 1, 23-25 and 30, for example.

Figure 27B:
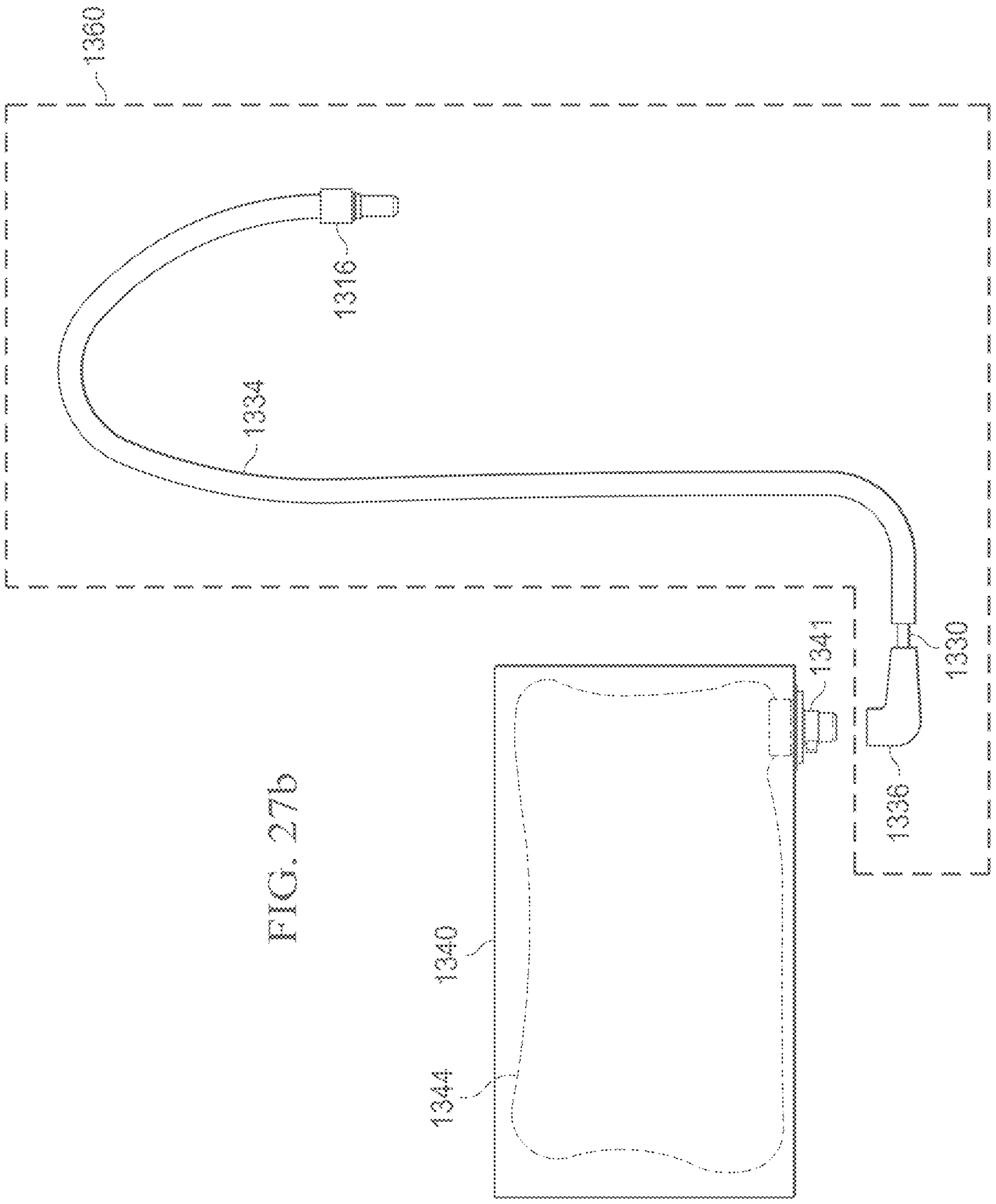
Figure 28D:
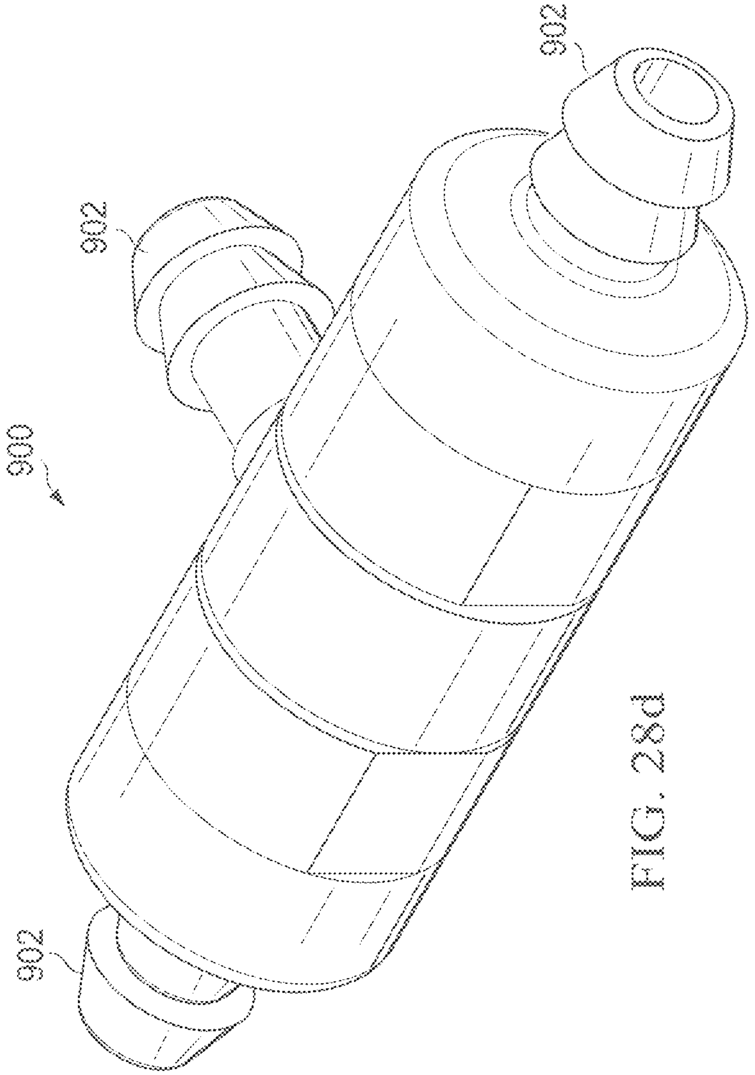

For example, in beverage dispensing systems that only utilize a single bag-in-box product source, tube set 1360 shown in FIG. 27*b* can be used. Tube set 1360 is similar to tube set 1350 shown in FIG. 27*a*, but does not include the tee section used to combine two product sources. Quick disconnect valve 1336, tubes 1330 and 1334, and nozzle 1316 function similarly, and are constructed similarly as described hereinabove.

In the beverage dispensing industry, the blending of two or more products to create a specific drink routinely occurs. For example, orange juice machines blend concentrated orange juice and water to produce orange juice, and soft drink machines blend carbonated water and syrup to produce soft drinks. The rate of water carbonation and syrup addition are controlled with mechanical and electromechanical valves. Once the valves for the carbonator, water, and syrup are initially calibrated and set, the system generally yields properly calibrated drinks. In addition, there are pressure regulating and other similar devices employed to ensure the integrity of the system. Some newer soft drink machines blend a flavoring with the syrup and carbonated water to create a flavored soft drink. Within the dairy beverage dispensing industry, however, milk usually is dispensed directly as milk.

Figure 30A:
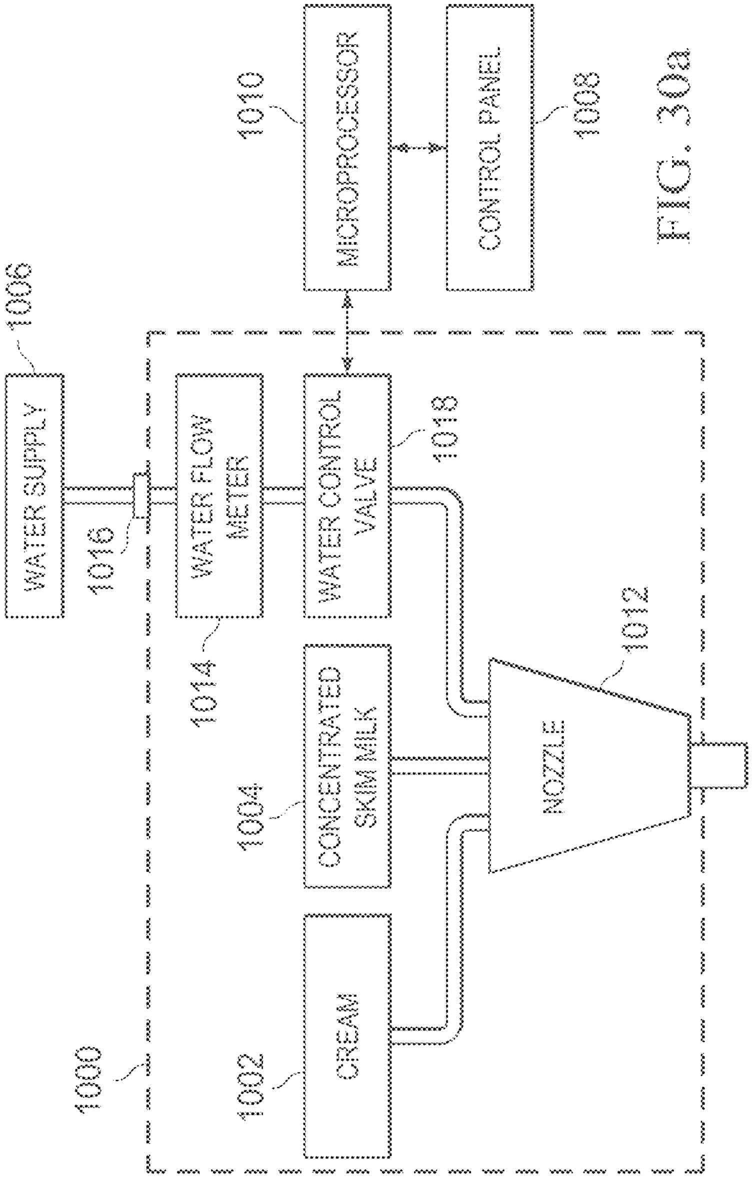
FIGS. 30*a*-30*e* illustrate embodiment systems for dispensing and mixing beverages.

In preferred embodiments, a system and method for beverage dispensing blends two or more separate components in varying amounts to create numerous different types of drinks. The beverage dispenser system and method provide multiple output products from minimal product inputs, and may deliver the products with a variety of techniques. In a preferred embodiment, as illustrated in FIG. 30*a*, a dairy beverage dispensing system 1000 and associated method dispense dairy products through a dispensing system and blends the dairy products with water to create numerous different dairy drinks. Alternatively, liquids other than dairy may be accurately mixed according to desired formulations.

With respect to dairy products, water may be added to concentrated milk to deliver milk. Milk may be separated into cream and skim milk. The cream and skim milk may be recombined to form various fat percentage milk drinks, including skim milk, known as non-fat milk, 1% fat milk, known as low-fat milk, 2% fat milk, known as reduced-fat milk, 3% to 4% fat milk, known as whole milk, and 12.5% fat milk, which is half whole milk and half cream, known as half & half. Furthermore, the skim milk portion of the milk may be concentrated. Therefore, using separate concentrated skim milk, cream, and water products, it is possible to mix and produce a large variety of milk products, including non-fat milk, low-fat milk, reduced-fat milk, whole milk, and half & half. Generally, the cream should be a cream source of high enough percentage of butterfat to enable desired drinks to be formulated when it is combined with the concentrated skim milk source and water, depending on the specific application.

The method of separating milk into cream and skim milk or concentrated skim milk is employed in the dairy industry when producing ice creams, yogurts, and milks in large scale commercial production facilities. Preferred embodiments of the present invention provide a system and method for accurately combining appropriately prepared cream, concentrated skim milk and water through a beverage dispenser to create numerous dairy products, preferably from only two dairy sources. Furthermore, the beverage dispenser may provide these dairy products at the individual serving level and may provide a different dairy product from one individual serving to the next.

Again, FIG. 30*a* illustrates a preferred embodiment system 1000 and an associated method for dispensing dairy beverages, wherein the system and method accurately combine cream 1002, concentrated skim milk 1004, and water from supply 1006 to generate numerous dairy products from only the two dairy sources. The system and method may comprise a tube set component that may be easily replaced and disposed of to minimize cleaning requirements. The beverage dispenser can comprise a control panel 1008, a controller such as a microprocessor 1010, flow rate meters, such as water flow meter 1014, fluid pumps (not shown), control valves, such as water control valve 1018, a tube set, and a nozzle 1012.

Control panel 1008 provides an input for the user to indicate the type of product desired. Within the realm of milk products, the user might select non-fat, low-fat, reduced-fat, whole milk, or half & half. Microprocessor 1010 may sense signals from control panel 1008 for a specific drink, and then may formulate the proper ratio of water, skim milk concentrate, and cream to produce the drink. Microprocessor 1010 then may modulate in real time (on the fly) the flow rate of all three liquids to deliver the correct ratio drink.

For example one low-fat drink might have the ratio of 1 part cream, 5 parts skim concentrate, and 10 parts water dispensed. Another higher fat drink might have the ratio of 3 parts cream, 5 parts skim concentrate, and 12 parts water dispensed. Here the ratio of cream to skim concentrate is increased to yield a higher fat drink.

To accurately ratio the liquids, constant flow rate dispense methods discussed here can be used with respect to cream 1002 and concentrated skim milk 1004. To control the flow rate of the water, water flow meter 1014 can be used along with water control valve 1018 in order to accurately control the flow rate of the water while the product is being dispensed. For example, a preferred embodiment system and method may utilize a magnetic spinner water meter for metering the water and an ideal gas law method outlined hereinabove for metering the cream and skim concentrate. Other metering methods also may be employed, such as magnetic flow meters, measuring changes in weight with mass meters or scales, and the like.

The embodiments comprise fluid pumps to pump the water, skim concentrate, and cream. For example, water inlet 1016 may be connected to water flow meter 1014, water control valve 1018 or a larger facility pump (not shown) that creates pressure to deliver the water. Cream 1002 and skim concentrate 1004 may be pumped by pressurizing a chamber (not shown) surrounding a product such as a bag-in-box as outlined hereinabove. Other pumping methods also may be used to pump the dairy liquids, such as peristaltic pumps, diaphragm pumps, centrifugal pumps, and the like.

Modulating the pump speeds or the control valves or both allows the system and method to control the ratio of the liquids. For water, the system and method may use an electromechanical modulating valve. For the dairy liquids, the system and method may vary the pressure of the pumping chambers to deliver the correct quantity of cream and skim concentrate. At higher pressure, more dairy product is delivered, and at lower pressure, less dairy product is delivered. Another approach that may be employed is to electromechanically modulate a product valve (not shown) to control the delivery of the dairy liquids. By modulating the product valve, the flow rate of dairy liquid is adjusted to deliver the appropriate amount.

In a preferred embodiment of the present invention, all components of the dispensed beverage are mixed and combined in nozzle 1012 as described herein below. In alternative embodiments, however, other methods of mixing the liquid product may be used, such as routing the product flow to a separate mixing chamber and dispensing the product from a single, unified nozzle. Other alternative methods may include using multiple dispense nozzles to dispense cream 1002, concentrated skim milk 1004 and water components of the liquid beverage. In a preferred embodiment, cream 1002 is dispensed from an innermost port, skim concentrate 1004 is dispensed from a middle layer port, and water is flowed around the outer part of nozzle 1012. The result is three streams (inner, middle, and outer) that mix in real time or on-the-fly to deliver a uniform appearing drink made to the user's component specifications.

Figure 30B:
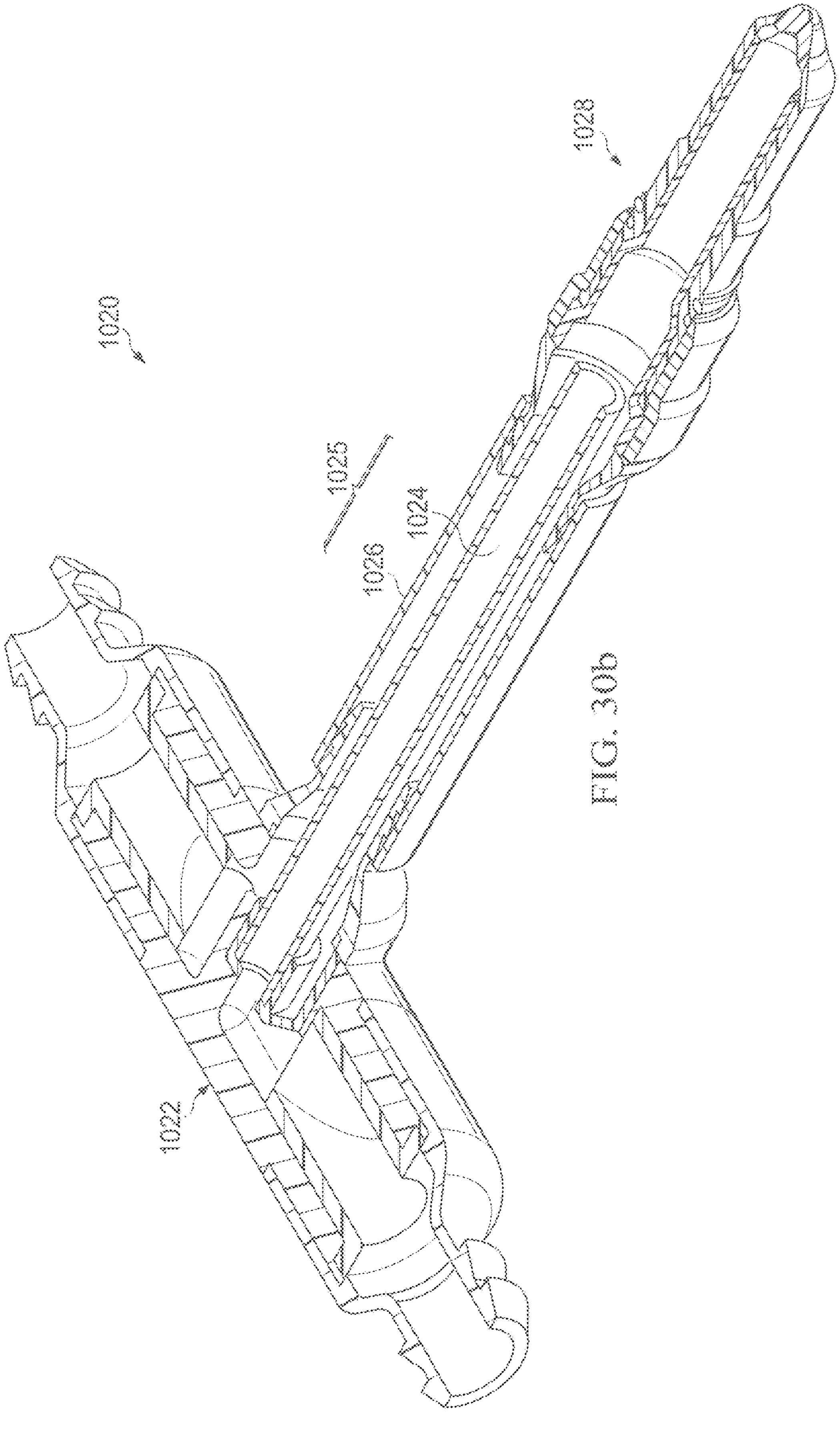

FIG. 30*b* illustrates a preferred embodiment of the present invention that uses a tee hose nozzle assembly 1020 to combine and dispense two liquid components. Tee hose nozzle assembly 1020 includes a two liquid tee 1022 that routes two liquids into concentric hose 1025. Concentric hose 1025 includes an internal tube pathway 1024 and an external tube pathway 1026, and is attached to a unified nozzle 1028, which combines and dispenses two liquids. An advantage of a preferred embodiment disclosed herein is that the two liquids remain separate without commingling until they reach unified nozzle 1028. In a preferred embodiment, internal tube pathway 1024 carries cream and external tube pathway 1026 carries concentrated skim milk. In alternative embodiments of the present invention, other liquid products may be routed through internal tube pathway 1024 and external tube pathway 1026. In a preferred embodiment of the present invention, water can be supplied to the exterior of nozzle 1028 via a separate pathway.

Figure 30C:
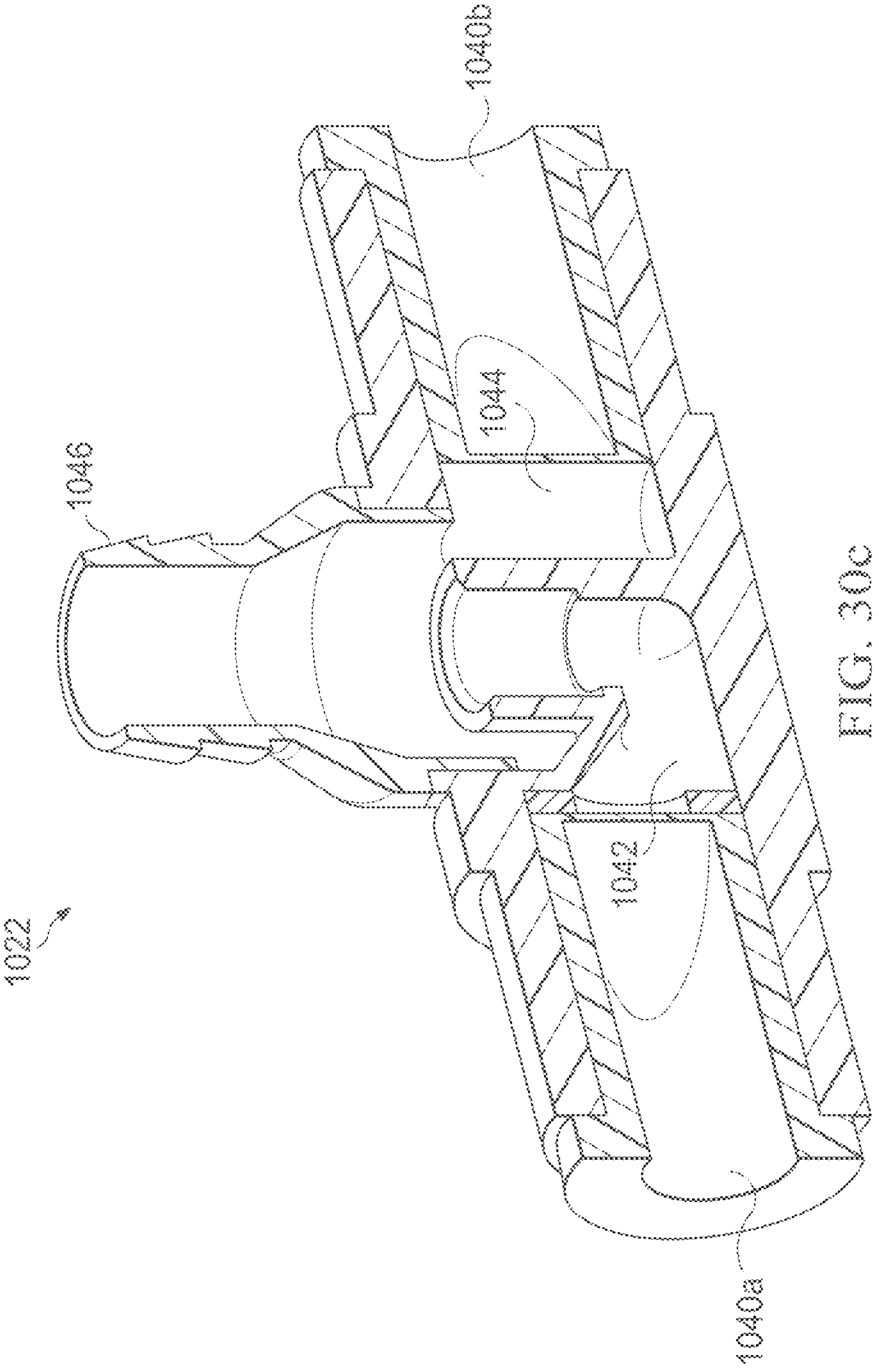

A two liquid tee 1022 is illustrated in FIG. 30*c*. In a preferred embodiment of the present invention, two liquid tee 1022 includes check valves 1040*a* and 1040*b* for each of the two product flow paths, an internal tube pathway 1042 and an external tube pathway 1044. Check valves 1040*a* and 1040*b* prevent product flow back through two liquid tee 1022 and into the product chambers (not shown). Barbs 1046 attached to an output port of two liquid tee 1022 are used to securely attach an end of external tube pathway 1044 to two liquid tee 1022.

Figure 30D:
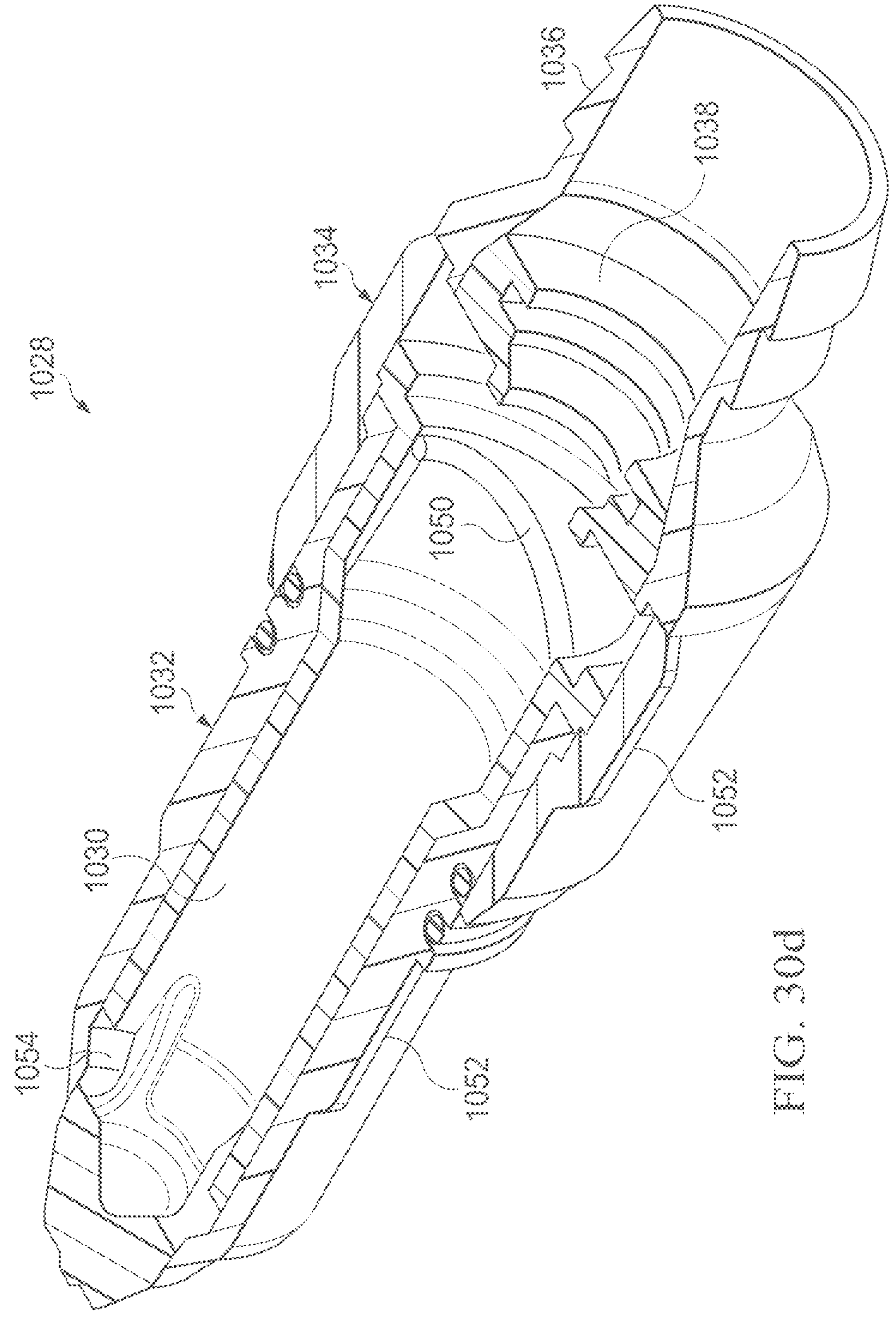
Figure 30E:
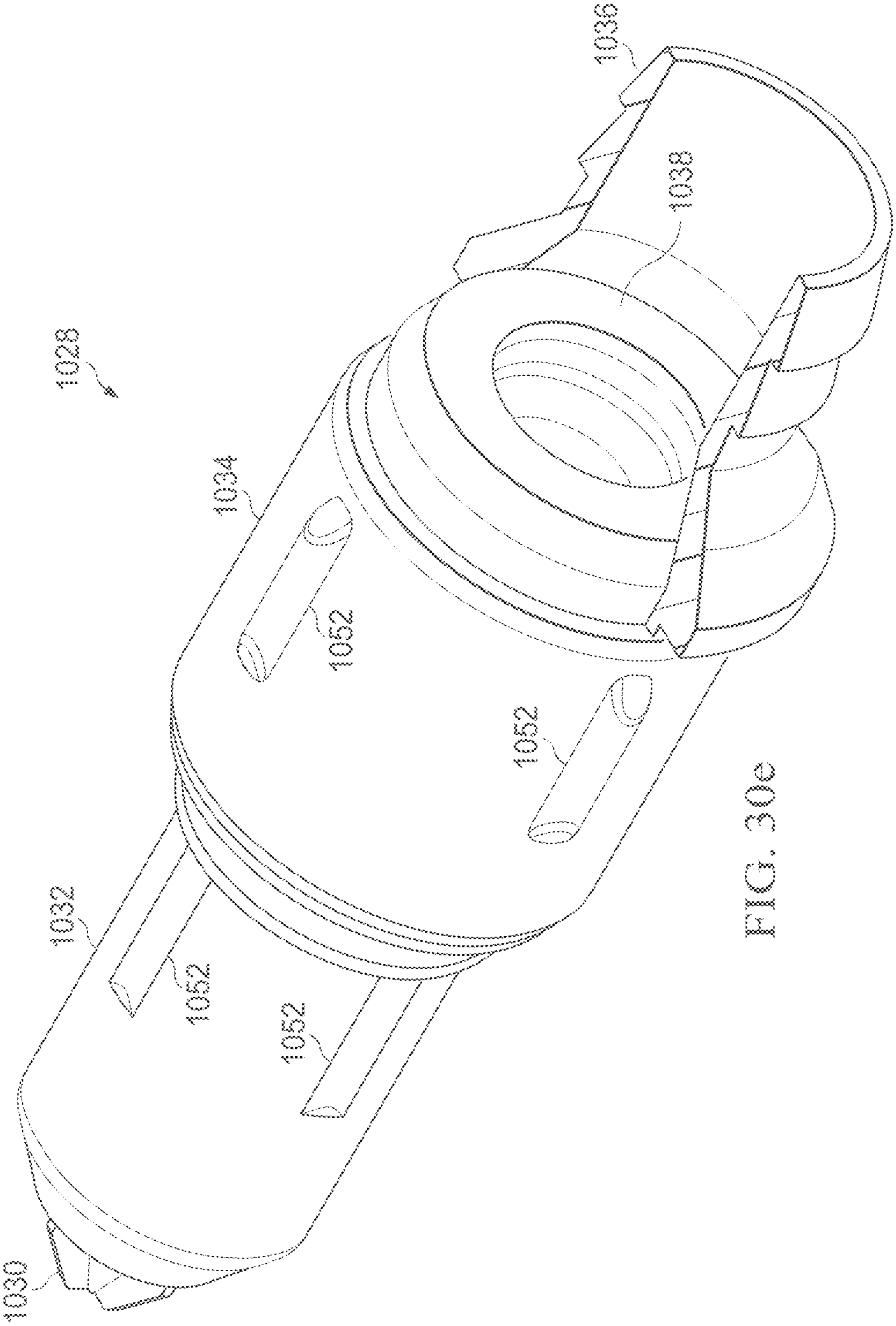

FIG. 30*d* illustrates an isometric cut-away view of a static unified nozzle 1028. Nozzle 1028 includes nozzle body 1032, plunger 1030, adapter 1034, inner tube retainer 1038, and barbs 1036 used to secure an end of the external tube pathway to nozzle 1028. To dispense product, nozzle body 1032 is rotated with respect to adapter 1034, which remains rotationally static. A pin (not shown) attached to a cylindrical interior of nozzle body 1032, which rests in a helical groove on the external surface of plunger 1030, pushes plunger 1030 axially downward. As opening 1054 at the tip of plunger 1030 becomes exposed to the external environment, a flow path is created allowing for product to be dispensed. Adapter 1034 and nozzle body 1032 preferably comprise ribs 1052 so that these pieces can be secured within the beverage dispensing machine. The contents which flow from the external tube pathway 1026 and internal tube pathway 1024 (FIG. 30*b*) combine and mix within the interior of plunger 1030. Combining product within nozzle 1028 is advantageous because it appears to a user of a beverage dispenser employing embodiments of the present invention that a single and uniform beverage is being dispensed. Another isometric view of nozzle 1028 is shown illustrated in FIG. 30*e*.

In a preferred embodiment of the present invention, nozzle 1028 would be secured in a dispensing cup (not shown). A static portion of the dispensing cup secures adapter 1034 with grooves that correspond to ribs 1052, while a mechanical actuator (not shown) secures nozzle body 1032 and turns nozzle body 1032 in order to dispense a beverage. More detail about the general construction of dispensing nozzles and nozzle actuation is described herein below.

FIGS. 31*a*-31*c* and 32-36 illustrate a dynamic on-the-fly mixing nozzle 1400. In a further preferred embodiment of the present invention, a dynamic nozzle 1400 is shown that can independently control the flow of at least two separate liquids, as well as keep each liquid separate from each other when dynamic nozzle 1400 is closed. In a preferred embodiment of the present invention, dynamic nozzle 1400 is attached to internal tube pathway 1042 (FIG. 30*c*) and external tube pathway 1044 (FIG. 30*c*).

Figure 31A:
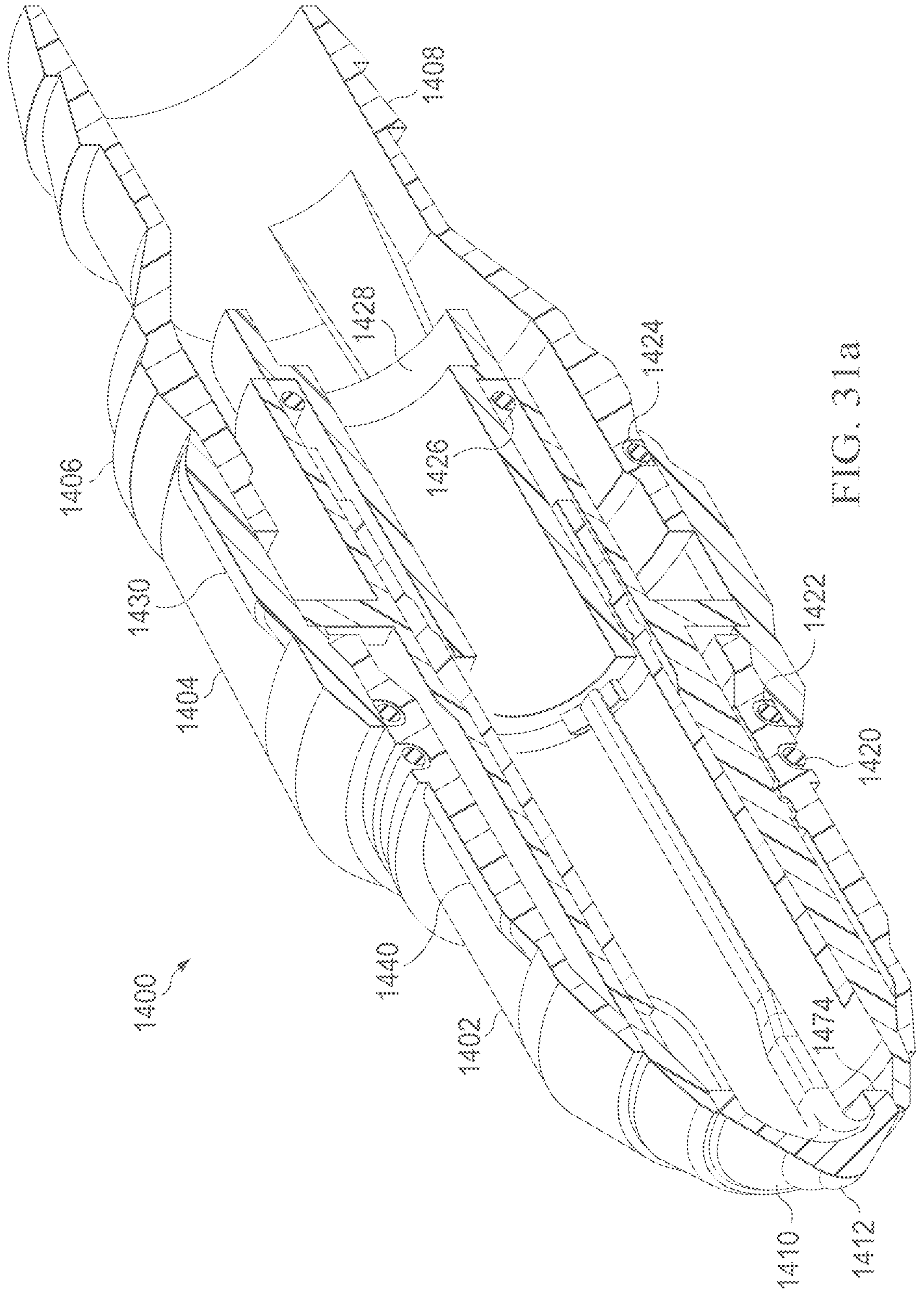
FIGS. 31*a*-31*c* illustrate an embodiment of a dynamic mixing nozzle.
Figure 31B:
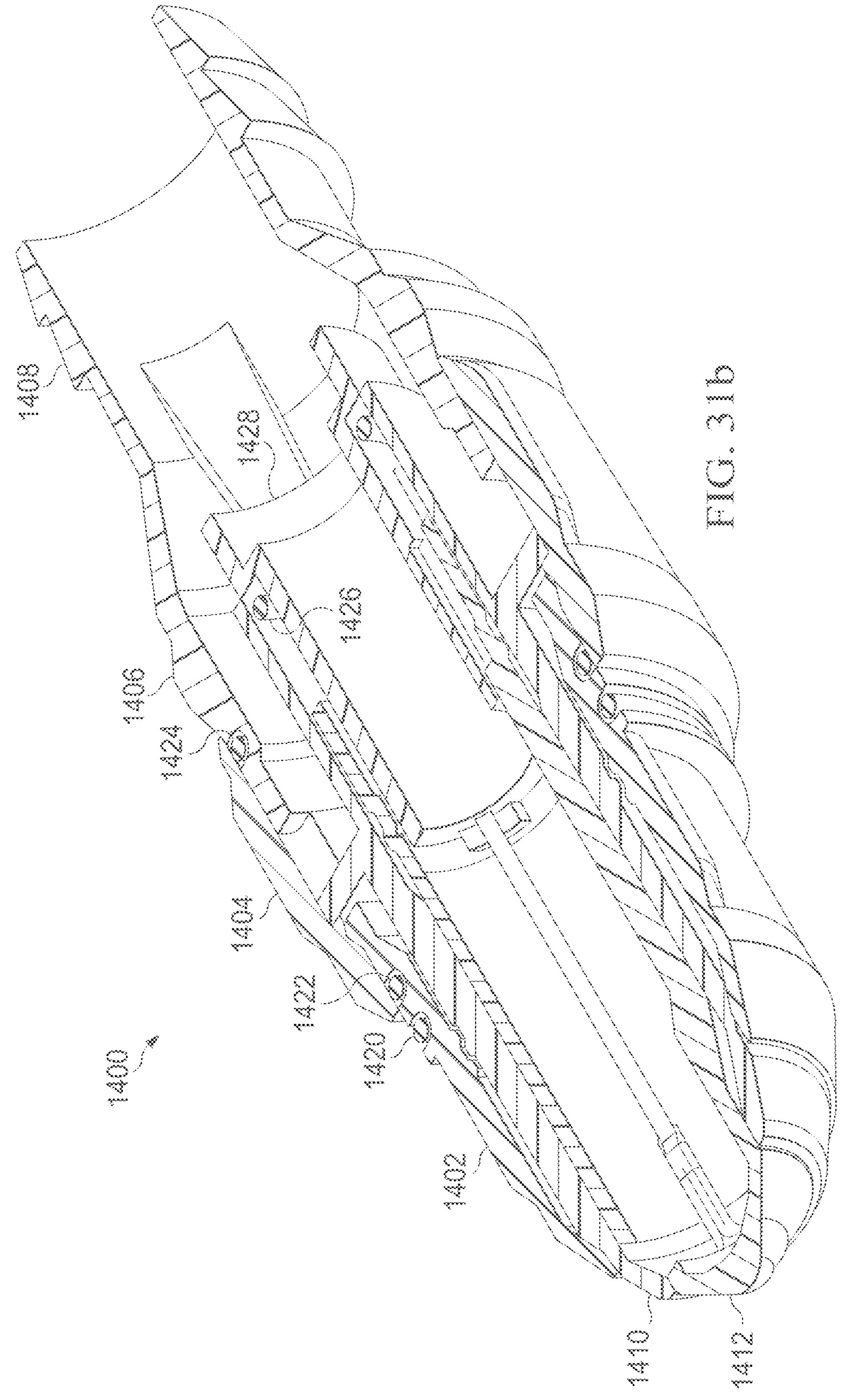
Figure 31C:
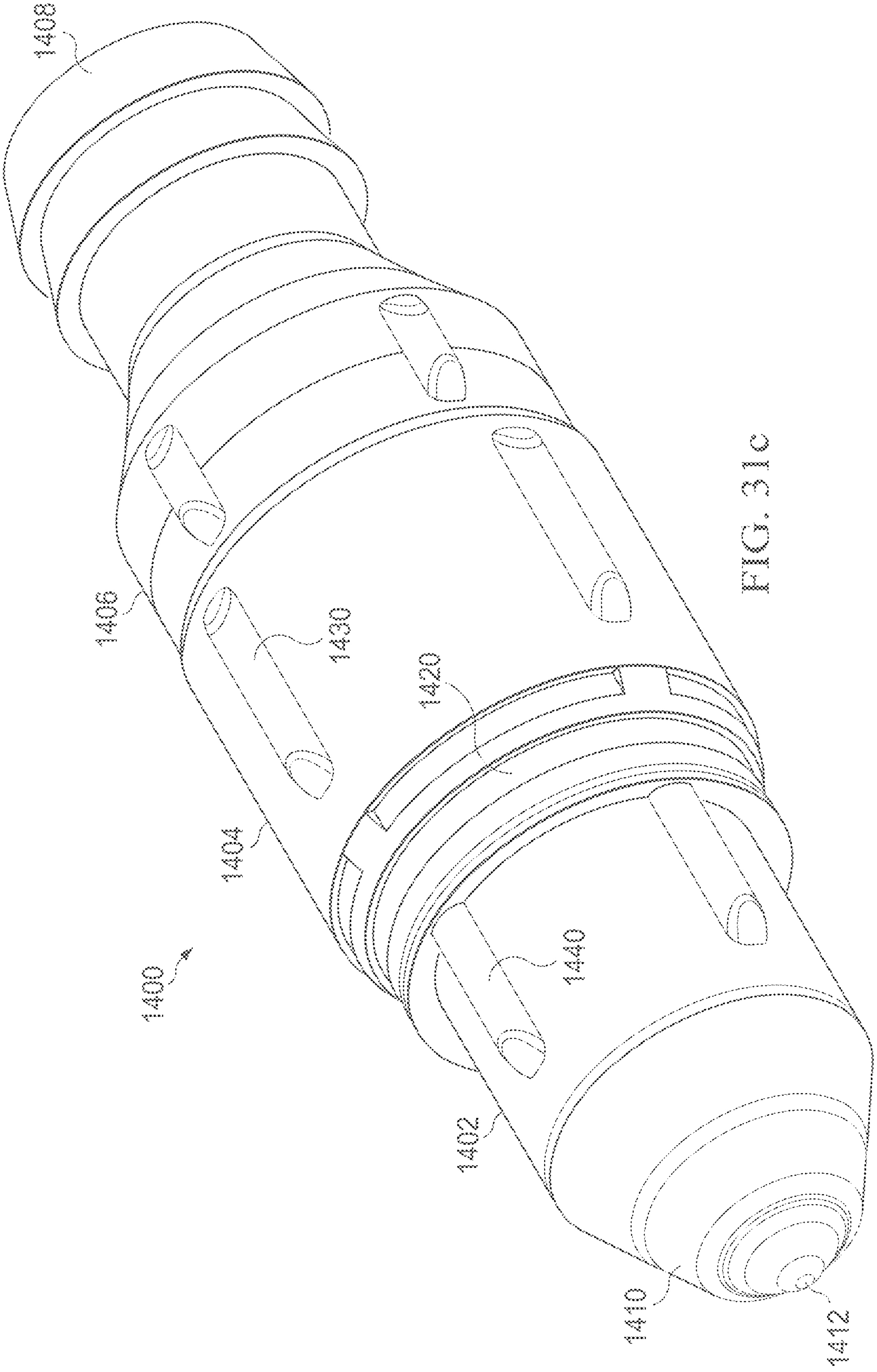
Figure 32A:
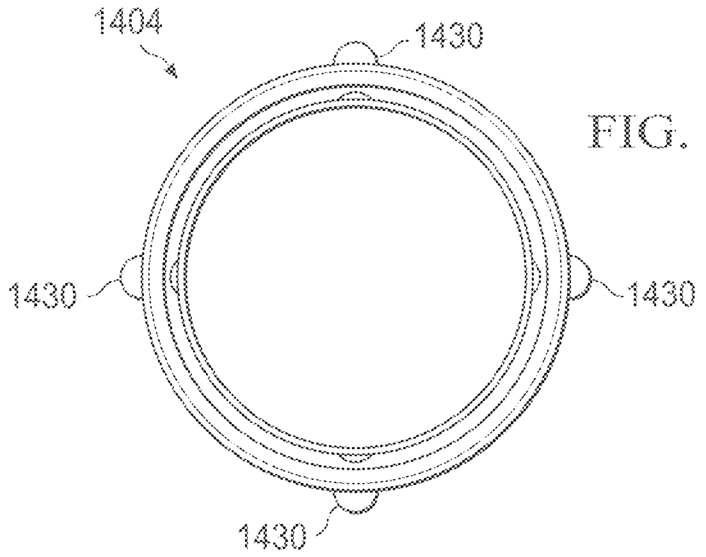
FIGS. 32*a*-36*e* illustrate embodiment components of a dynamic mixing nozzle.
Figure 32B:
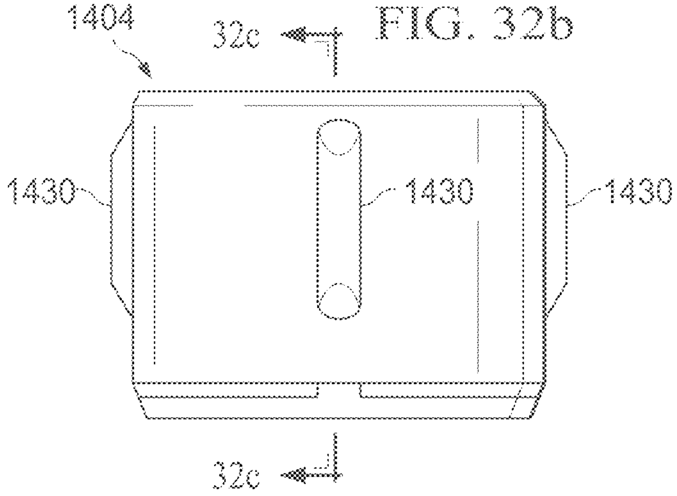
Figure 32C:
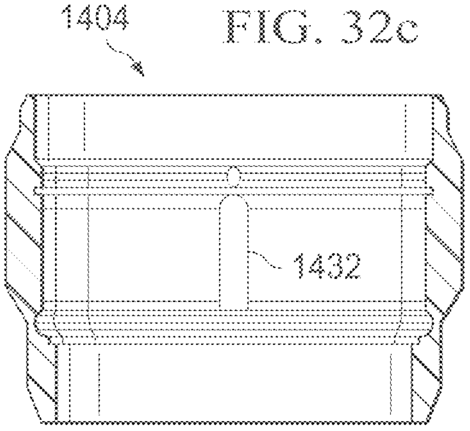
Figure 32D:
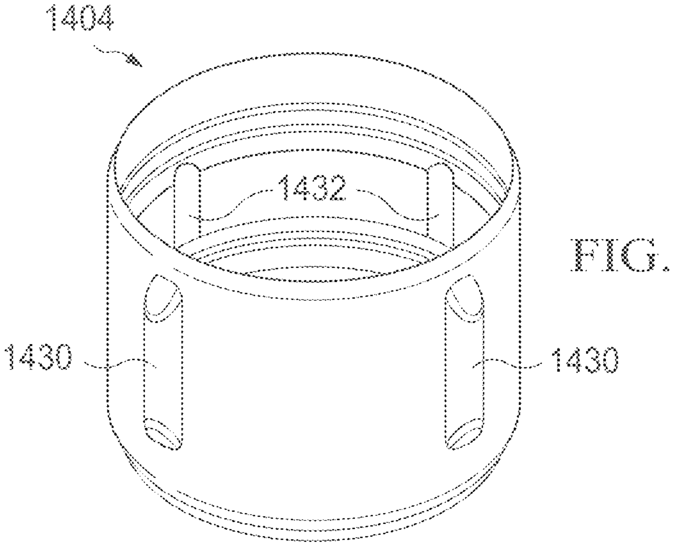
Figure 32E:
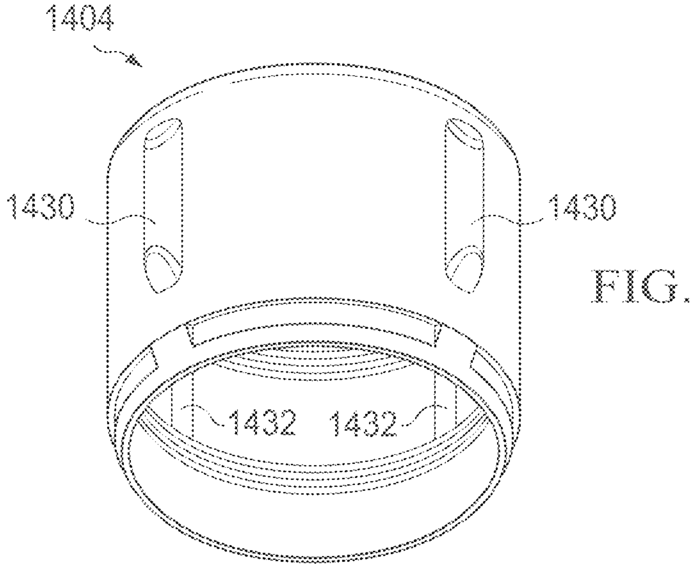
Figure 33A:
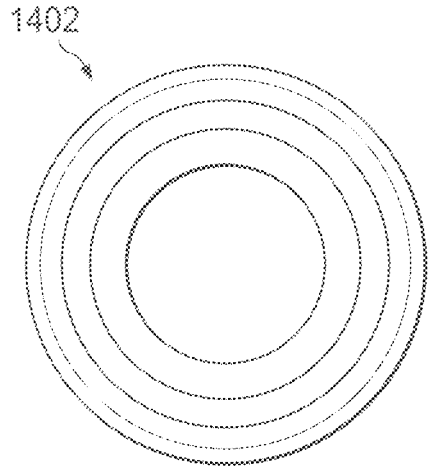
Figure 33B:
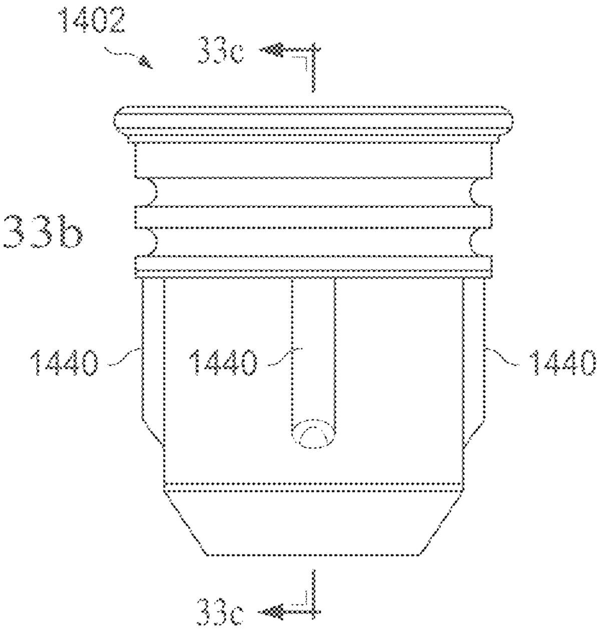
Figure 33C:
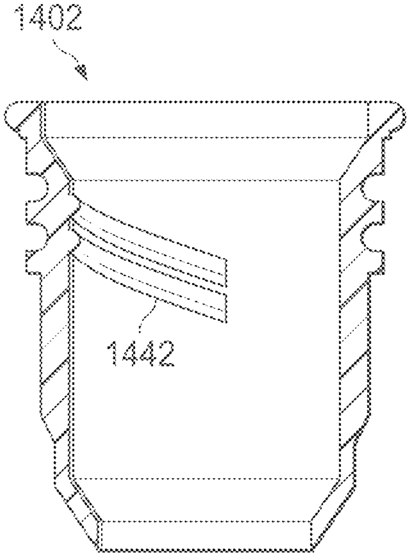
Figure 33D:
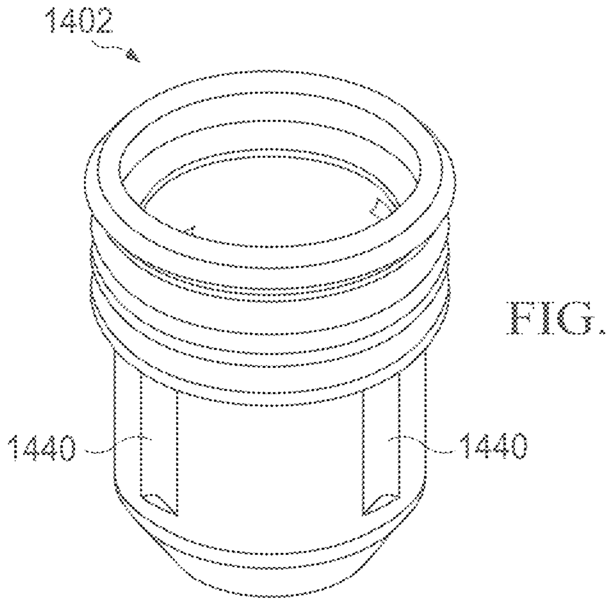
Figure 33E:
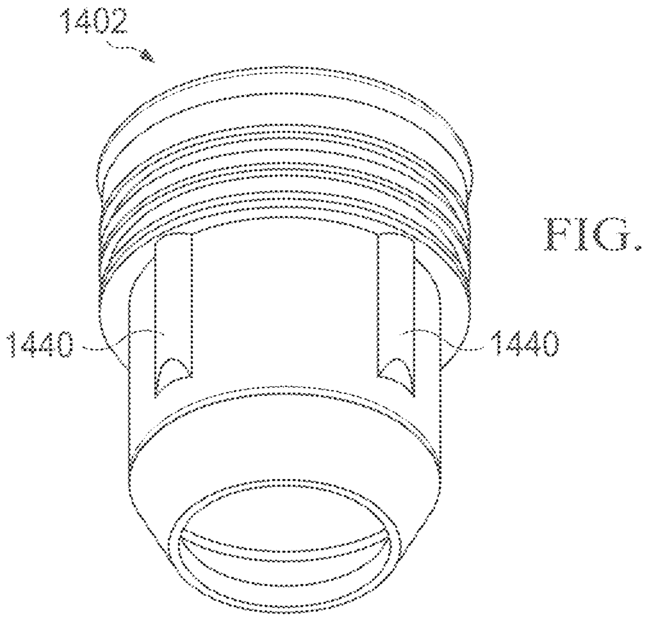
Figure 34D:
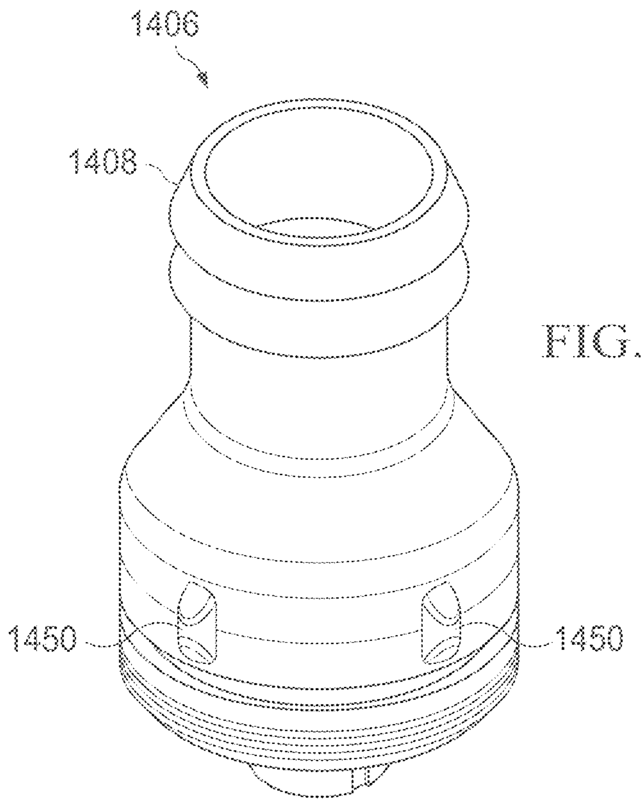
Figure 34E:
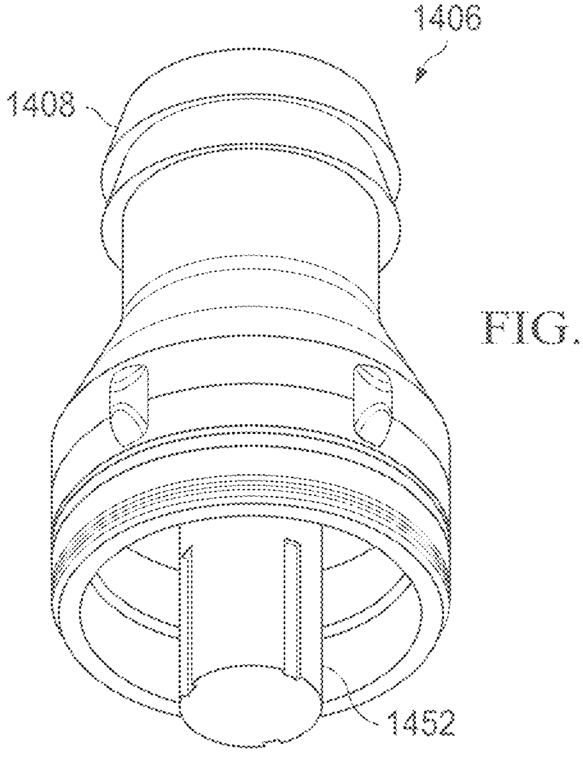

FIG. 31*a* shows an isometric cut-away view of dynamic nozzle 1400. Dynamic nozzle 1400 consists of lower nozzle body 1402, upper nozzle body 1404, adapter 1406, outer plunger 1410, and inner plunger 1412. Adapter 1406 is fitted with barbs 1408, onto which external tube pathway 1044 (FIG. 30*c*) is attached, and includes an inner circular ridge 1428 used to secure internal tube pathway 1042 (FIG. 30*c*) to dynamic nozzle 1400.

Figure 35A:
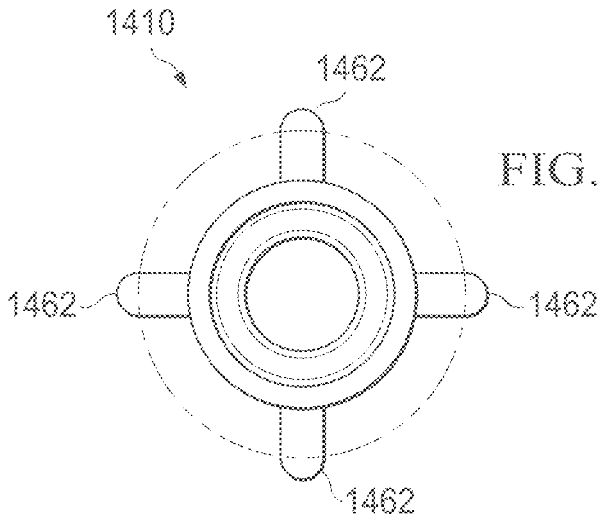
Figure 35B:
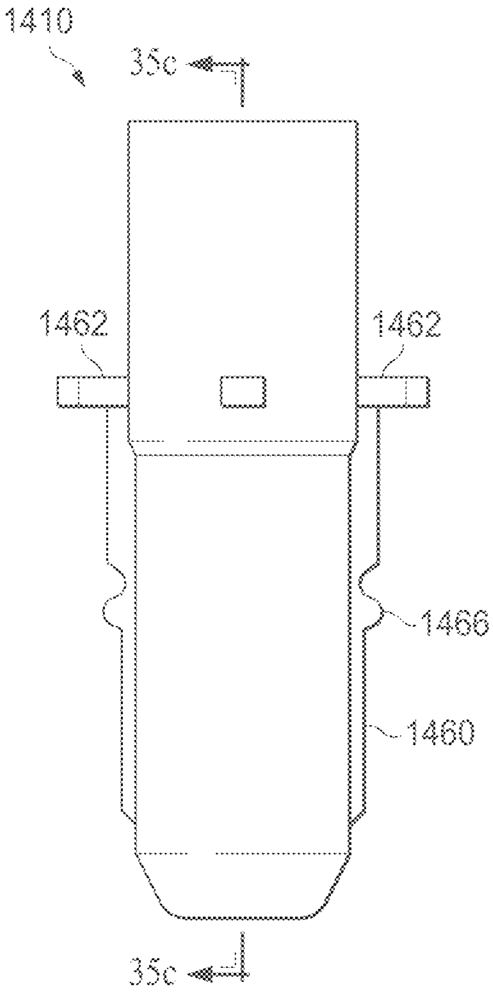
Figure 35C:
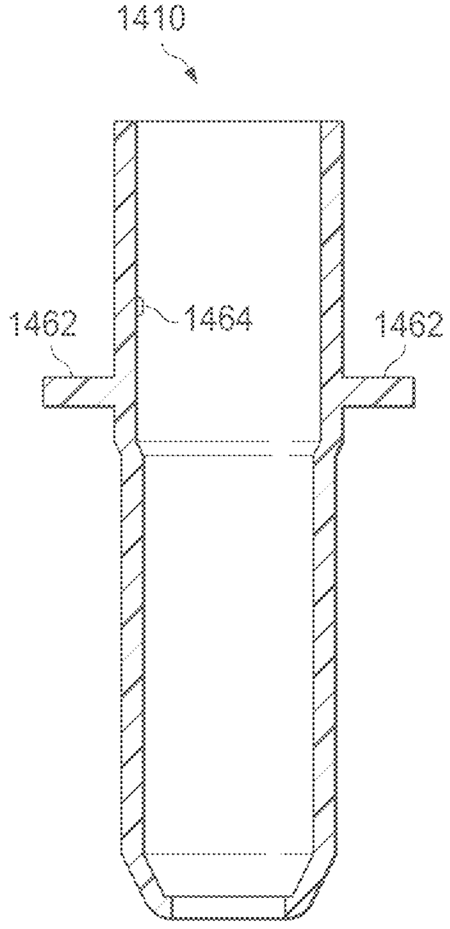
Figure 35D:
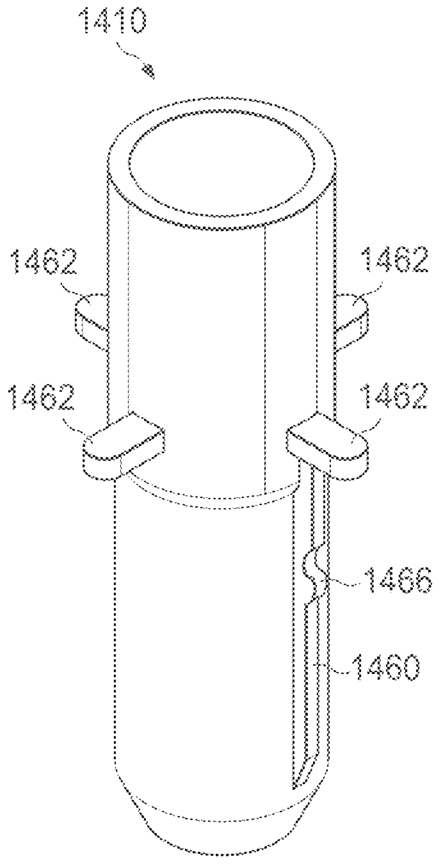
Figure 35E:
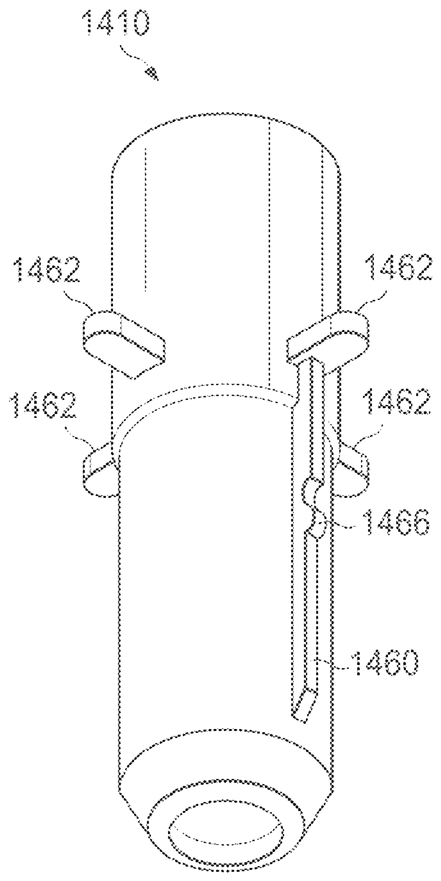

Turning lower nozzle body 1402 actuates outer plunger 1410, pushing outer plunger 1410 inward toward adapter 1406. When outer plunger 1410 is pushed inward, liquid emanating from external tube pathway 1044 (FIG. 30*c*) flows from adapter 1406 to the end of dynamic nozzle 1400, between the outer circumference of the outer plunger 1410 and the inner circumference of lower nozzle body 1402, and out of the end of dynamic nozzle 1400. When lower nozzle body 1402 is rotated, helical grooves 1442 (FIG. 33*c*) set into the inner circumference of lower nozzle body 1402 and push against projection 1466 (FIG. 35*b*) on the outer circumference of outer plunger 1410, thereby making the axial position of outer plunger 1410 dependent on the angular position of lower nozzle body 1402. Outer plunger 1410 also includes a locking feature 1462 (FIG. 35*a*) which fits into corresponding grooves 1432 (FIG. 32*b*) in the inner circumference of upper nozzle body 1404. This locking feature 1462 prevents outer plunger 1410 from rotating within dynamic nozzle 1400 relative to upper nozzle body 1404, as well as allowing upper nozzle body 1404 to rotate outer plunger 1410 as described herein below. Outer plunger 1410 also contains a vertical riding rib 1460 (FIG. 35*d*). Because the axial position of outer plunger 1410 is dependent on the rotational position of lower nozzle body 1402, the flow rate of the liquid emanating from the external tube pathway 1044 (FIG. 30*c*) will be dependent on the angular position of lower nozzle body 1402. When outer plunger 1410 is actuated, inner plunger 1412 moves along with outer plunger 1410.

Figure 36A:
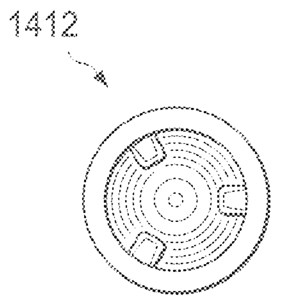
Figure 36B:
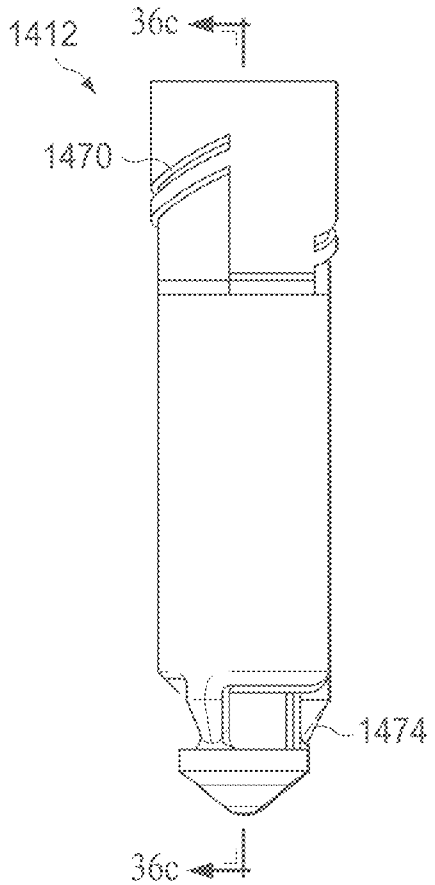
Figure 36C:
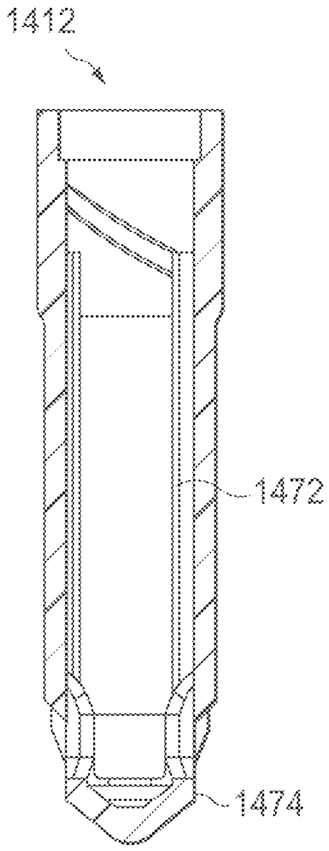
Figure 36D:
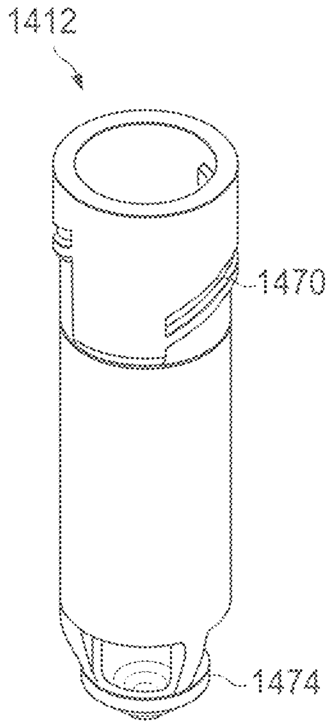
Figure 36E:
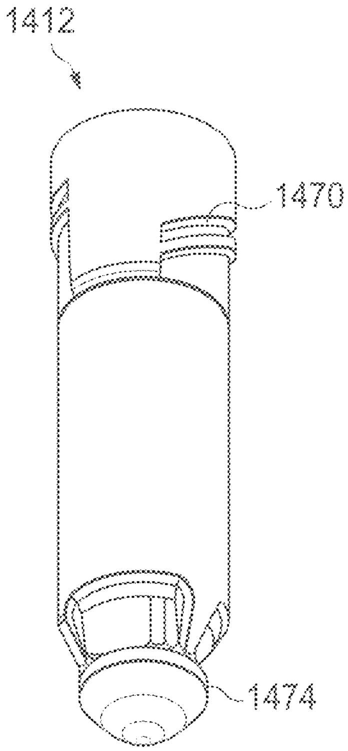

Similarly, turning upper nozzle body 1404 actuates inner plunger 1412, pushing inner plunger 1412 inward toward adapter 1406. When inner plunger 1412 is pushed inward, liquid emanating from internal tube pathway 1042 flows from the adapter 1406 end of dynamic nozzle 1400 inside the inner circumference of inner nozzle 1412 and through cavities 1474 set in the tip of inner plunger 1412, and out through the tip of dynamic nozzle 1400 within the inner circumference of outer nozzle 1410. When upper nozzle body 1404 is rotated, grooves 1432 (FIG. 32*b*) within the inner circumference of upper nozzle body 1404 move locking feature 1462 (FIG. 35*a*) on the outer circumference of outer plunger 1410. A guide feature 1464 (FIG. 35*c*) set into the inner circumference of outer plunger 1410 is set into a helical groove 1470 (FIG. 36*b*) on the outer circumference of inner plunger 1412. Rotational motion of upper nozzle body 1404 thereby pushes plunger 1412 upward by the motion of guide feature 1464 (FIG. 35*c*) relative to helical groove 1470 (FIG. 36*b*). The inner circumference of inner plunger 1412 also comprises a vertical rib 1472 (FIG. 36*c*) which fits into inner plunger guide slot 1452 (FIG. 34*b*) of adapter 1406 to prevent inner plunger 1412 from rotating with respect to adapter 1406.

In preferred embodiments of the present invention, dynamic nozzle 1400 is installed within an actuator cup (not shown) within a beverage dispensing system. The cup comprises two rotational actuators that rotate upper nozzle body 1404 and lower nozzle body 1402. The cup and its actuators includes grooves keyed to fit around ribs 1440 on lower nozzle body 1402, ribs 1430 on upper nozzle body 1404, and ribs 1450 on adapter 1406. These ribs 1440, 1430 and 1450 prevent slippage between dynamic nozzle 1400 and the actuator cup. Embodiments of the actuator cup are similar to details of actuator embodiments with respect to nozzle actuators described herein below with respect to single plunger nozzles. Preferred embodiments of the present invention can also include a water dispensing path (not shown) surrounding dynamic nozzle 1400. Water from the water dispensing path can be used to mix water with the liquid beverage products. The water dispensing path can be further used to rinse dynamic nozzle 1400 after each use by closing outer plunger 1410 and inner plunger 1412 after each use.

Dynamic nozzle 1400 also includes o-rings 1420, 1422, 1424, and 1426, which provide seals to various components of dynamic nozzle 1400. O-ring 1426 provides a seal between inner circular ridge 1428 that secures internal tube pathway 1042 (FIG. 30*c*) and outer plunger 1410, which prevents product from internal tube pathway 1042 (FIG. 30*c*) from mixing with the product from external tube pathway 1044 (FIG. 30*c*). O-ring 1426 seals upper nozzle body 1404 to adapter 1406, and o-ring 1422 seals upper nozzle body 1404 to lower body 1402.

In preferred embodiments of the present invention, dynamic nozzle 1400 is typically installed in a system where the upper sections of nozzle 1400 reside in a pressurized environment. O-ring 1420 is used to seal lower nozzle body 1402 to the inner circumference of a dispensing cup and thereby maintain a pressurized environment within the beverage dispensing machine. In alternative embodiments of the present invention, however, some or all of the o-rings may be omitted and an interference fit be used instead to provide sealing between components of dynamic nozzle 1400 and between dynamic nozzle 1400 and the beverage dispensing machine.

Figure 37:
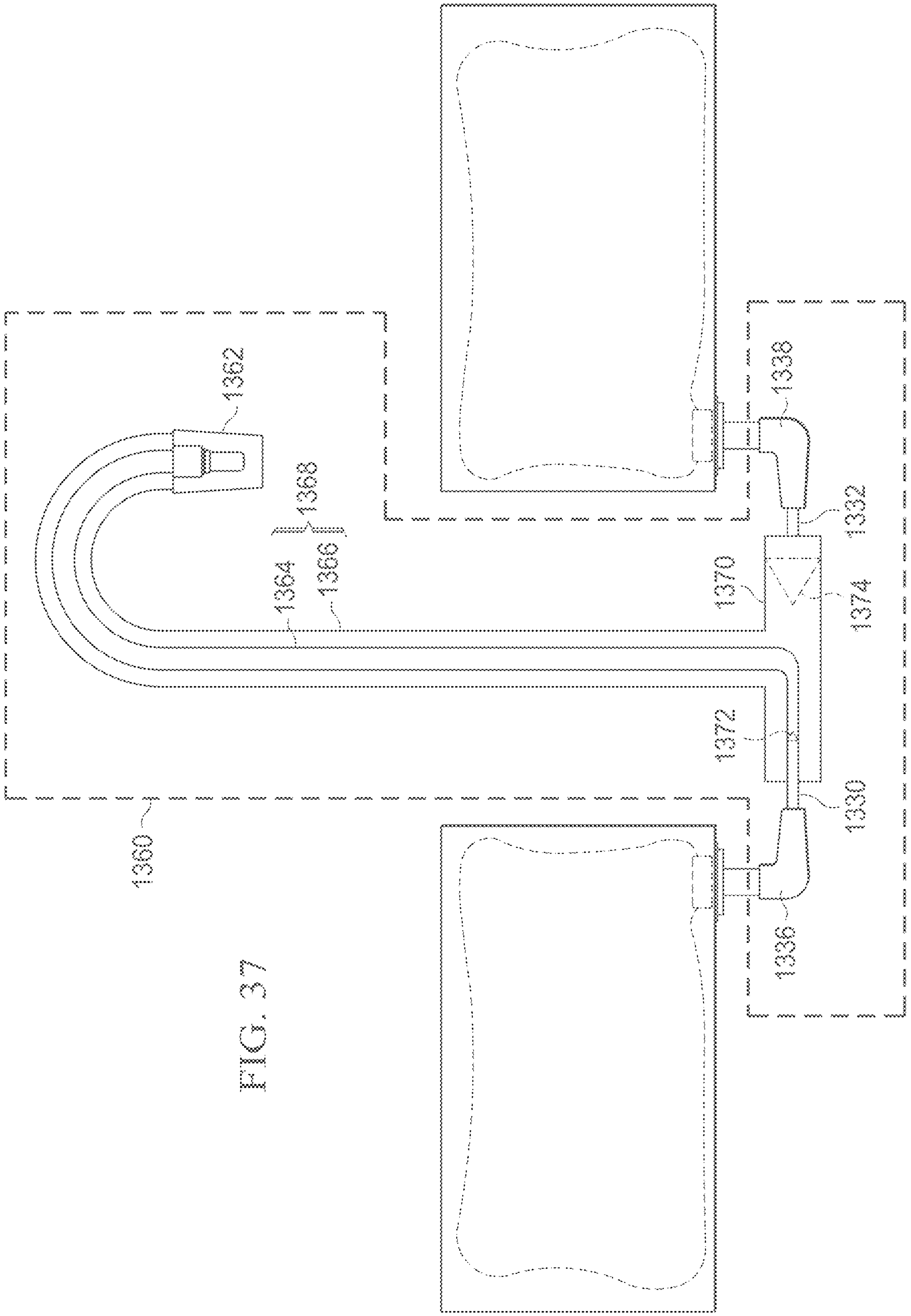
FIG. 37 illustrates an embodiment tube set for dispensing and mixing beverages.

In preferred embodiments of the present invention, major portions of the product flow path are included in a tube set 1360, as shown in FIG. 37. Check valves 1372 and 1374, two liquid tee connector 1370, quick disconnect valves 1336 and 1338, tube sections 1330 and 1332, tube-within-a-tube 1368 comprising internal tube 1364 and external tube 1366, and nozzle 1362 can be included in tube set 1350 shown in FIG. 27*a*. Nozzle 1362 can comprise either a static or dynamic unified nozzle. Tube set 1360 is preferably disposable and made constructed as and installed in a similar manner as the other tube sets disclosed hereinabove. Tube set 1360 and the nozzle assembly may be designed so that they can be easily removed from the dispenser and cleaned, or disposed of and replaced. The water flowing across the other parts of nozzle 1362 allow for a rinse feature that rinses nozzle 1362 substantially free of residual milk on the surface of the nozzle tip.

When tube set 1360 is used with the pressurized pumping method as described above, the tube-within-a-tube tube set 1368 may utilize a check valve in each product's delivery line to prevent backflow of the higher pressure dairy liquid into the lower pressure line. By using a one-nozzle exit port with a small mixing area for the dairy liquids to mix, the end user is unaware of the mixing of the two dairy ingredients.

Figure 38A:
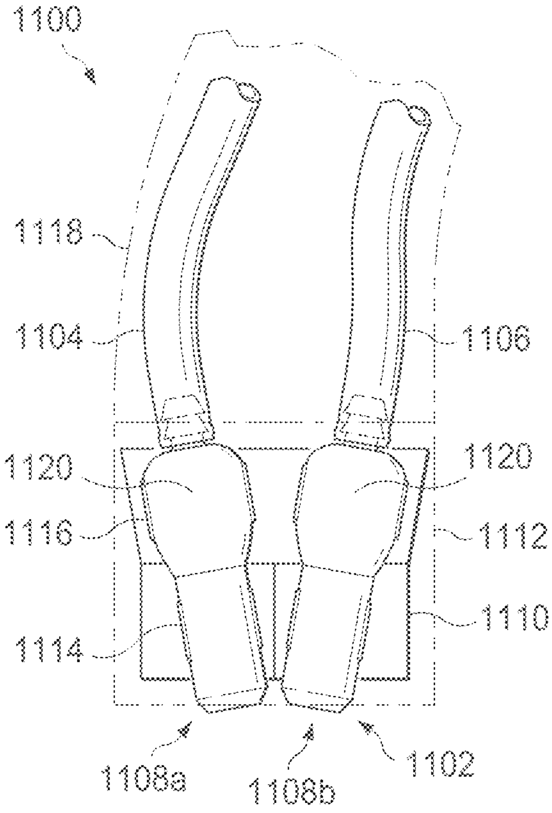
FIGS. 38*a* and 38*b* illustrate alternate embodiment systems for dispensing and mixing liquid beverages.
Figure 38B:
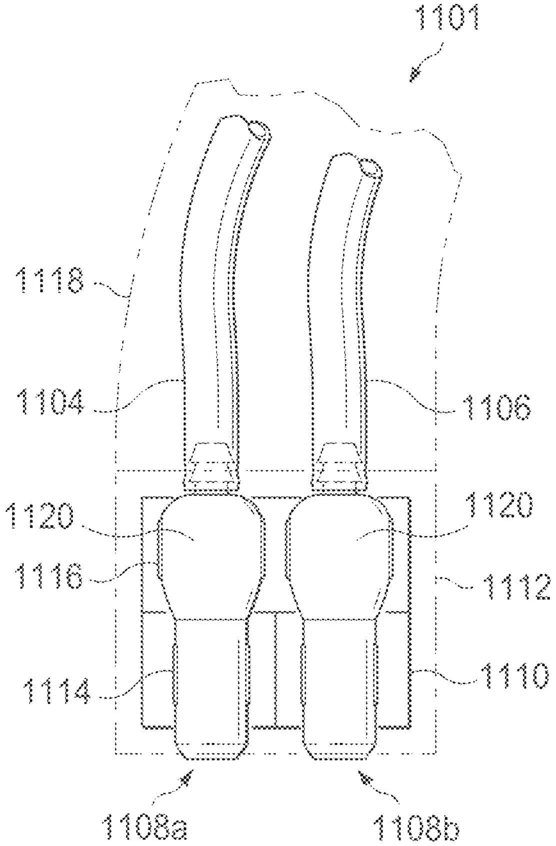

Alternative nozzle designs may be employed for allowing the liquid products to flow, such as the two nozzle designs shown in FIGS. 38*a*-38*b*.

As shown in FIG. 38*a*, an alternative implementation of a tube-within-a-tube tube set 1100 uses an attached two-valve nozzle 1102 at the dispensing point that mechanically opens for both an inner product line 1104 and an outer product line 1106. Inner product line 1104 is preferably used for cream and outer product line 1106 is preferably used for skim milk concentrate. The two separate nozzles 1108*a* and 1108*b* may eliminate the need for the check valves to prevent backflow in the product lines. In addition, the two-valve nozzle 1102 including nozzles 1108 also prevents any commingling of the dairy ingredients prior to dispensing. This nozzle may have an adapter 1120 that secures both the inner and outer tubes. In preferred embodiments, inner product line 1104 and outer product line 1106 are routed through tube chute 1118. Each adapter 1120 and nozzle 1108 comprises ribs 1114 and 1116 which are used to hold the adapters and nozzles securely in place. The nozzles 1108*a* and 1108*b* also comprise separate valves for the inner product line 1104 and for the outer product line 1106. The nozzle may allow two external drives 1110 to actuate both valves independent of each other. This embodiment may allow a microprocessor to control the amount that the valves are open so that the correct amount of dairy products can be delivered for a given user selection. Nozzles 1108*a* and 1108*b* in tube set 1100 are angled toward each other in order to create a product stream that is seen visually as a single stream of product. Alternatively, the nozzles 1108*a* and 1108*b* may be positioned parallel to each other as shown in tube set 1101 depicted in FIG. 38*b*.

In the embodiments shown in FIGS. 38*a*-38*b*, each nozzle 1108*a* and 1108*b* is attached to a nozzle drive 1110 which provides a mechanical actuator to open and close each nozzle 1108*a* and 1108*b*. Nozzles 1108*a* and 1108*b* and associated nozzle drives 1110 sit in cup 1112.

Various other embodiments, modifications and alternatives are possible, as discussed in further detail below.

Prior art systems for use with aseptic products such as dairy milk assume that the product only flows in the intended direction and that contaminants will not travel upstream. This is not always the case, however, and aseptic products may become contaminated when using prior art systems.

Figure 39A:
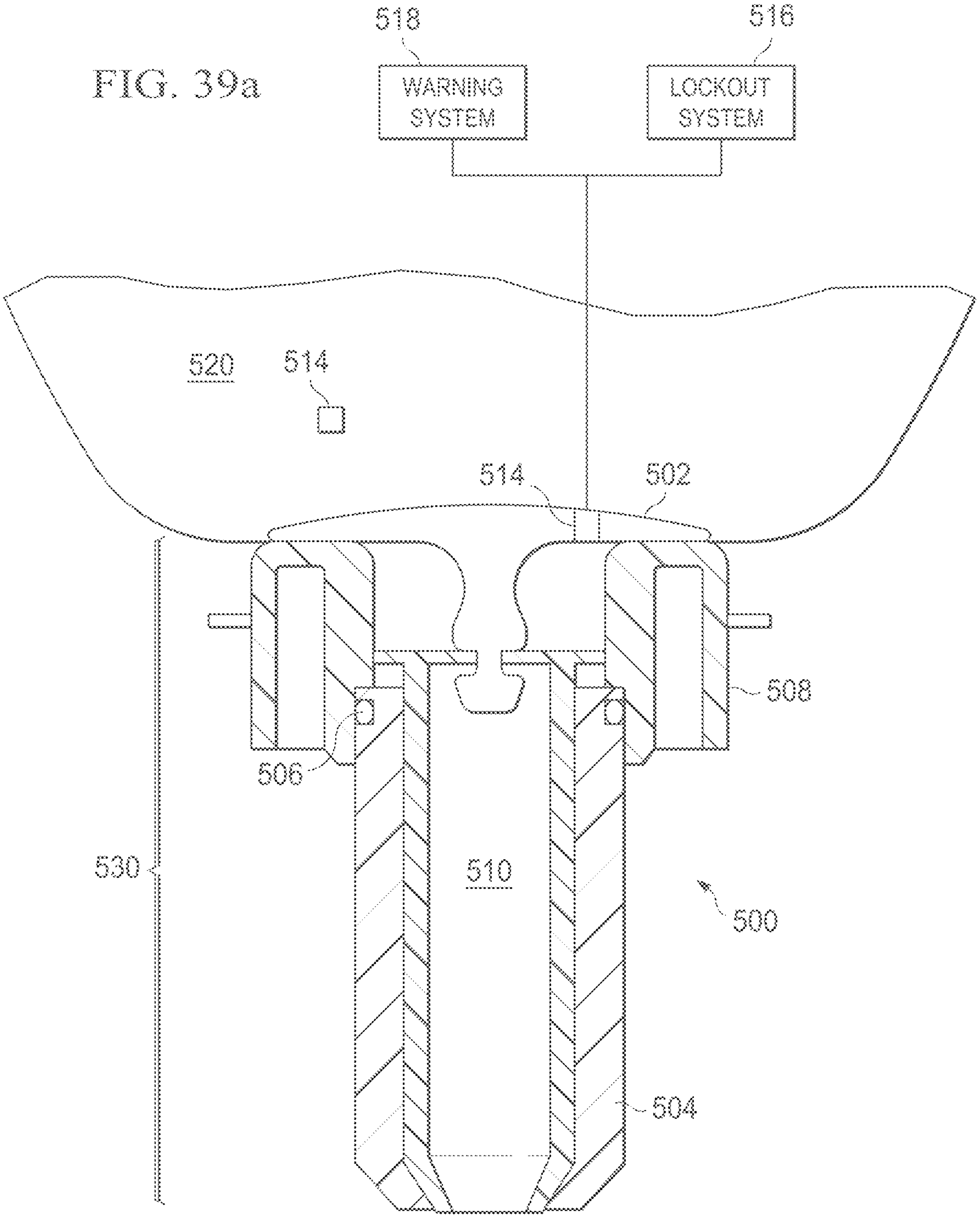

In a preferred embodiment of the invention, FIGS. 39*a* and 39*b* illustrate a system 500 and method for maintaining an aseptic product when dispensing with a pressurized dispensing system. A cap or hat 502 on nozzle 530 prevents contamination of higher chamber product reservoir 520 from fluid in lower chamber 522. Coupled with a positive pressure dispensing system, this system and method generally prevent product from flowing in the wrong direction and allow the product to maintain an aseptic condition. These embodiments may be used with any compatible nozzle/dispenser disclosed herein.

FIG. 39*a* shows aseptic nozzle 530 in a closed position. In a preferred embodiment of the present invention, nozzle 530 is made up of a nozzle body 504 in which a plunger 510 capable of axial motion is inserted. Nozzle hat 502 is attached to the top of plunger 510. When nozzle 530 is in a closed position, the edges of hat 502 are positioned flush against an adapter sealing surface 508, which prevents product from leaking from higher chamber 520 to lower chamber 522. A liquid proof seal is maintained between adapter sealing surface 508 and nozzle body 504 with an o-ring 506. O-ring 506 can be made of ethylene propylene, or alternatively in other embodiments they can be made of buna-nitrile. Nozzle hat 502, plunger 510, nozzle body 504, and adapter sealing surface 508 are preferably made from high density polyethylene. Alternatively, in other embodiments, these components can be made from low density polyethylene, polyethylene terephthalate, and polypropylene.

In preferred embodiments of the present invention, a pressure sensor 514 is positioned in hat 502 in order to measure a pressure difference between higher chamber 520 and lower chamber 522. In the event that pressure sensor 514 senses that the pressure in lower chamber 522 exceeds the pressure in higher chamber 520, which signifies a loss of pressure resulting in the possibility of a contaminated product, a signal is sent to a warning system 518 and/or a lockout system 516. Warning system 518 can create a user perceptible warning that signals the user of the possibility of a contaminated product. Lockout system 516, on the other hand, can be used to prevent the system from dispensing the product in the event of possible contamination. In preferred embodiments of the present invention, the warning system 518 and lockout system 516 can be implemented with a microcontroller or microprocessor. In alternative embodiments of the present invention, warning system 518 and lockout system 516 can be implemented by other electrical or mechanical means.

FIG. 39*b* illustrates aseptic nozzle 530 in an open position. When plunger 510 and nozzle hat 502 are moved axially upward, product passes between nozzle hat 502 and adapter sealing surface 508. As long as positive pressure is maintained while product is being dispensed, sanitary and aseptic conditions can be maintained.

The nozzles disclosed herein, such as the one shown in FIG. 22, may be adapted to fit on the end of a tube with a barbed fitting 602, as shown in FIG. 40. In preferred embodiments of the present invention, nozzle 600 typically includes a nozzle body 606, an adapter 608, and an o-ring 610 to provide a seal between nozzle body 606 and adapter 608. In some embodiments of the present invention, nozzle 600 is internally constructed similar to other nozzle embodiments described herein. By including a barbed fitting 602, however, the nozzle can be force-fit on the end of a tube, and located in various locations away from the bag and box, depending on the specific application. Different sizes and number of barbs 602 may be used depending on the tubing used and desired flow rates.

These embodiments may be used with any compatible embodiment or combination of embodiments disclosed herein, such as the embodiments disclosed in FIGS. 2, 23-24, 26 and 27, for example.

As discussed hereinabove, with some nozzle designs, there may be a problem during the opening or closing of the nozzle, especially when the opening or closing is performed slowly. As the nozzle plunger lifts into the nozzle body, breaking the nozzle seal and allowing product to flow through the newly-created gap, the flow may disassociate and splatter as it dispenses in a non-uniform fashion. When the nozzle becomes fully open, the flow generally returns to a smooth and uniform flow.

Figure 41A:
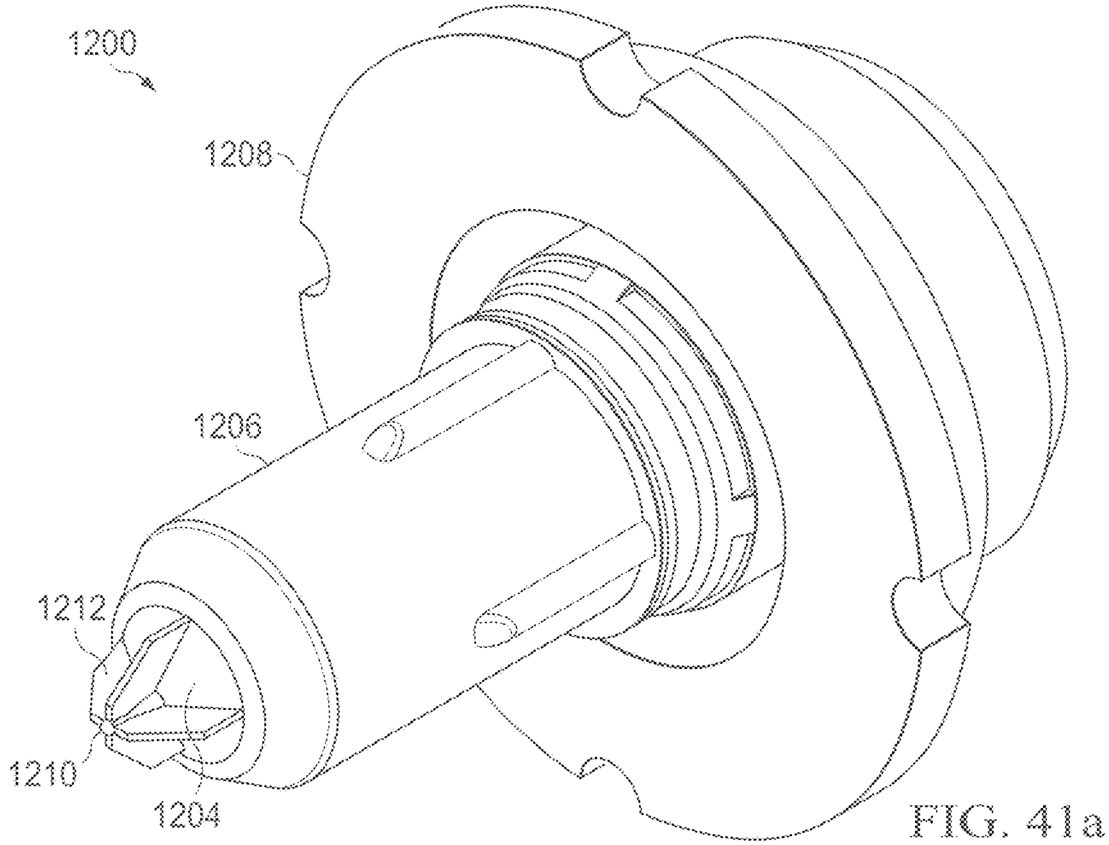
FIGS. 41*a*-41*d* illustrate embodiment systems for anti-splatter nozzle tips.
Figure 41B:
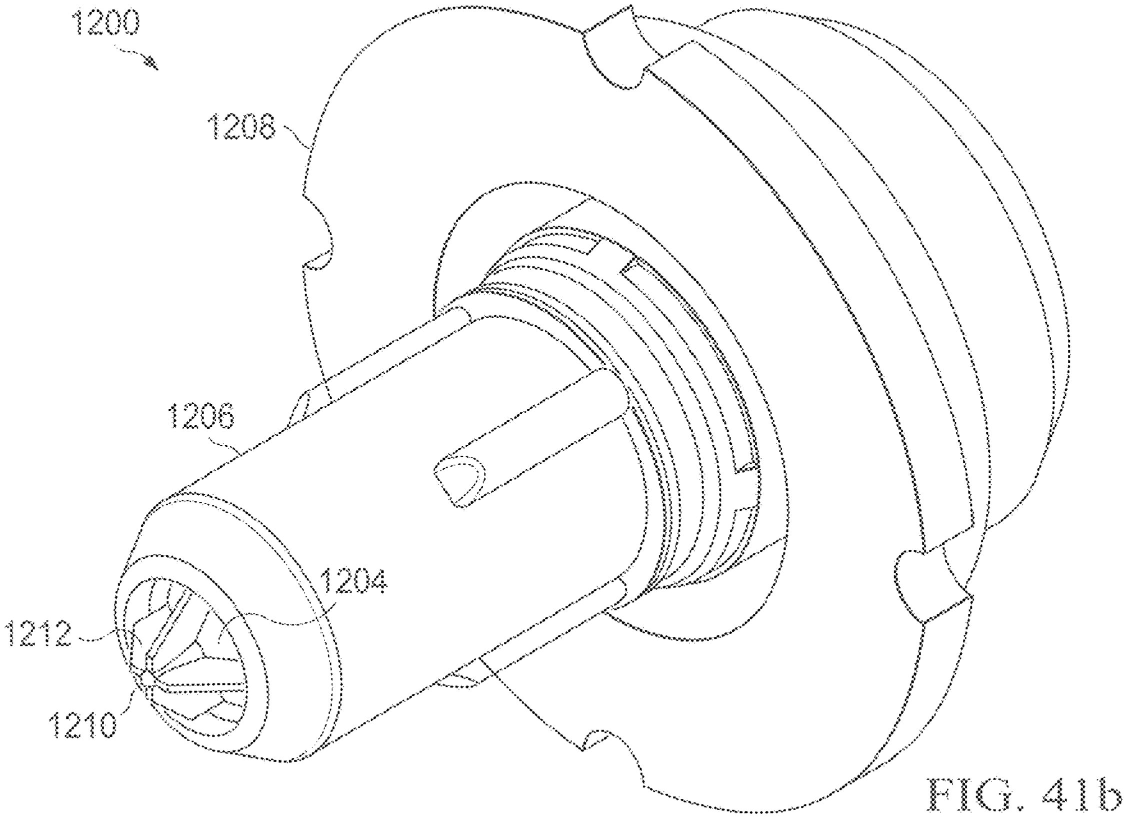

FIG. 41*a* illustrates a preferred embodiment of nozzle assembly 1200 in a closed position, and FIG. 41*b* shows the same nozzle assembly 1200 in an open position. Nozzle assembly 1200 includes nozzle body 1206, nozzle adapter 1208, and plunger 1204, which function in a similar manner as preferred nozzle embodiments disclosed hereinabove. In a preferred embodiment of the invention, vanes 1212 are implemented on the bottom tip of plunger 1204. Vanes 1212 generally terminate in a single conical point 1210. This configuration draws the exiting product that surrounds plunger 1204 to conical point 1210 as opposed to the product simply dropping off plunger 1204. In addition, vanes 1212 help redirect the fluid forces axially instead of transaxially. This may be especially useful at the cracking point where plunger 1204 and nozzle body 1206 just become open. At that point, there are more transaxial forces than axial forces acting upon the exiting fluid. The combination of conical tip 1210 and vanes 1212 may overcome this and significantly reduce disassociation of the product upon the opening of nozzle assembly 1200, thus providing a substantially a smooth and uniform flow during nozzle opening and closing. There may be three, four, five, or more vanes 1212 on nozzle tip 1210.

Figure 41D:
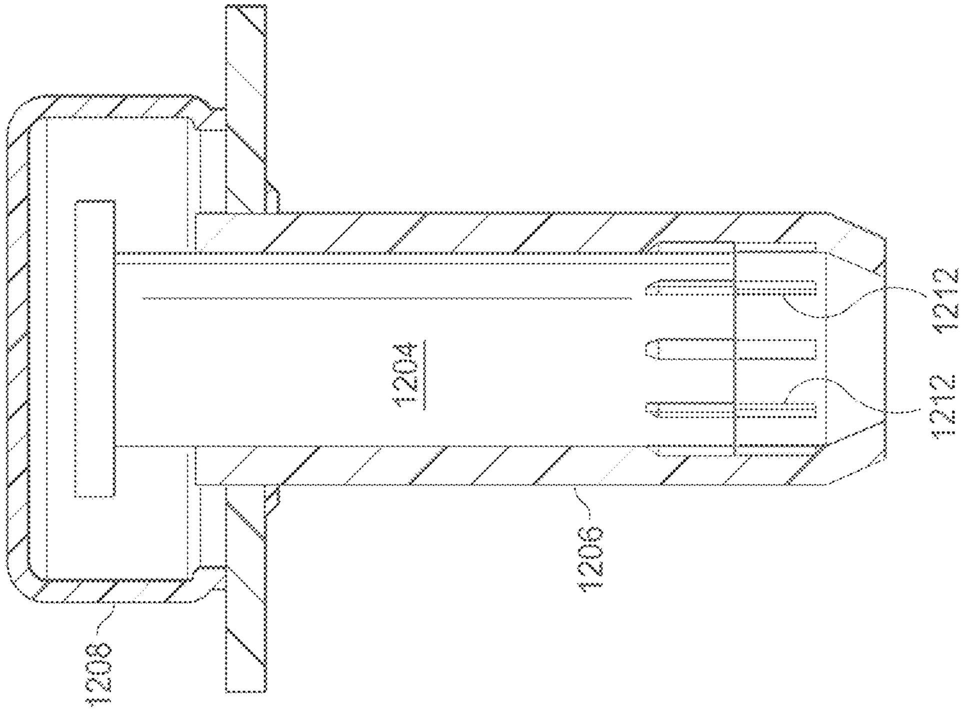
Figure 41C:
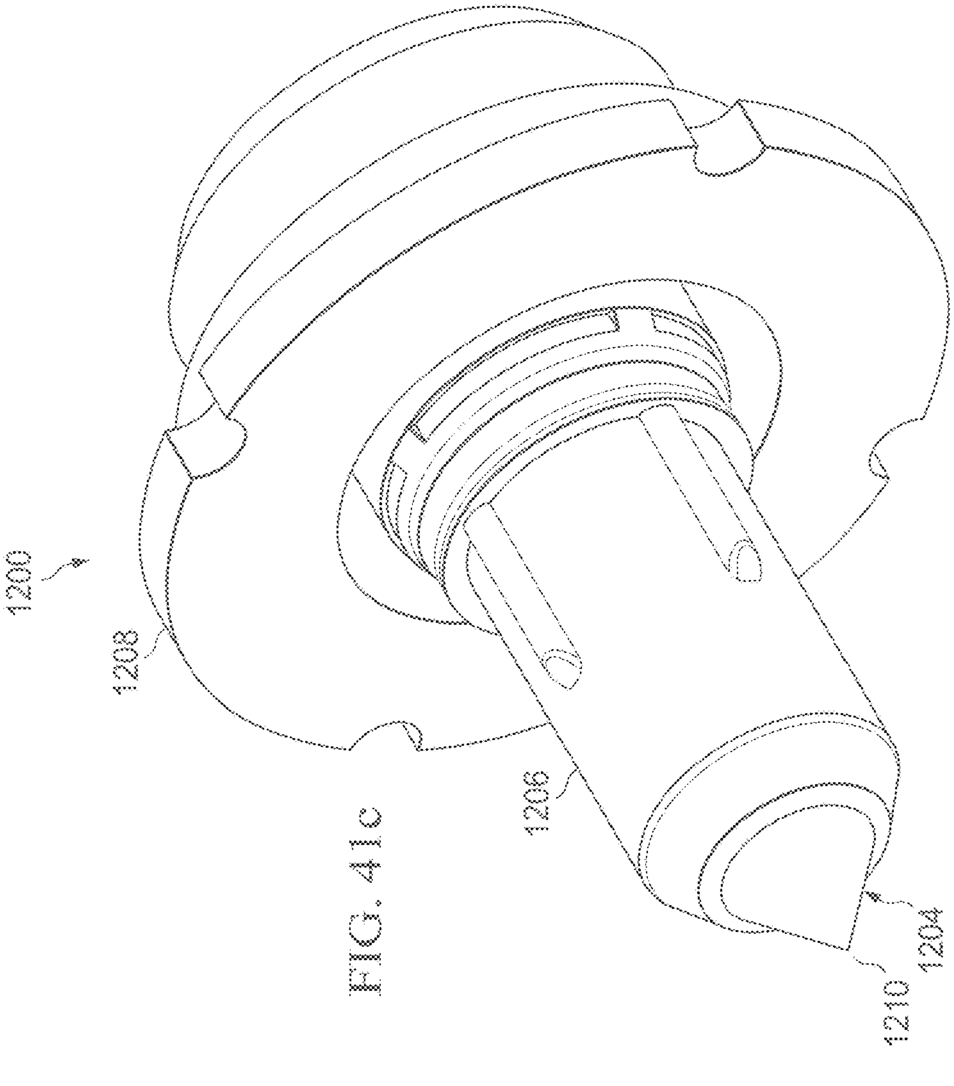

FIG. 41*c* illustrates an alternative embodiment nozzle tip. Plunger 1204 may be implemented with only conical point 1210 and without vanes 1212 (FIG. 41*a*), which generally will provide an improvement over a flat tip nozzle plunger. Conical point 1210 may create a surface for the product to follow down to the bottom point of plunger 1204, uniting the fluid exiting on all sides of plunger 1204. Having a conical point 1210 without vanes 1212 offers several advantages over a plunger tip 1210 with vanes 1212. First, product does not get trapped on the vanes 1212, thereby making the plunger tip easier to clean. Second, implementing conical tip 1210 without vanes 1212 is preferable for beverage dispensing systems which provide an initial pressure of up to about 1 psi when the nozzle first opens. For systems with an initial pressure of greater than about 1 psi, however, the presence of vanes 1212 becomes preferable to prevent erratic product flow.

Alternatively, plunger 1204 may be implemented with only vanes 1212 and without a conical point, as shown in FIG. 41*d*. Preferably, nozzle body 1206 is slotted to receive vanes 1212. In this case, the vanes 1212, alone, help to direct the product axially instead of transaxially, thus reducing the possibility of product splattering as plunger 1204 opens.

These embodiments may be used with any compatible embodiment or combination of embodiments disclosed herein, such as the embodiments disclosed in FIGS. 1, 9, 12, 19, 20-24, 26-27, 30-31, and 35-40, for example.

In an embodiment, a method of operating a nozzle comprises applying a first force to twist a nozzle tip, wherein the nozzle tip remains stationary in a first direction during the applying the first force and a plunger located within the nozzle tip moves in the first direction during the applying the first force, wherein the plunger comprises a central portion and slide stop tabs extending outwards from the central portion. A liquid is dispensed after the applying the first force has begun.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In accordance with an embodiment, a method of operating a nozzle comprising applying a first force to twist a nozzle tip, wherein the nozzle tip remains stationary in a first direction during the applying the first force and a plunger located within the nozzle tip moves in the first direction during the applying the first force, wherein the applying the first force results in a second force being applied to the plunger, wherein the plunger comprises a central portion and slide stop tabs extending outwards from the central portion. A liquid is dispensed after the applying the first force has begun, and water is dispensed at the same time as the dispensing the liquid. In another embodiment, a third force is applied to twist the nozzle tip, wherein the third force is opposite the first force and wherein the nozzle tip remains stationary in the first direction during the applying the third force, and a fourth force is applied to the plunger within the nozzle tip, wherein the fourth force is a result of the second force and moves the plunger in a second direction opposite the first direction.

What is claimed is:

1. A method of dispensing a liquid beverage, the method comprising:

providing a first container within a first chamber, the first container storing a first liquid product, wherein a first output of the first container is connected to a t-section;

providing a second container within a second chamber, the second container storing the first liquid product, wherein a second output of the second container is connected to the t-section;

providing a first set of pressures in the first chamber and the second chamber, the first set of pressures causing the first liquid product from the first container to flow from the first container without causing the first liquid product from the second container to flow from the second container;

after the providing the first set of pressures, providing a second set of pressures in the first chamber and the second chamber, the second set of pressures causing the first liquid product to flow from the first container and also to cause the first liquid product to flow from the second container; and after the providing the second set of pressures, providing a third set of pressures in the first chamber and the second chamber, the third set of pressures causing the first liquid product to flow from the second container without causing the first liquid product to flow from the first container.

2. The method of claim 1, wherein the first set of pressures has a higher pressure in the first chamber than in the second chamber.

3. The method of claim 2, wherein the third set of pressures has a higher pressure in the second chamber than in the first chamber.

4. The method of claim 3, wherein the second set of pressures has a first pressure within the first chamber within about 0.05 psi to about 1.0 psi of a second pressure within the second chamber.

5. The method of claim 1, wherein a combined flow rate of the first liquid product out of a nozzle connected to the t-section remains constant from the providing the first set of pressures, through the providing the second set of pressures, and through the providing the third set of pressures.

6. The method of claim 1, wherein a time period between the providing the second set of pressures and the providing the third set of pressures is greater than one minute.

7. The method of claim 1, wherein the providing the second set of pressures occurs when the first container is almost empty.

8. The method of claim 1, wherein the t-section has an output connected to a nozzle.

9. A method of dispensing a liquid beverage, the method comprising:

providing a first container within a first chamber, the first container storing a first liquid product, wherein a first output of the first container is connected to a t-section;

providing a second container within a second chamber, the second container storing the first liquid product, wherein a second output of the second container is connected to the t-section;

raising a first pressure in the first chamber above a second pressure in the second chamber, the raising the first pressure causing the first liquid product from the first container to flow from the first container without causing the first liquid product from the second container to flow from the second container;

modifying the first pressure and the second pressure a first time to cause the first liquid product to flow from the first container and also to cause the first liquid product to flow from the second container; and modifying the first pressure and the second pressure a second time to cause the first liquid product to flow from the second container without causing the first liquid product to flow from the first container.

10. The method of claim 9, wherein the modifying the first pressure and the second pressure the first time raises the first pressure.

11. The method of claim 10, wherein the modifying the first pressure and the second pressure the first time increases the second pressure to be within about 0.05 psi to about 1.0 psi of the first pressure.

12. The method of claim 9, wherein a flow rate of the first liquid product out of a nozzle remains constant during the modifying the first pressure and the second pressure the first time and during the modifying the first pressure and the second pressure the second time.

13. The method of claim 9, wherein a time period between the modifying the first pressure and the second pressure the first time and the modifying the first pressure and the second pressure the second time is greater than one minute.

14. The method of claim 9, wherein the first liquid product flows from the first container, through a first check-valve, to the t-section.

15. A method of dispensing a liquid beverage, the method comprising:

flowing a first liquid product out of a first container, through a first check-valve, and to a t-section without flowing the first liquid product out of a second container;

flowing the first liquid product out of the first container, through the first check-valve, and to the t-section while flowing the first liquid product out of the second container, through a second check-valve, and to the t-section; and flowing the first liquid product out of the second container, through the second check-valve, and to the t-section without flowing the first liquid product out of the first container.

16. The method of claim 15, wherein during the method a flow rate of the first liquid product out of a nozzle connected to the t-section is constant.

17. The method of claim 15, wherein the flowing the first liquid product out of the first container, through the first check-valve, and to the t-section without the flowing the first liquid product out of the second container is initiated by raising a first pressure within a first chamber, the first container being located within the first chamber.

18. The method of claim 17, wherein the flowing the first liquid product out of the first container, through the first check-valve, and to the t-section while flowing the first liquid product out of the second container, through the second check-valve, and to the t-section is initiated by modifying the first pressure within the first chamber.

19. The method of claim 18, wherein the modifying the first pressure increases the first pressure.

20. The method of claim 15, wherein the flowing the first liquid product out of the second container, through the second check-valve, and to the t-section without flowing the first liquid product out of the first container is initiated at least in part by modifying a second pressure within a second chamber, the second container being located within the second chamber.

* * * * *